(12) United States Patent
Sugisawa et al.

(10) Patent No.: US 7,519,105 B2
(45) Date of Patent: Apr. 14, 2009

(54) CHANNEL CODE ASSIGNMENT ACCORDING TO GAIN FACTOR

(75) Inventors: Koutarou Sugisawa, Tokyo (JP); Hideji Wakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 382 days.

(21) Appl. No.: 10/568,508

(22) PCT Filed: Jun. 6, 2005

(86) PCT No.: PCT/JP2005/010338

§ 371 (c)(1),
(2), (4) Date: Feb. 16, 2006

(87) PCT Pub. No.: WO2005/125035

PCT Pub. Date: Dec. 29, 2005

(65) Prior Publication Data

US 2007/0025422 A1 Feb. 1, 2007

(30) Foreign Application Priority Data

Jun. 16, 2004 (JP) .............................. 2004-178015

(51) Int. Cl.
*H04B 1/707* (2006.01)
(52) U.S. Cl. ..................................... 375/146
(58) Field of Classification Search ................. 375/130, 375/140, 141, 146; 370/335, 342, 441
See application file for complete search history.

(56) References Cited

U.S. PATENT DOCUMENTS

| | | | |
|---|---|---|---|
| 6,693,952 B1 * | 2/2004 | Chuah et al. ................. | 375/140 |
| 7,397,839 B2 * | 7/2008 | Maeda et al. ................ | 375/141 |
| 2002/0021744 A1 | 2/2002 | Iida | |
| 2002/0075943 A1 | 6/2002 | Kurihara | |
| 2006/0217088 A1 * | 9/2006 | Nagaoka et al. .......... | 455/127.1 |

FOREIGN PATENT DOCUMENTS

EP  1 175 031 A2  1/2002

(Continued)

OTHER PUBLICATIONS

M. Iglesias-Xamani, "Code Domain Analysis on W-CDMA User Equipment Transmitters", Microwave Journal, XP 001001168, vol. 44, No. 1, Jan. 2001, pp. 82, 85, 87-88, 90, 92, 94.

(Continued)

*Primary Examiner*—Tesfaldet Bocure
(74) *Attorney, Agent, or Firm*—Oblon, Spivak, McClelland, Maier & Neustadt, P.C.

(57) ABSTRACT

It is an object to propose a way to assign channelization that is applicable to a case in which the number of multiplexing of DPDCHs (Dedicated Physical Data Channels) is at least five for overshoot of HPSK (Hybrid Phase Shift Keying) modulation. Assignment of channelization codes is set as follows. For all possible combinations of channelization assigned to given data channels and control channels, a transition $\theta_1$ from the first chip to the second chip and a transition $\theta_2$ from the third chip to the fourth chip are obtained. For each transition, 0 degrees or 180 degrees is desirable, and 90 degrees is the worst, so that a combination is obtained in which squares of sine of respective transitions become the smallest. Consequently, by obtaining a combination that makes $\sin^2 \theta_1 + \sin^2 \theta_2$ the smallest, the one that is close to the most desirable combination can be obtained.

9 Claims, 44 Drawing Sheets

FOREIGN PATENT DOCUMENTS

| | | |
|---|---|---|
| EP | 1 217 759 A2 | 6/2002 |
| EP | 1 389 844 A1 | 2/2004 |
| GB | 2 352 944 A | 2/2001 |
| JP | 2001-16139 | 1/2001 |
| JP | 2002-33716 | 1/2002 |
| JP | 2004-80734 | 3/2004 |

OTHER PUBLICATIONS

Chen Zeqiang, et al., "An Improved Peak-to-Average Power Ratio Reduction Scheme for HPSK in CDMA2000", The 14th IEEE 2003 International Symposium on Personal, Indoor and Mobile Radio Communication Proceedings, XP 010678798, vol. 2, Sep. 7, 2003, pp. 1876-1879.

"Agilent AN 1335: HPSK Spreading for 3G", http://cp.literature.agilent.com/litweb/pdf/5968-8438E.pdf, XP 002434363, Nov. 1, 2000, pp. 1-18.

"3GPP, 3GPP TR 25.896 V6.0.0", pp. 1-53, 2004.

Fujiwara, Akihiro et al., "Modified HPSK Modulation Scheme for Wideband CDMA Systems", The Transactions of the Institute of Electronics, Information and Communication Engineers, vol. J83-A, No. 12, pp. 1552-1557, 2000. (with partial English Translation).

"3GPP TR25.896 V1.2.1", pp. 1-127, 2004.

"3GPP TR25.808 V0.2.2, 10.1.1 Spreading", pp. 1-21, 2004.

"3GPP R1-041267, TP: calculation of the needed number of physical channel bits (2nd rev.)", Samsung, 2004, pp. 1-2.

"3GPP R1-041485, Proposal on EUL physical channel code mapping", pp. 1-2, Samsung, LGE, 2004.

* cited by examiner

BACKGROUND ART

BACKGROUND ART

BACKGROUND ART

BACKGROUND ART

BACKGROUND ART

BACKGROUND ART

BACKGROUND ART

| SF = 2 | SF = sf |
|---|---|
| $C_{2,0} = (1, 1)$ <br> $C_{2,1} = (1, -1)$ | $C_{sf, 2^{(k+1)}} = (C_{sf/2, 2^k},\ C_{sf/2, 2^k})$ <br> $C_{sf, 2^{(k+1)}+1} = (C_{sf/2, 2^k},\ -C_{sf/2, 2^k})$ |

CHANNEL CODE ASSIGNMENT ACCORDING TO GAIN FACTOR

TECHNICAL FIELD

The present invention relates to, for example, CDMA (Code Division Multiple Access) and to assignment of Walsh codes. In particular, it relates to a way to assign channelization codes in the Uplink Enhancement.

BACKGROUND ART

With CDMA, a signal transmission is performed by spreading an input signal using channelization codes and scrambling codes. This ratio of bandwidths of a transmission signal and an input signal is called a spreading factor (SF) in CDMA. The channelization code is used for distinguishing a channel; the scrambling code is used for distinguishing a user.

In drawings explained below, the same numeral signs (for example, 100) are used for the same parts or corresponding parts. To differentiate each of the same parts or the corresponding parts, a sign consisting of a numeral sign and an alphabetical sign (for example, 100a, 100b) is used. FIG. 29 shows an explanatory drawing of a multiplexing transmission of uplink data channels when a communication apparatus described in 3GPP ($3^{rd}$ Generation Partnership Project) transmits data to a base station. At least one DPDCH (Dedicated Physical Data Channel), one DPCCH (Dedicated Physical Control Channel), a high-speed control channel for HS-DSCH (Dedicated Physical Control Channel for HS-DSCH (High Speed Downlink Shared Channel): HS-DPCCH) are multiplexed and transmission is carried out.

A communication apparatus of FIG. 29 shows a detailed configuration of a modulating unit 902 illustrated in FIG. 1, which processes IQ multiplexing of plural data channels and control channels of an I side and a Q side to generate a complex signal. FIG. 29 includes multipliers 100a through 100c at the I side and 100e through 100g at the Q side which multiply spread codes (channelization codes) $C_{d,1}$ through $C_{d,6}$ for separating channels to data of DPDCH1 through DPDCH6 which are data channels, a multiplier 100h at the Q side which multiplies a spread code $C_c$ for separating channels to control data of the control channel DPCCH, a multiplier 100d at the I side and a multiplier 100i at the Q side which multiply a spread code $C_{hs}$ for separating channels to control data of a newly added control channel HS-DPCCH. Further, multipliers 101a through 101c at the I side and 101e through 101g at the Q side which multiply an amplitude factor β d for DPDCHs to output signals from the multipliers 100a through 100c at the I side and multipliers 100e through 100g at the Q side are provided; a multiplier 101h which multiplies an amplitude factor β c for a DPCCH to output signals from the multiplier 100h at the Q side is provided; and multipliers 101d and 101i which multiplies an amplitude factor β hs for an HS-DPCCH to output signals from the multiplier 100d at the I side and the multiplier 100i at the Q side are provided. Yet further, an adder 102a for adding outputs signals from the multipliers 101a through 101d at the I side, an adder 102b for adding output signals from the multipliers 101e through 101i at the Q side, a multiplier 103 for multiplying an imaginary number j to an output signal from the adder 102b at the Q side, an adder 104 for carrying out a complex addition of outputs from the adder 102a at the I side and the multiplier 103 at the Q side, and a multiplier 105 for multiplying a scrambling code $S_{dpch,n}$ to an output signal from the adder 104 are included.

Next, an operation will be explained. To each channel, the multiplier 100 multiplies a channelization code $C_{SF,k}$. Here, SF shows a spreading factor, and k shows a code number. It is assumed that N is a multiplexing number. To multiplex N DPDCHs having the multiplexing number N(N≧2), channelization codes are determined for each channel as follows: The channelization code for a DPCCH is $C_{256,0}$. The channelization codes for an HS-DPCCH are $C_{256,1}$ (N=2, 4, 6) and $C_{256,32}$ (N=3, 5). The channelization code for $DPDCH_x$ ($DPDCH_x$: x is a channel number) is $C_{4,1}$ (x=1, 2), $C_{4,3}$ (x=3, 4), and $C_{4,2}$ (x=5, 6). Next, the multiplier 101 carries out weighing. β shows a weighing function, which is a gain factor whose weight varies according to a kind of channel. These are added by an accumulator (an adder 102). Then, the multiplier 103 and an adder 104 are used to make a transmission signal a complex number. Finally, the multiplier 105 multiplies it by a scrambling code $S_{dpch,n}$ to carry out transmission.

Transmission is carried out using HPSK (Hybrid Phase Shift Keying) modulation in 3GPP. In HPSK modulation, a signal output from a configuration shown in FIG. 30 is used as the scrambling code. $W_0$ and $W_1$ have repeated patterns of $W_0=[1,1]$ and $W_1=[1,-1]$, respectively, and are referred to as Walsh Rotators. $C_{long,1,n}$ and $C_{long,2,n}$ are Gold Sequences having different phases, respectively. First, a decimating unit 200 decimates an even-numbered chip of $C_{long,2,n}$, and an odd-numbered chip that is located directly before is inserted instead of the decimated chip. Next, the multiplier 201 multiplies a signal output from the decimating unit 200 and $W_1$. Then, it is made to be a complex number by the multiplier 202 and the adder 203. Finally, $C_{long,1,n}$ is multiplied by the multiplier 204. At this time, as a complex signal input to the multiplier 204, a complex number is input to an even-numbered chip which is conjugate with an odd-numbered chip. By multiplying an output scrambling code $S_{dpch,n}$ to this signal, a phase variation from an odd-numbered chip to an even-numbered chip always becomes 90 degrees when the signal input to the multiplier 105, that is, multiplexed signal, has the same phase continuously.

FIG. 31 shows a tracking of the transmitted chip on a complex plane. A phase of the chip in this explanation means a phase of a point on the complex plane as shown in FIG. 31, and a phase variation means a variation of phase angles during a transition among the chips. As shown in the figure, when the phase variation is 0 degrees or 180 degrees, a peak value of an amplitude becomes large because of overshoot, which affects an amplifier badly. Further, it is understood that when the phase variation is 90 degrees, the peak does not increase and the phase variation is ideal. Accordingly, when it is considered that the phase rotates by 90 degrees by the scrambling code, the phase variation from an odd-numbered chip to an even-numbered chip is desired to be 0 degrees or 180 degrees at a stage of multiplexing the data channels before applying the scrambling code. A method to resolve the overshoot using only the channelization code $C_{SF,k}$ of which $0 \leq k \leq SF/2-1$ or only the channelization code $C_{SF,k}$ of which $(SF/2) \leq k \leq (SF-1)$ is disclosed in JP2002-33716 as a code assignment method in consideration of the phase variation from an odd-numbered chip to an even-numbered chip.

JP2002-33716 (Patent document 1) notices that SF is 4 and selects a combination so that the phase variations both from the first chip to the second chip and from the third chip to the fourth chip should be 0 degrees or 180 degrees when one piece of data is spread. Further, this patent document 1 assumes that, by using that the gain factor of a DPCCH is very small, the DPCCH does not affect the phase variation. FIG. 32 shows a case of using only the channelization code $C_{4,k}$ of which $0 \leq k \leq 1$ when the number of multiplexed DPDCHs is three. FIG. 33 shows a case of using only the channelization code $C_{4,k}$ of which $2 \leq k \leq 3$ when the number of multiplexed DPDCHs is three, and FIG. 34 shows a case in which the number of multiplexed DPDCHs is four. When $C_{4,2}$ is assigned to DPDCH$_1$, $C_{4,2}$ is assigned to DPDCH$_2$, and $C_{4,3}$ is assigned to DPDCH$_3$ as shown in FIG. 33, chips output from the IQ become as follows:

$$I=(2,-2,0,0)$$

$$Q=(1,-1,1,-1)$$

Here, the phase variation from the first chip to the second chip is 180 degrees, and the phase variation from the third chip to the fourth chip is also 180 degrees. Accordingly, this assignment of the channelization codes is ideal.

This method, however, can use only one of combinations of the channelization $C_{4,0}$ and $C_{4,1}$, or the channelization codes $C_{4,2}$ and $C_{4,3}$, so that this method cannot be applied to a case in which the number of multiplexed DPDCHs is at least five. Further, only one of the combinations of $C_{4,0}$ and $C_{4,1}$ and $C_{4,2}$ and $C_{4,3}$ can be used, only a case when the phase variation is 0 degrees or 180 degrees is considered. Accordingly, when the phase variation does not become 0 degrees or 180 degrees, it is not considered how much the phase variation should be set. Further, since only a DPCCH and a DPDCH are considered, there is a problem that the method cannot be applied to a case including another channel such as an HS-DPCCH. For example, it is assumed that an HS-DPCCH having the gain whose magnitude is the same as a DPDCH is added to the example of FIG. 33. In case of the number of multiplexing N=3, since the channelization code for the HS-DPCCH is $C_{256,32}$, (1, 1, 1, 1) or (−1, −1, −1, −1) is input, when it is considered by 4-chip unit. For example, in case of (1, 1, 1, 1), chips output from the IQ become:

$$I=(2,-2,0,0)$$

$$Q=(1,-1,1,-1)+(1,1,1,1)=(2,0,2,0)$$

The phase variation from the first chip to the second chip is 135 degrees and the phase variation from the third chip to the fourth chip is not known, since it passes the point of origin. As a result, it cannot be said that the channelization codes are assigned optimally.

In the next specification, Release 6 (Rel-6), introduction of uplink enhancement is considered. In the uplink enhancement, other than the conventional transport channel DCH (Dedicated Channel), E-DCH (Enhanced Dedicated Channel) is also superimposed on a DPDCH. Further, it has been considered to introduce an E-DPCCH (Enhanced DPCCH). FIGS. 35 and 36 show examples of multiplexing transmission of uplink data channels in the uplink enhancement. A broken line in the figure shows that the transmission may not exist depending on the number of multiplexed channels. In FIG. 35, DPDCHs superimpose DCH or E-DCH, and an E-DPCCH is treated as one control channel. Further, only for DPDCH$_1$ it is determined that DCH is superimposed on it. Further, in FIG. 36, multiplexing is done so that DCH, E-DCH, and E-DPCCH are superimposed only on DPDCH$_1$, and DCH and E-DCH are superimposed on other DPDCHs. Besides, various ways of multiplexing are proposed. Here, since the data amount of a DPDCH that superimposes E-DCH or an E-DPCCH is large, their gain factor becomes larger than that of a DPDCH that superimposes only DCH.

Patent Document 1: JP2002-33716

Non-patent Document 1: 3GPP Technical Report TR25.896 v1.2.1

DISCLOSURE OF THE INVENTION

Problems to be Solved by the Invention

The conventional assignment of channelization codes for a data channel has a problem that PAR (Peak to Average Ratio) is increased because of overshoot due to HPSK (Hybrid Phase Shift Keying) modulation. As a method to resolve this, JP2002-33716 discloses a method in which a phase variation from the first chip to the second chip and a phase variation from the third chip to the fourth chip are observed, and codes are assigned so that these phase variations should be 0 degrees or 180 degrees that is an ideal phase variation in HPSK modulation. However, when the number of multiplexing is at least five for DPDCHs, there is no channelization code to be assigned, so that the method cannot be applied to such a case. Further, only a case is considered when the phase variation is 0 degrees or 180 degrees. Therefore, it is not considered how much the phase variation should be when the phase variation does not become 0 degrees or 180 degrees. Further, there is a problem that only a case with two kinds of channels of a DPDCH and a DPCCH are considered, so that the method cannot be applied to a case including other channels, for example, an HS-DPCCH.

The present invention aims to propose a way to assign channelization codes when the number of multiplexed data channels is plural and the gain factors are different.

In particular, in uplink enhancement, it is an object to propose a way to assign the channelization codes to the data channels having different gain factors.

Further, the present invention aims to propose a way to assign the channelization codes that is adaptive to HSDPA (High Speed Downlink Packet Access).

Yet further, it is an object to propose a way to assign the channelization codes, which is effective to cases that an HS-DPCCH is at the I side, at the Q side, alternatively at I and Q sides depending on the number of multiplexed data channels, or there is no HS-DPCCH.

Further, it is an object to propose an effective way of assignment, in particular, when the number of multiplexed data channels is at least five.

Further, it is an object to propose a way which is adaptive to both cases when assignment of the channelization codes is determined based on the number of multiplexing and performance of the data channels and maintained to the end and when assignment of the channelization codes is determined for each frame.

Means to Solve the Problems

A communication apparatus according to the present invention has a controlling unit for controlling assignment of channelization codes, and the controlling unit includes:

a code combination creating unit for creating a plurality of combinations of the channelization codes;

an inter-chip phase variation calculating unit for calculating each phase variation among a plurality of chips for each combination of the channelization codes created by the code combination creating unit;

a code combination determining unit for obtaining by calculation a combination of channelization codes of which a sum of overshoot generated by each phase variation among a plurality of chips calculated by the inter-chip phase variation calculating unit is small, and determining an obtained combination as a combination of codes to be used; and a code assignment instructing unit for instructing assignment of the channelization codes based on the combination of codes determined by the code combination determining unit.

The inter-chip phase variation calculating unit obtains a phase variation between a first chip and a second chip and a phase variation between a third chip and a fourth chip, and the code combination determining unit determines a combination of channelization codes of which the phase variation between the first chip and the second chip and the phase variation between the third chip and the fourth chip are respectively close to 0 degrees or 180 degrees as the combination of codes to be used.

The inter-chip phase variation calculating unit obtains a phase variation $\alpha$ between a first chip and a second chip of an I channel and a Q channel and a phase variation $\beta$ between a third chip and a fourth chip of the I channel and the Q channel; and the code combination determining unit determines a combination of channelization codes of which a sum of a square of $\sin(\alpha)$ and a square of $\sin(\beta)$ is smallest as the combination of codes to be used.

A communication apparatus according to the present invention includes:

an IQ multiplexing unit for multiplexing a plurality of data channels and a control channel at an I side and a Q side to generate a complex signal;

a transmitting unit for modulating and transmitting the complex signal generated by the IQ multiplexing unit; and a controlling unit for controlling assignment of channelization codes for a data channel and a control channel at the I side and the Q side multiplexed by the IQ multiplexing unit; and the controlling unit includes:

a code assigning unit by factor for, based on a size of a factor that is multiplied to the data channel and the control channel by the IQ multiplexing unit, assigning a first channelization code to a data channel of which the factor is large; and a remaining code assigning unit for assigning a second channelization code being different from the first channelization code to a data channel to which no channelization code has been assigned by the code assigning unit by factor.

The code assigning unit by factor includes a prohibited code judging unit for, when a second control channel is added as a control channel, judging which of the I side or the Q side of the IQ multiplexing unit the second control channel is added, and, at the I side or the Q side to which the second control channel is added, prohibiting assignment of a channelization code that has a correlation with a channelization code to be assigned to the second control channel.

The factor is a gain factor; and the controlling unit, when a number of data channels multiplexed by the IQ multiplexing unit is five, among three data channels at the I side of the IQ multiplexing unit, assigns $C_{4,2}$ and $C_{4,3}$ respectively as channelization codes to two data channels having largest gain factors and assigns either $C_{4,1}$ or $C_{4,0}$ to a remaining one data channel.

The factor is a gain factor; and the controlling unit, when a number of data channels multiplexed by the IQ multiplexing unit is six, among three data channels at the I side of the IQ multiplexing unit, assigns $C_{4,2}$ and $C_{4,3}$ respectively as channelization codes to two data channels having largest gain factors and assigns $C_{4,1}$ to a remaining one data channel, and among three data channels at the Q side of the IQ multiplexing unit, assigns $C_{4,2}$ and $C_{4,3}$ respectively as channelization codes to two data channels having largest gain factors and assigns either $C_{4,1}$ or $C_{4,0}$ to a remaining one data channel.

The controlling unit controls assignment of channelization code $C_{SF,k}$ of which a spreading factor is SF and a code number is k, assigns a channelization code of which the code number k is $0 \leq k \leq (SF/2-1)$ as the first channelization code, and assigns a channelization code of which the code number k is $(SF/2) \leq k \leq (SF-1)$ as the second channelization code.

The controlling unit controls assignment of channelization code $C_{SF,k}$ of which a spreading factor is SF and a code number is k, assigns a channelization code of which the code number k is $0 \leq k \leq (SF/2-1)$ as the second channelization code, and assigns a channelization code of which the code number k is $(SF/2) \leq k \leq (SF-1)$ as the first channelization code.

The controlling unit, in case of assigning channelization codes to a data channel of which the spreading factor SF is 2 and to a data channel of which the spreading factor SF is 4, assigns $C_{2,0}$ to the data channel of which the spreading factor SF is 2 as the first channelization code and assigns $C_{4,2}$ or $C_{4,3}$ to the data channel of which the spreading factor SF is 4 as the second channelization code.

The controlling unit, in case of assigning channelization codes to a data channel of which the spreading factor SF is 2 and to a data channel of which the spreading factor is 4, assigns $C_{2,1}$ to the data channel of which the spreading factor SF is 2 as the first channelization code and assigns $C_{4,0}$ or $C_{4,1}$ to the data channel of which the spreading factor SF is 4 as the second channelization code.

A communication apparatus according to the present invention includes:

an IQ multiplexing unit for multiplexing a plurality of data channels and a control channel at an I side and a Q side to generate a complex signal;

a transmitting unit for modulating and transmitting the complex signal generated by the IQ multiplexing unit; and a controlling unit for controlling assignment of channelization codes for a data channel and a control channel at the I side and the Q side multiplexed by the IQ multiplexing unit; and the controlling unit includes:

a code assigning unit by data amount for, out of data channels multiplexed by the IQ multiplexing unit, judging a data channel of which data amount is large, and assigning a first channelization code to the data channel of which data amount is large; and a remaining code assigning unit for assigning a second channelization code being different from the first channelization code to a data channel to which no channelization code has been assigned by the code assigning unit by data amount.

The code assigning unit by data amount includes a prohibited code judging unit for, when a second control channel is added as a control channel, judging which of the I side or the Q side of the IQ multiplexing unit the second control channel is added, and, at the I side or the Q side to which the second control channel is added, prohibiting assignment of a channelization code that has a correlation with a channelization code which is to be assigned to the second control channel.

The code assigning unit by data amount, out of the plurality of data channels at the I side and the Q side of the IQ multiplexing unit, judges a data channel of which a number of multiplexing is large as the data channel of which data amount is large rather than a data channel of which a number of multiplexing is small.

The controlling unit, when a number of data channels multiplexed by the IQ multiplexing unit is five, among three data channels at the I side of the IQ multiplexing unit, assigns $C_{4,2}$ and $C_{4,3}$ respectively as channelization codes to two data channels having largest data amount, and assigns either $C_{4,1}$ or $C_{4,0}$ to a remaining one data channel, and assigns $C_{4,2}$ and $C_{4,3}$ respectively as channelization codes to two data channels at the Q side of the IQ multiplexing unit.

The controlling unit, when a number of data channels multiplexed by the IQ multiplexing unit is six, among three data channels at the I side of the IQ multiplexing unit, assigns $C_{4,2}$ and $C_{4,3}$ respectively as channelization codes to two data channels having largest data amount, and assigns either $C_{4,1}$ or $C_{4,0}$ to a remaining one data channel, and among three data channels at the Q side of the IQ multiplexing unit, assigns $C_{4,2}$ and $C_{4,3}$ respectively as channelization codes to two data channels having largest data amount and assigns $C_{4,1}$ to a remaining one data channel.

EFFECT OF THE INVENTION

The present invention enables to automatically determine by calculation a combination of channelization codes with which the overshoot is small.

PREFERRED EMBODIMENTS FOR CARRYING OUT THE INVENTION

Data channels discussed in the following embodiments show a DPDCH and an E-DPCCH. Further, for a DPDCH discussed in the following embodiments, cases in which DCH is superimposed, E-DCH is superimposed, E-DPCCH is superimposed, HS-DPCCH is superimposed, multiple channels of DCH, E-DCH, E-DPCCH, and HS-DPCCH are multiplexed and superimposed are considered.

Data channels having different gain factors mean both or one of channels when kinds of the channels are different such as a DPDCH and an E-DPCCH; and when performance of the channels are different depending on channels (in this case, DCH or E-DCH) superimposed on a certain channel (a DPDCH, for example) such as a DPDCH superimposing DCH and a DPDCH superimposing E-DCH.

A gain factor is an example of factors. The factors can be the gain factor itself and also values to be multiplied to the gain factor. In the following, the gain factor is also referred to as a.

Embodiment 1

Figure 1:
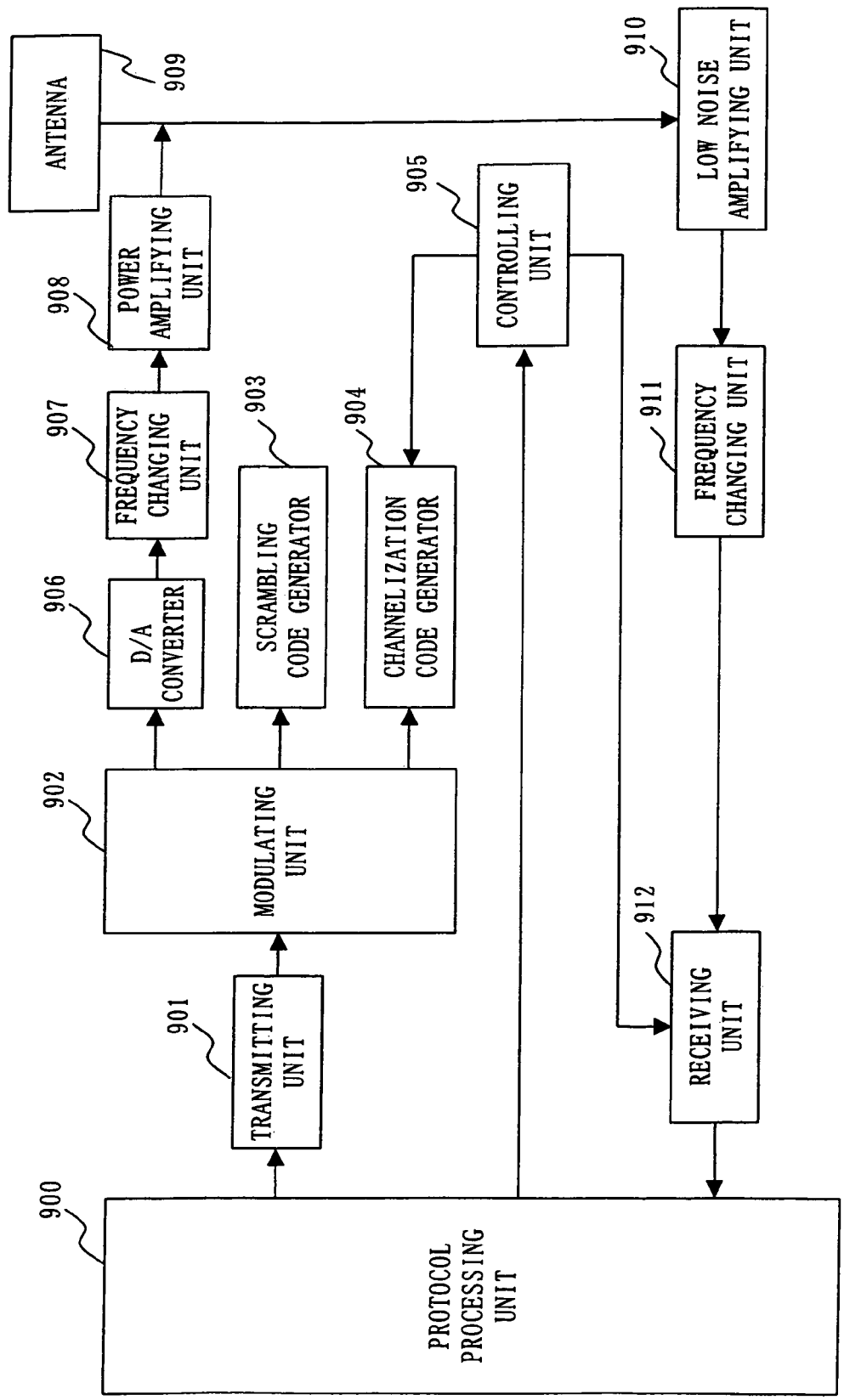
FIG. 1 shows a configuration of a CDMA terminal according to the first embodiment.
Figure 29:
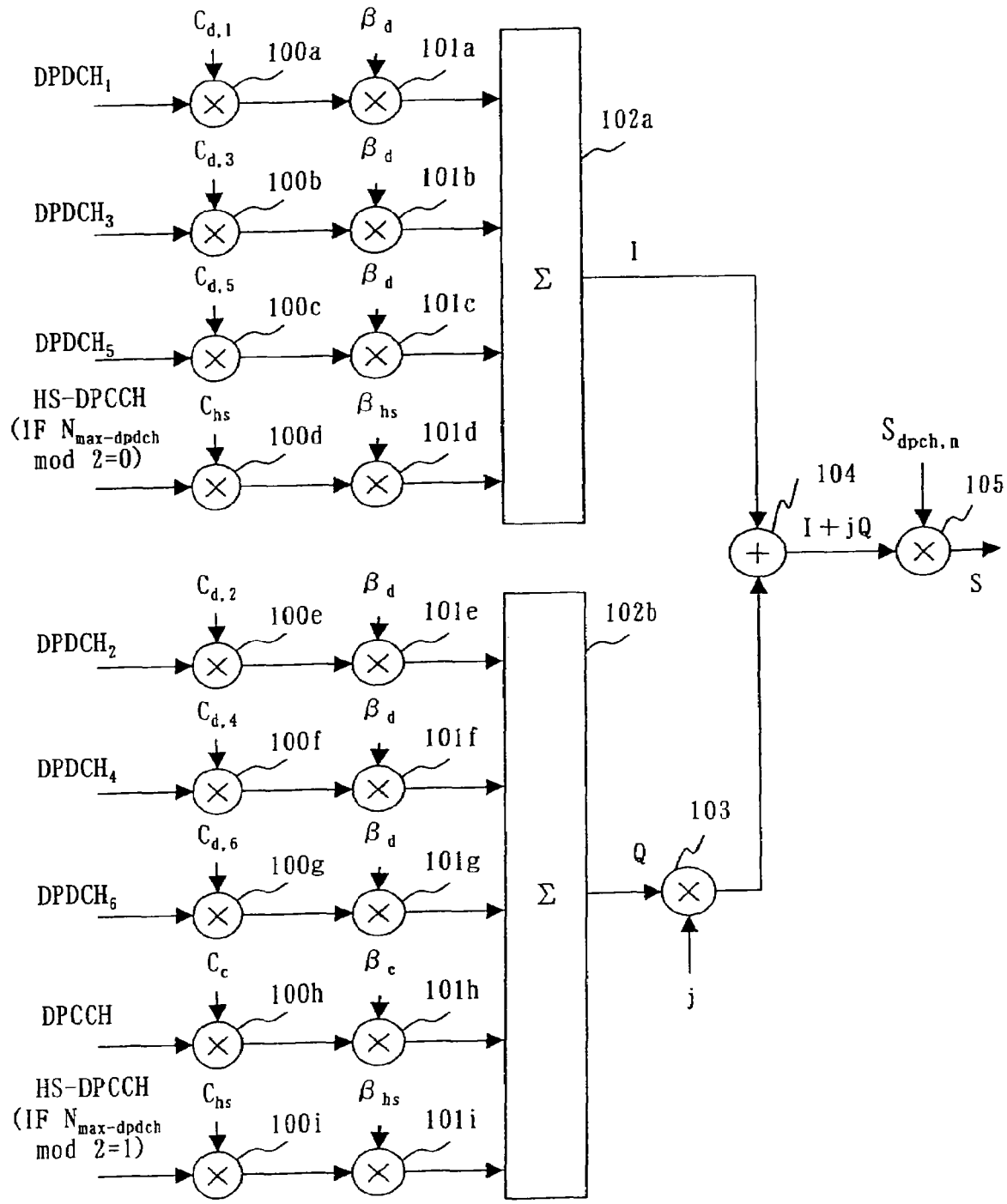
FIG. 29 shows a configuration of data channel multiplex transmission described in 3GPP.
Figure 30:
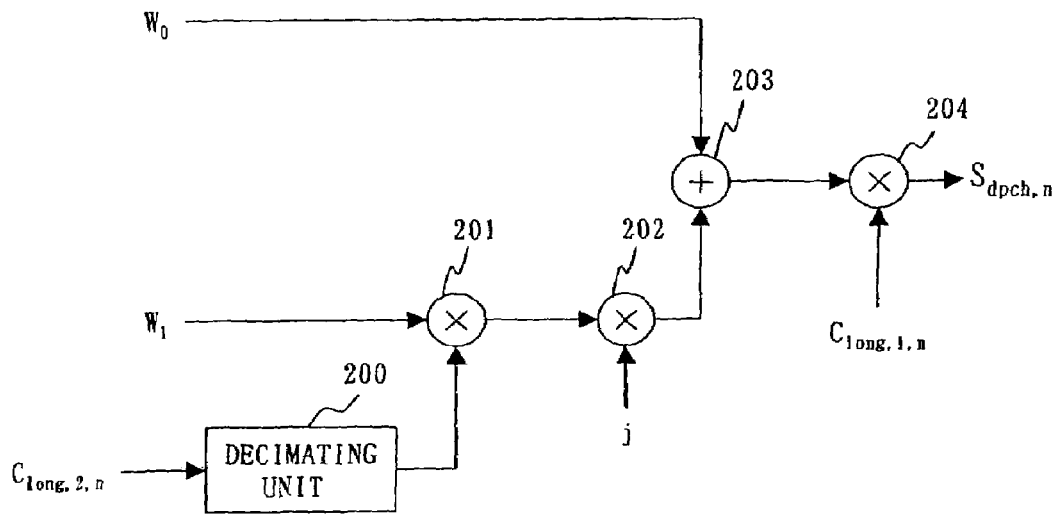
FIG. 30 shows a configuration for creating a scrambling code in HPSK modulation.
Figure 31:
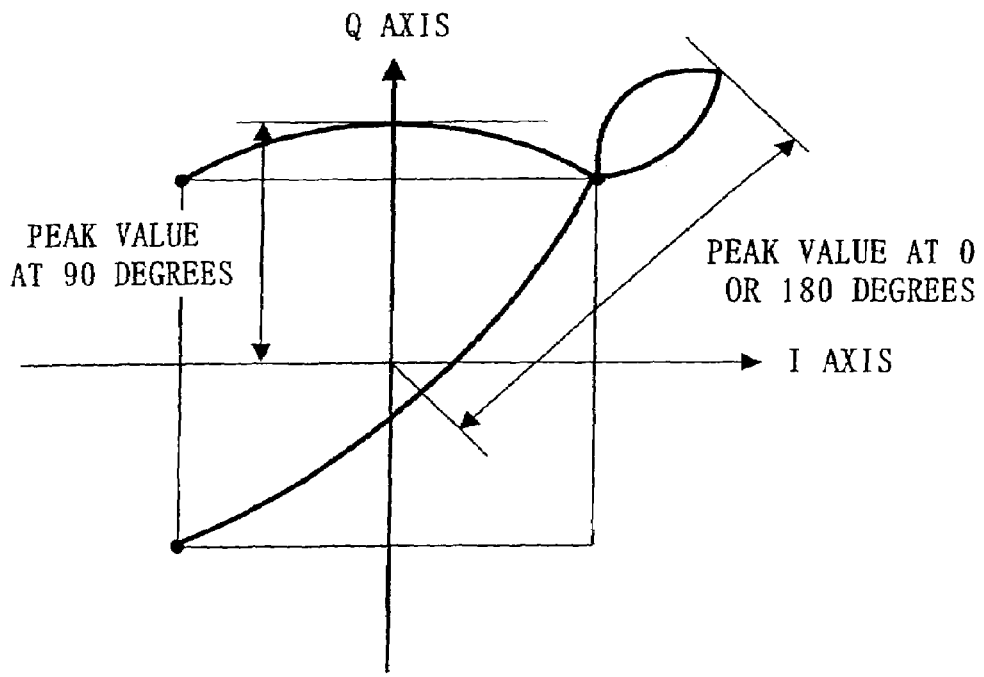
FIG. 31 is a diagram showing a phase variation of a chip on a complex plane.
Figure 32:
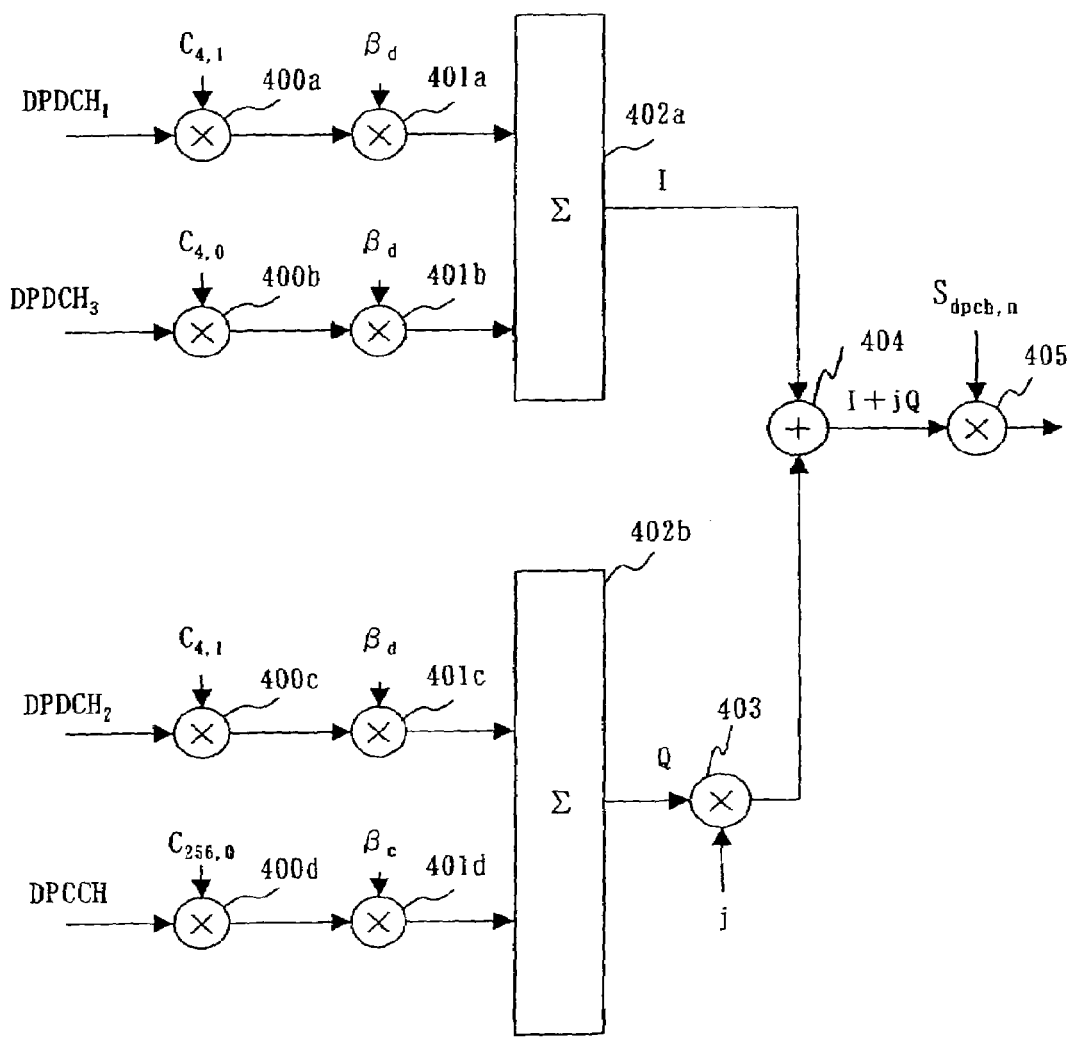
FIG. 32 shows an example of assignment using only a channelization code C4,2 or C4,1 when the number N of multiplexing of DPDCHs is 3 according to a conventional method.
Figure 33:
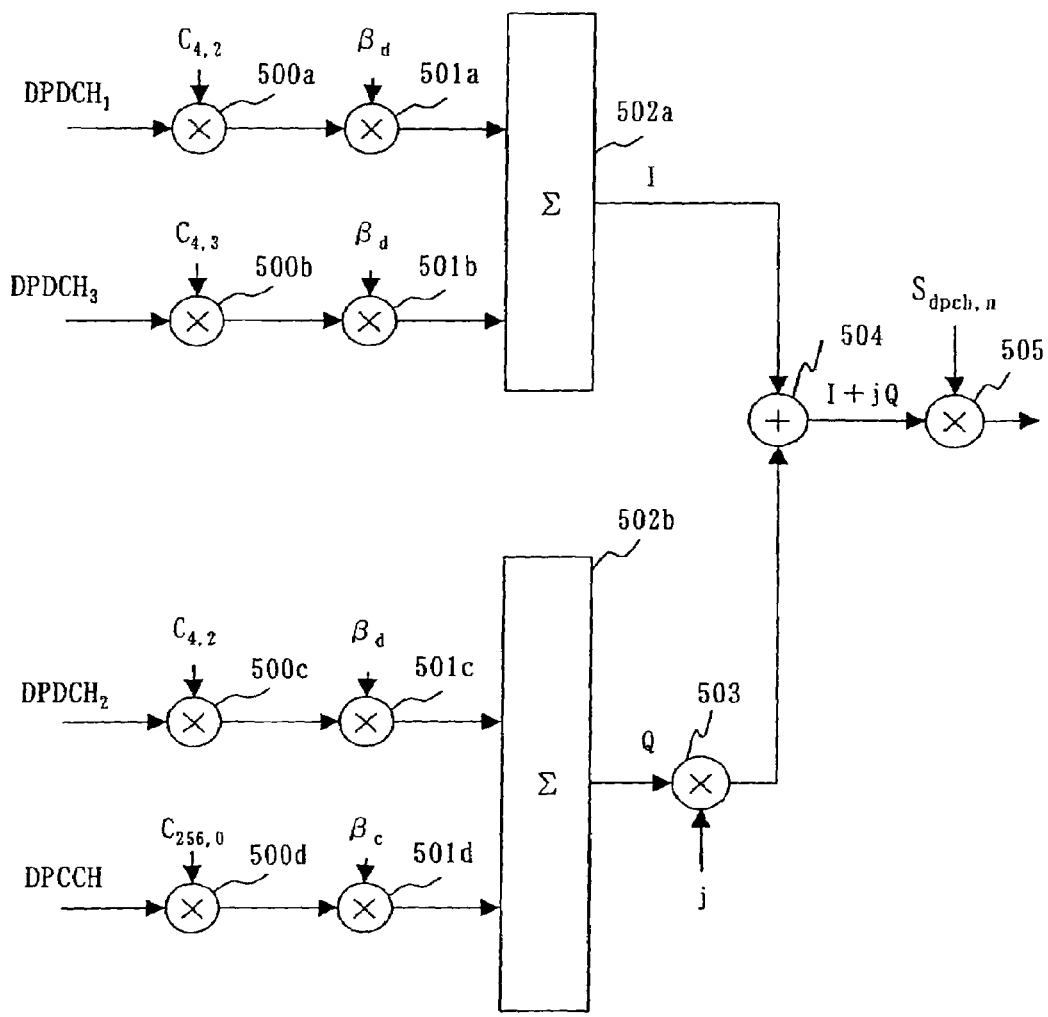
FIG. 33 shows an example of assignment using only a channelization code C4,2 or C4,3 when the number N of multiplexing of DPDCHs is 3 according to a conventional method.
Figure 34:
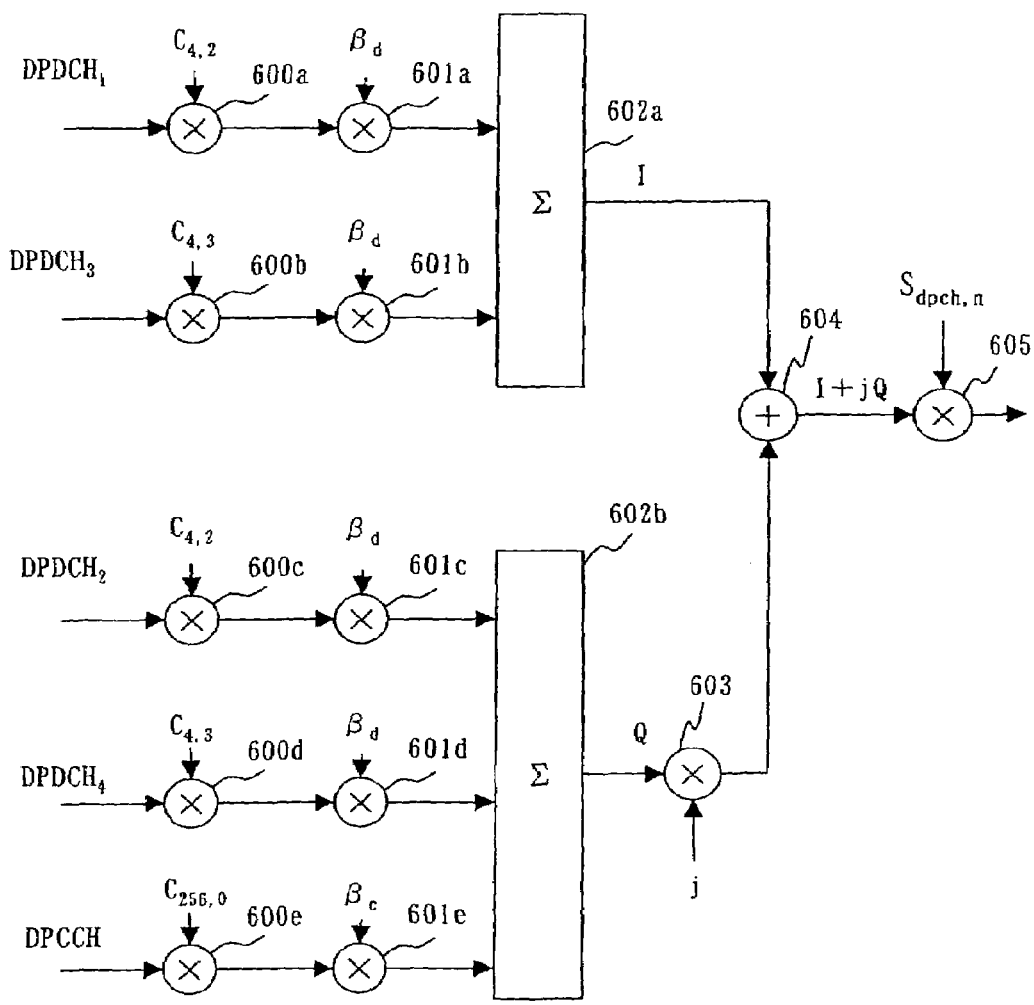
FIG. 34 shows an example of assignment of channelization codes when the number N of multiplexing of DPDCHs is 4 according to a conventional method.
Figure 35:
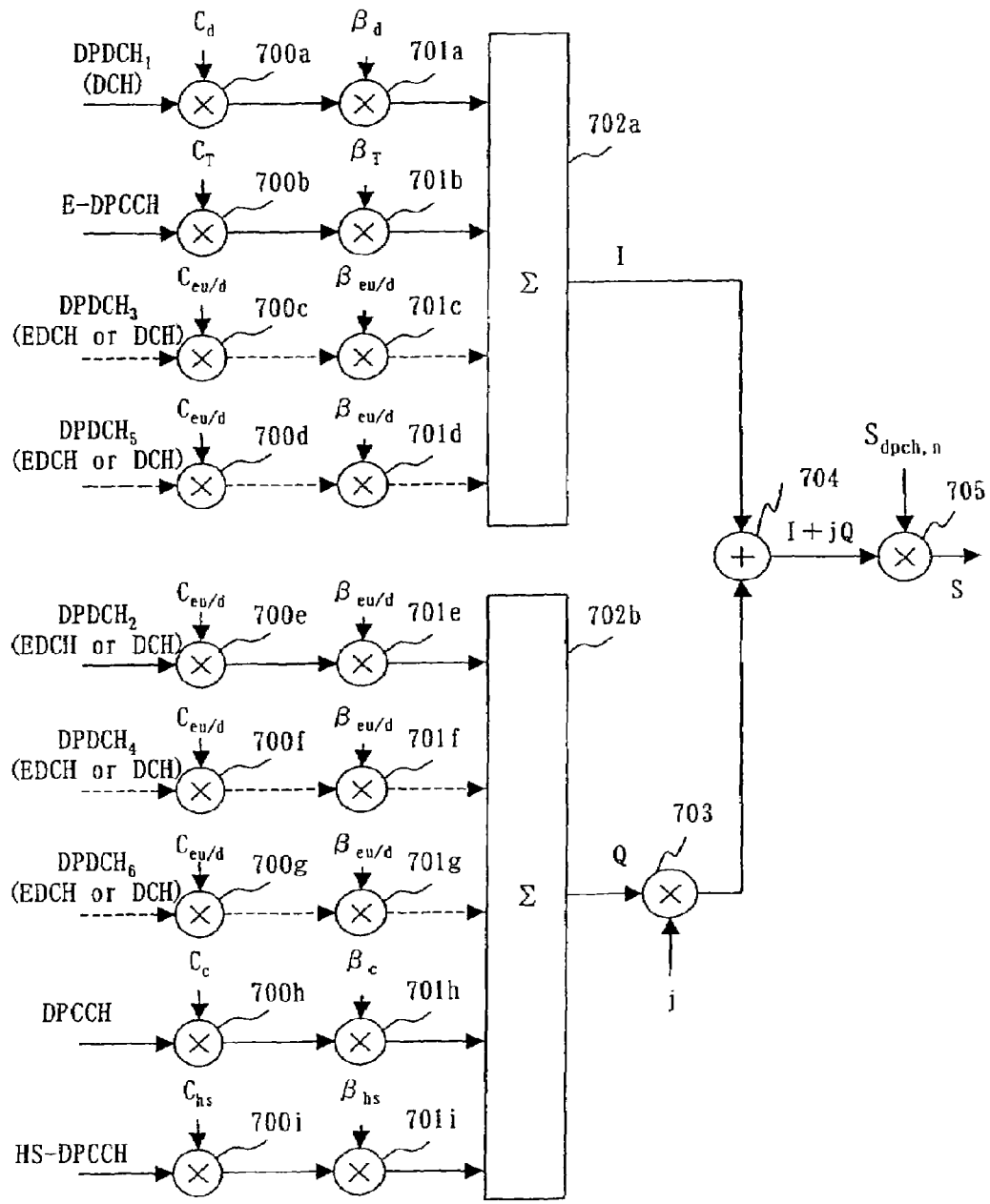
FIG. 35 shows a configuration of data channel multiplex transmission in uplink enhancement (case 1).
Figure 36:
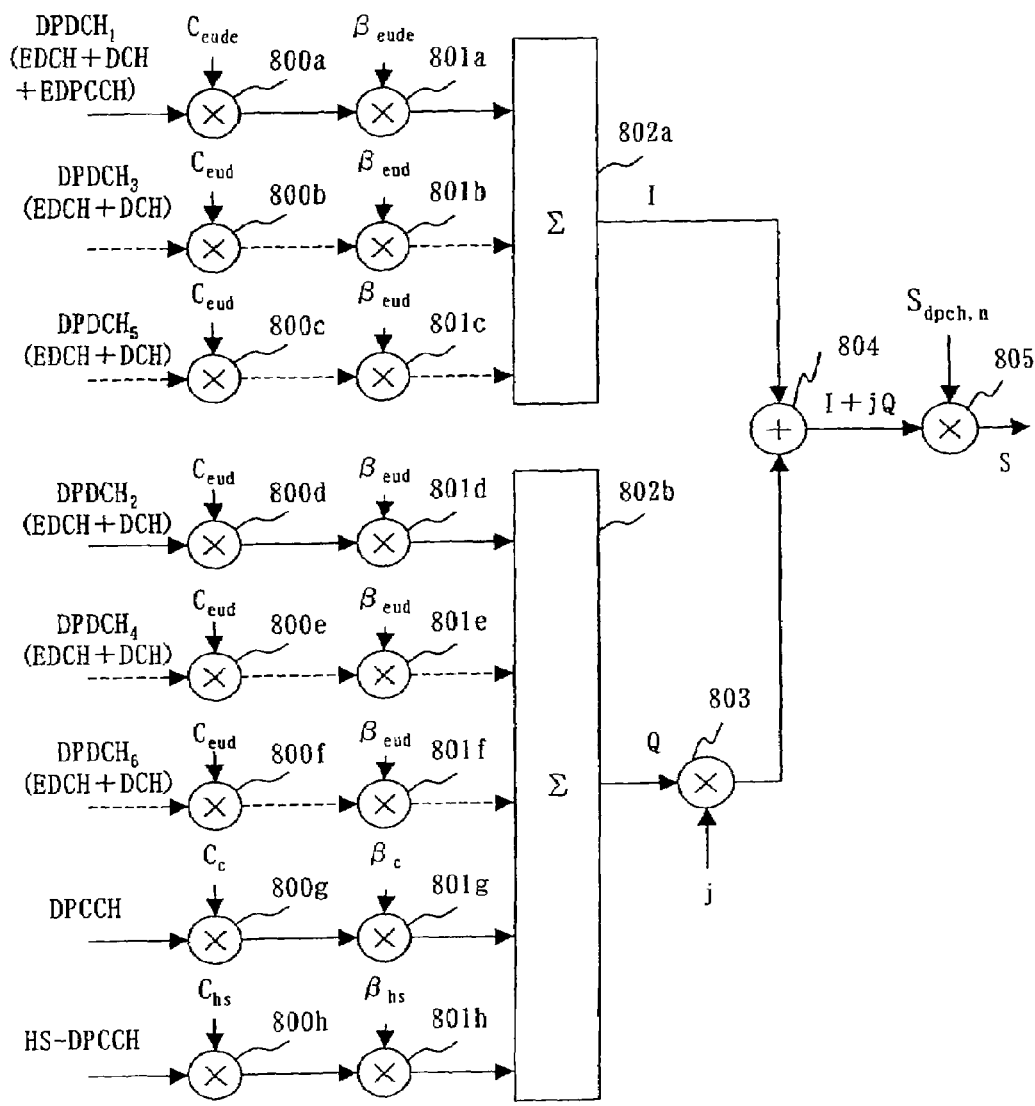
FIG. 36 shows a configuration of data channel multiplex transmission in uplink enhancement (case 2).

FIG. 1 shows a CDMA terminal (a communication apparatus such as a cellular phone) according to the present embodiment. At a transmitting side, a protocol processing unit 900 sets a transmission channel. Next, a transmitting unit 901 performs a process of the transmission channel. And then, a modulating unit 902 carries out multiplexing and spreading of codes using a scrambling code generator 903 and a channelization code generator 904 as shown in FIG. 29. A controlling unit 905 sets channelization codes output from the channelization code generator 904. A signal modulated by the modulating unit 902 is converted into an analog signal by a digital/analog (D/A) converter 906, changed into an RF (Radio Frequency) signal by a frequency changing unit 907, amplified to desired electric power by a power amplifying unit 908, and transmitted via an antenna 909. At a receiving side, a feeble signal received by the antenna 909 is amplified by a low noise amplifying unit 910, changed to a base-band signal by a frequency changing unit 911, demodulated by a receiving unit 912, and transferred to the protocol processing unit 900.

Figure 2:
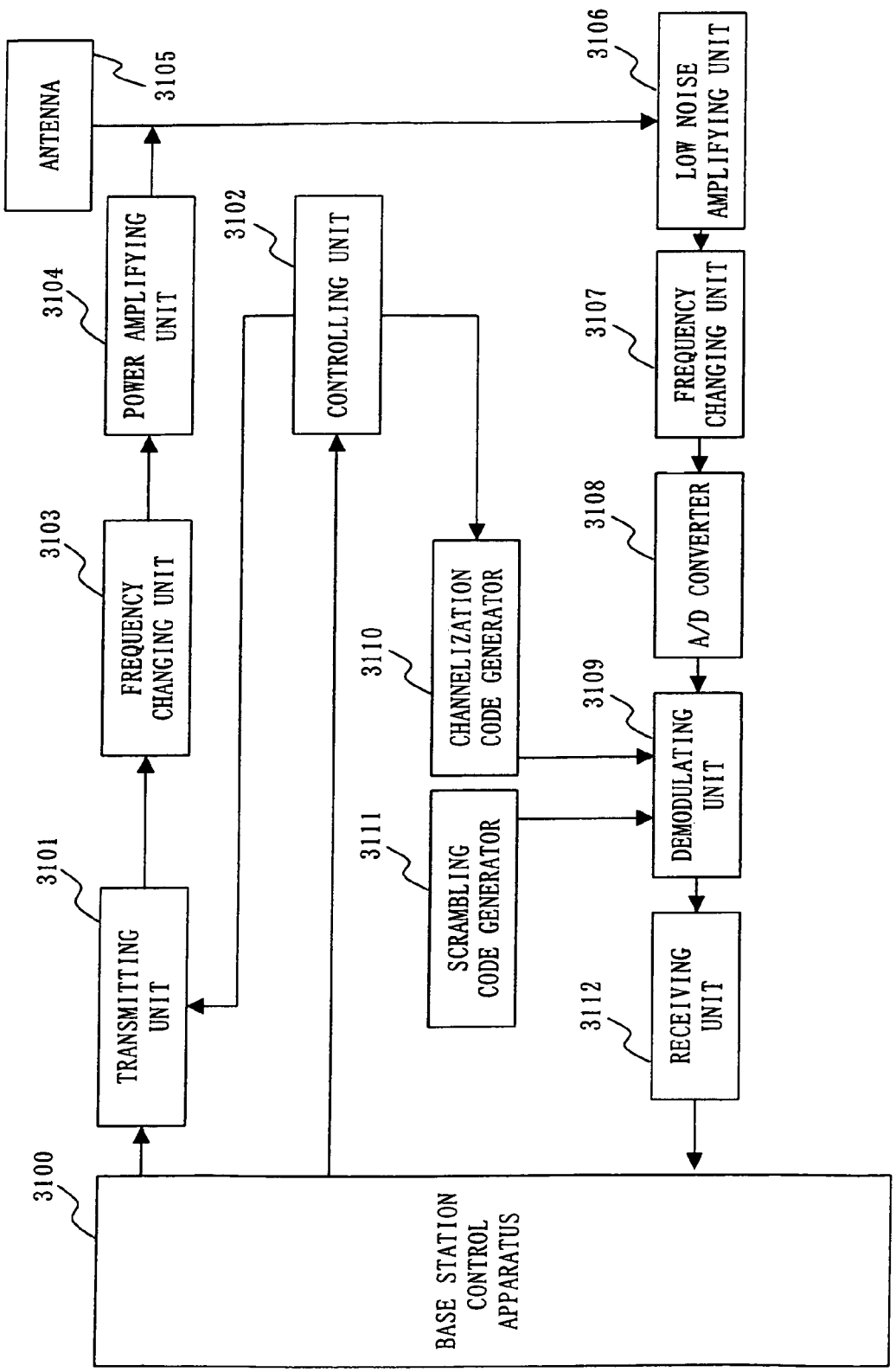
FIG. 2 shows a configuration of a CDMA base station.

FIG. 2 shows a CDMA base station (Node-B) which transmits/receives data to/from a CDMA terminal in the present embodiment. At the transmitting side, a signal to be transmitted is transferred from a base station controlling apparatus 3100 to a transmitting unit 3101, the signal is modulated in the transmitting unit 3101, changed into an RF (Radio Frequency) signal by a frequency changing unit 3103, amplified to desired electric power by a power amplifying unit 3104, and transmitted from an antenna 3105. At the receiving side, a feeble signal received at the antenna 3105 is amplified by a low noise amplifying unit 3106, changed into a base-band signal by a frequency changing unit 3107, and converted into a digital signal by an analog/digital (A/D) converter 3108. And then, in a demodulating unit 3109, demodulation is carried out using a channelization code generator 3110 and a scrambling code generator 3111. A controlling unit 3102 sets channelization codes output from the channelization code generator 3110. And then, in a receiving unit 3112, decoding is carried out by the channel, and the decoded signal is transferred to the base station controlling apparatus 3100.

Figure 3:
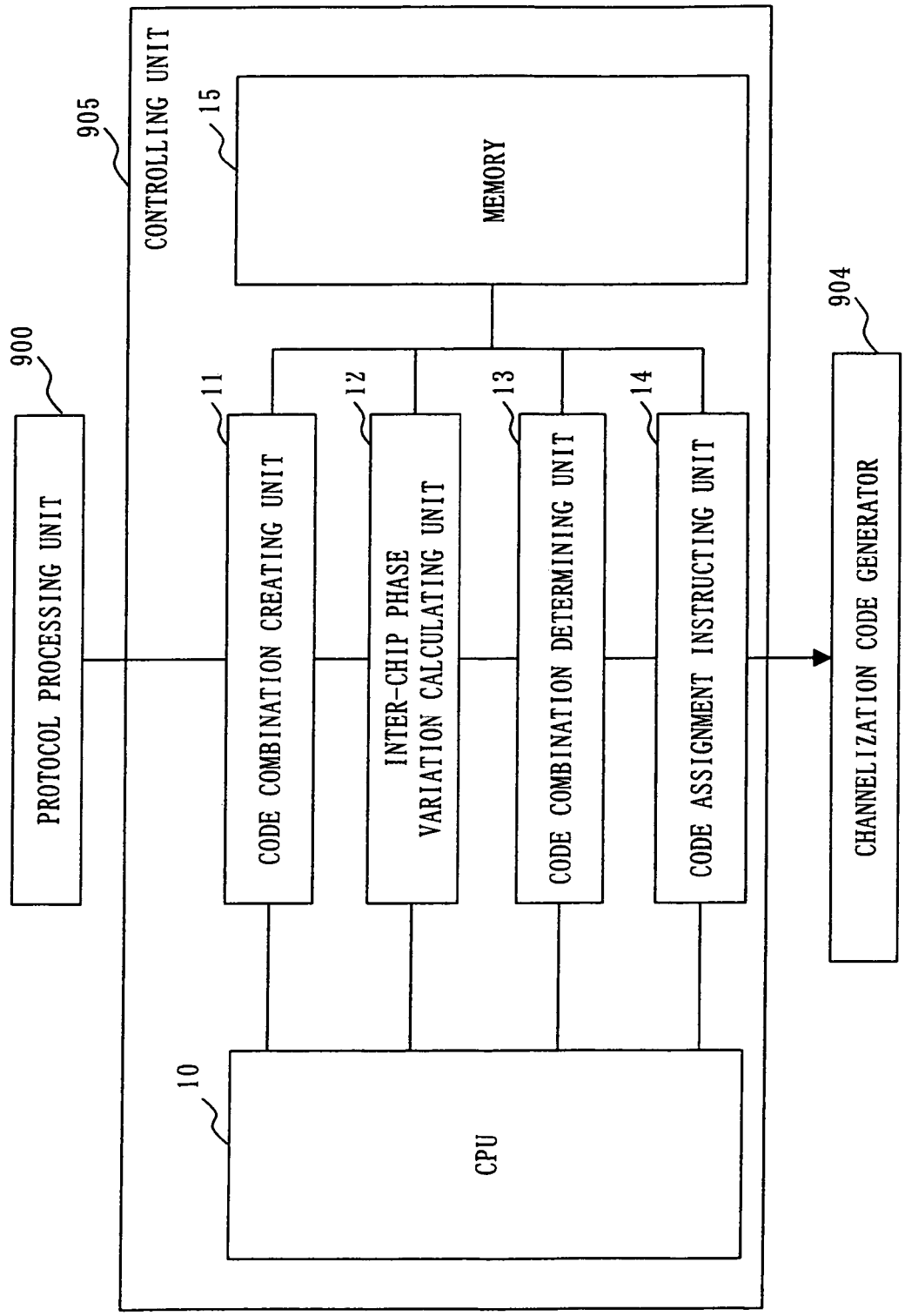
FIG. 3 shows a configuration of a CDMA controlling unit according to the first embodiment.

FIG. 3 is a block diagram showing a controlling unit 905 (or the controlling unit 3102; this is the same hereinafter) provided at a communication apparatus according to the first embodiment of the invention. The controlling unit 905 inputs information necessary to assign the channels. For example, the number, the kind, the performance, and the gain factors, etc. of channels to be multiplexed to channels of I, Q are input. The controlling unit 905 includes a CPU (central processing unit) 10. The CPU 10 controls an operation of the controlling unit 905 and is connected to each unit with buses to implement an operation of each part or allows each part to implement the operation. Further, the CPU 10 is connected to a memory 15 via a bus. The memory 15 is, for example, a ROM (Read Only Memory), a RAM (Random Access Memory), an FDD (Flexible Disk Drive), a CDD (Compact Disk Drive), a magnetic disk drive, an optical disk drive, and so on. A RAM is an example of volatile memories. A ROM, an FDD, a CDD, a magnetic disk drive, and an optical disk drive are examples of non-volatile memories.

Data and information handled by each part of the controlling unit 905 shown in FIG. 3 are stored in the memory 15 and recorded and read by each part of the controlling unit 905. Further, an operating system (OS), a window system, a group of programs, a group of files (database) are stored in the memory 15. The group of programs is executed by a CPU, an OS, and the window system. Each part of the controlling unit 905 can be configured partly or entirely by programs which can operate on a computer. Or it can be implemented in a firmware stored in a ROM. Or it can be implemented in software, hardware, or a combination of software, hardware, and firmware. In the group of programs, programs that make the CPU implement processing which are explained in the explanation of embodiment as "—unit" are stored.

Each part of the controlling unit 905 will be explained. The controlling unit 905 includes a code combination creating unit 11 that creates all possible combinations of the channelization codes. Further, the controlling unit 905 includes an inter-chip phase variation calculating unit 12 that calculates each phase variation between a plurality of chips. Further, the controlling unit 905 includes a code combination determining unit 13 that obtains a combination of the channelization codes of which a sum of overshoot generated by each phase variation between the plurality of chips that is calculated by the inter-chip phase variation calculating unit 12, is small by a calculation to determine as a combination of codes for use. Further, the controlling unit 905 includes a code assignment instructing unit 14 that instructs the assignment of the channelization codes to the channelization code generator 904 based on the combination of codes determined by the code combination determining unit 13. The inter-chip phase variation calculating unit 12 obtains phase variations between the first and second chips and the third and fourth chips, respectively. Further, the code combination determining unit 13 determines a combination of codes in which the phase variation between the first and second chips and that of the third and fourth chips are close to 0 degrees or 180 degrees, respectively, as the combination of codes for use.

Figure 4:
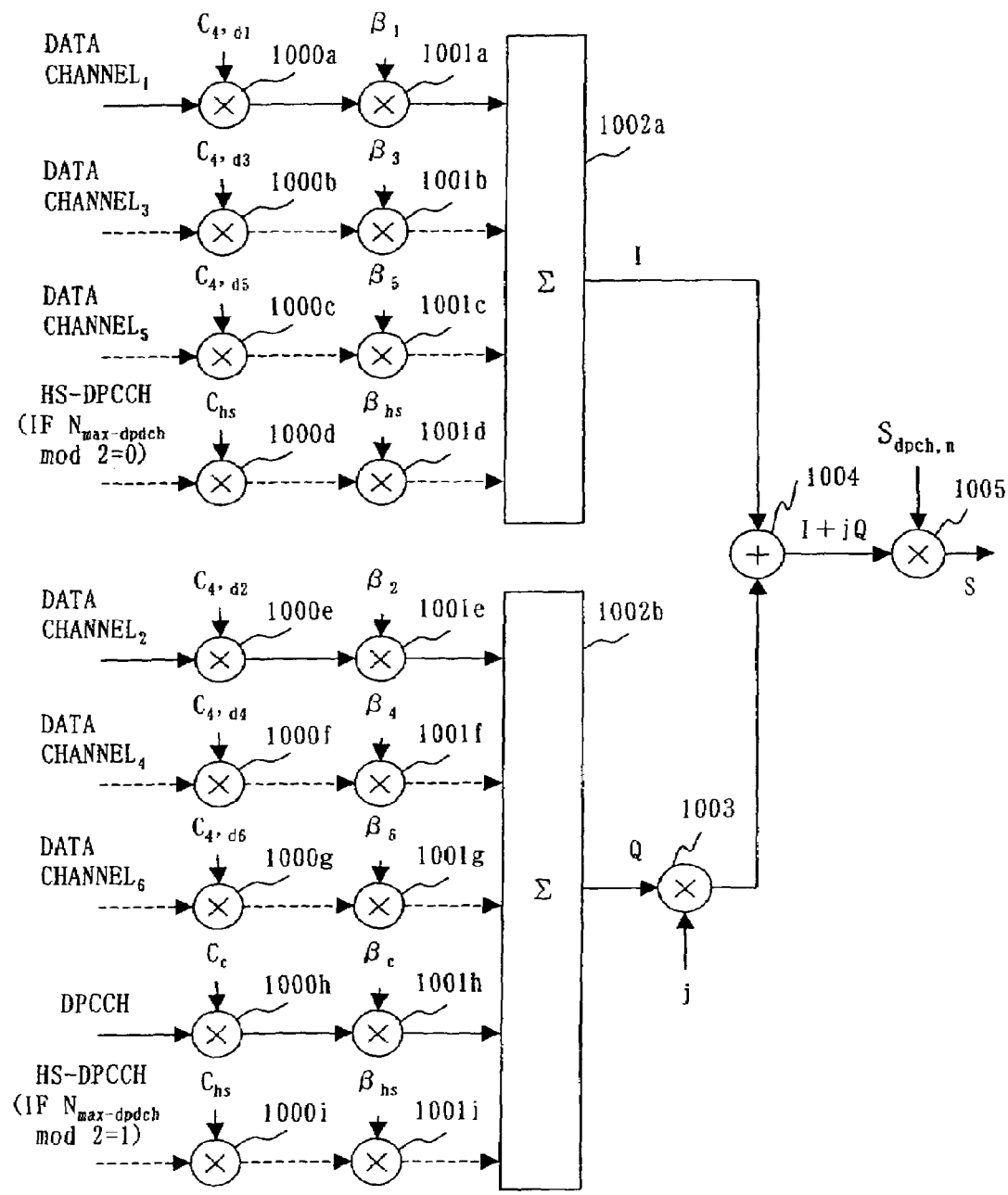
FIG. 4 is an explanatory drawing of data channel multiplex transmission for determining assignment of channelization codes by calculating gain factors when an HS-DPCCH is set as specified in a specification according to the first embodiment.
Figure 5:
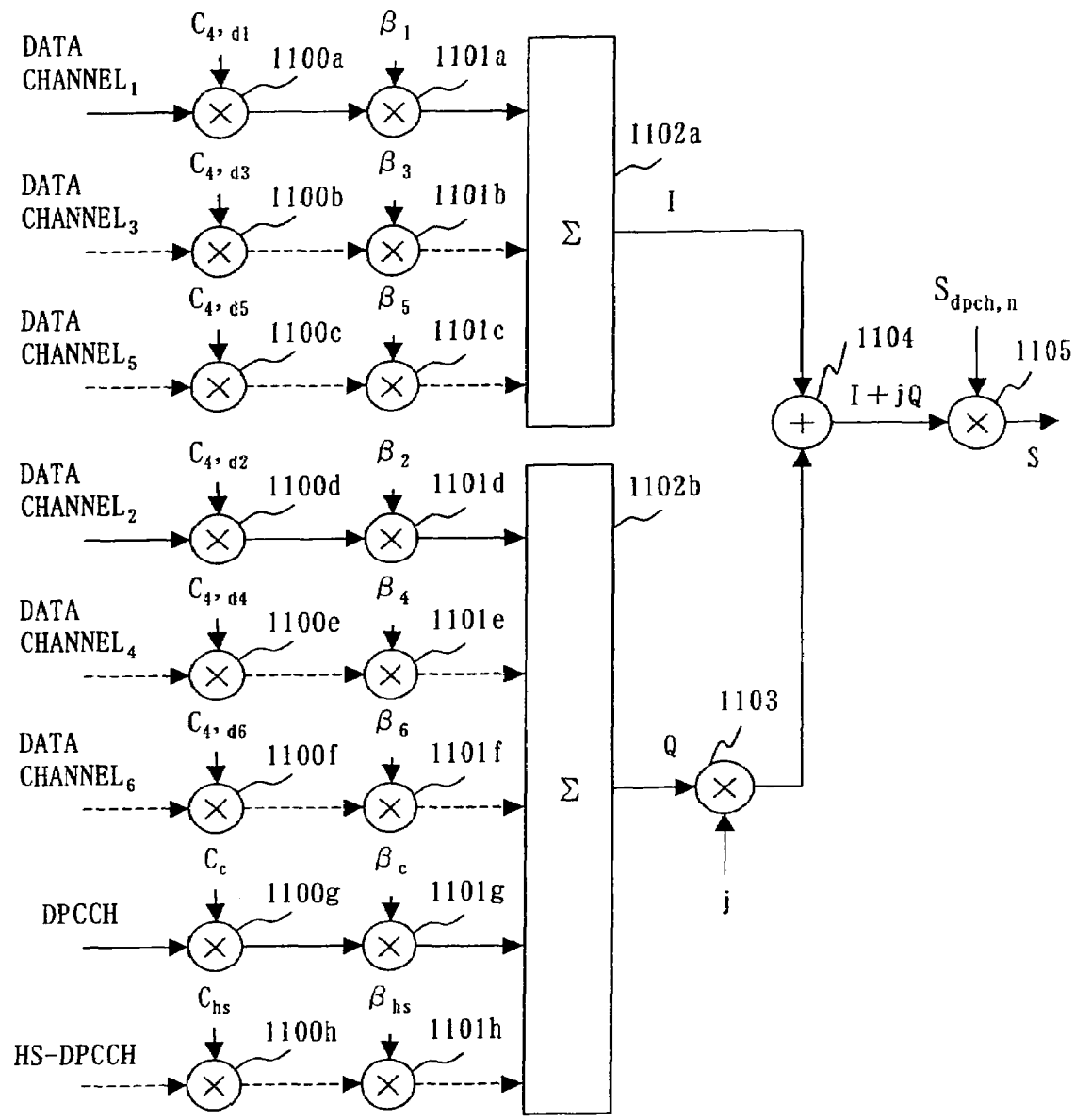
FIG. 5 is an explanatory drawing of data channel multiplex transmission for determining assignment of channelization codes by calculating gain factors when an HS-DPCCH is fixed to a Q side according to the first embodiment.
Figure 6:
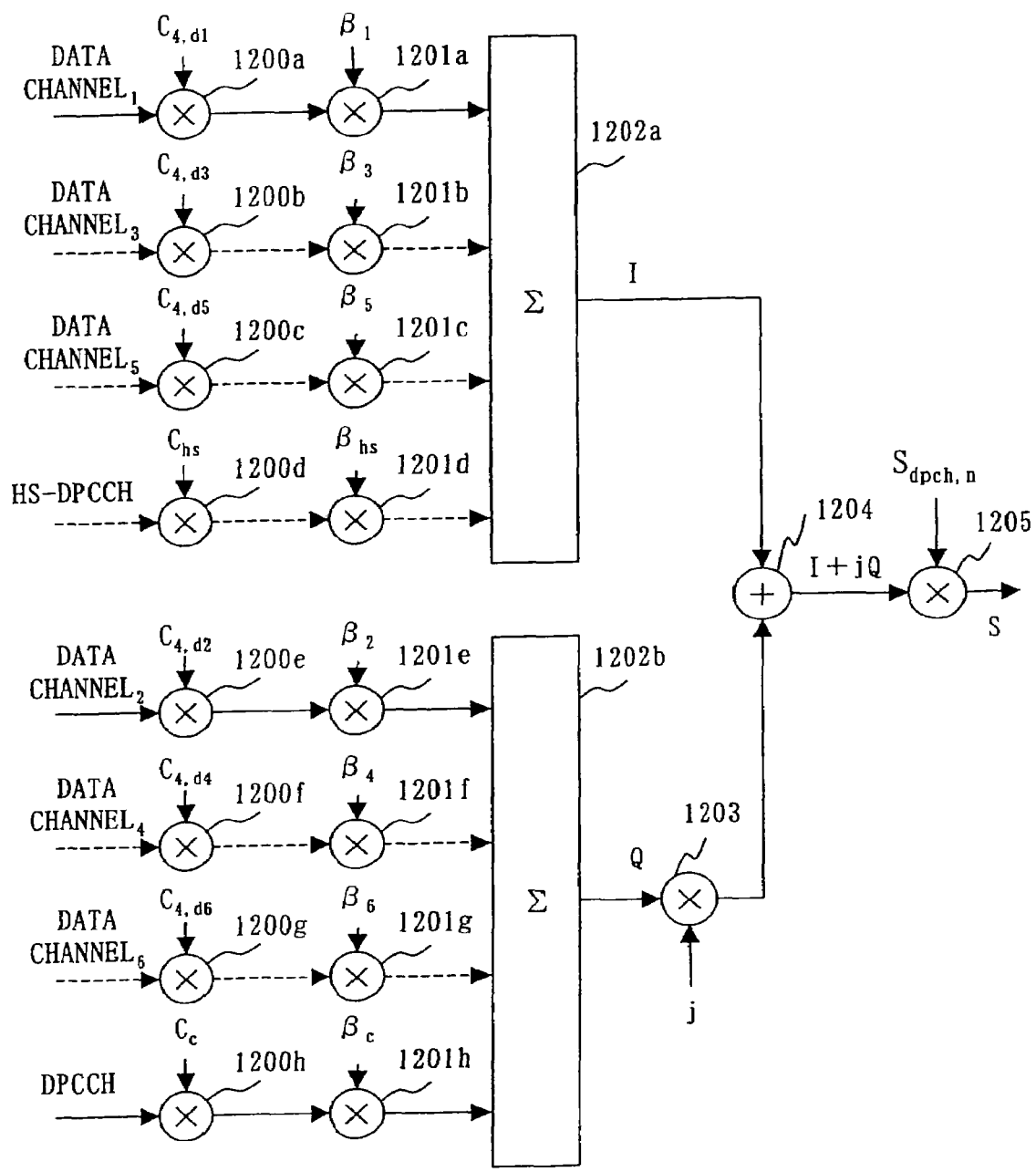
FIG. 6 is an explanatory drawing of data channel multiplex transmission for determining assignment of channelization codes by calculating gain factors when an HS-DPCCH is fixed to an I side according to the first embodiment.

FIGS. 4, 5, and 6 show diagrams of multiplex transmission of uplink data channels for transmitting data from a communication apparatus in the first embodiment to a base station. In this embodiment, not only a DPDCH, an E-DPCCH which is a control channel described in TR25.896 is also treated as a data channel in case of code assignment. Therefore, the data channels in each figure include an E-DPCCH which is a control channel other than DPDCHs. Further, cases are considered in which DPDCHs superimpose DCH, E-DCH, E-DPCCH, HS-DPCCH, and also plural multiplex channels out of DCH, E-DCH, E-DPCCH, HS-DPCCH. Further, in case of an HS-DPCCH, three methods can be considered: a method in which multiplexing is done to both I and Q based on the number of multiplexed data channels such as the present specification as shown in FIG. 4; a method in which multiplexing is done fixedly at the Q side as shown in FIG. 5; and a method in which multiplexing is done fixedly at the I side as shown in FIG. 6. The proposed technique can be applied to any of the three methods. It is also applicable to a case in which there is no HS-DPCCH. Further, the number of data channels to be multiplexed is up to six (the number of multiplexing $N \leq 6$) similarly to the conventional art. Gain factors $\beta_1$ through $\beta_8$ shown in the figure are $0 \leq \beta \leq 1$. Further, both cases are considered in which there are channels shown by a broken line and there are no such channels. Namely, it is applicable regardless of the number N of data channels (the number of multiplexing N), kinds of data channels, and performance of data channels. Yet further, it is applicable to both cases in which the assignment of channelization codes is determined based on an initial number of multiplexing and the performance of data channels and the assignment is kept to the end, and in which the assignment of channelization codes is determined for each frame.

In the first embodiment, the assignment of channelization codes is determined in the following way. For all possible combinations of channelization out of the given data channels and control channels, a transition $\theta_1$ (phase variation $\alpha$) from the first chip to the second chip and a transition $\theta_2$ (phase variation $\beta$) are obtained. As for each transition, in case of 0 degrees or 180 degrees, PAR becomes small since the overshoot is the smallest, and in case of 90 degrees, PAR becomes large since the overshoot is the largest. Therefore, it is preferable to assign the channelization codes so that transitions should be close to 0 degrees or 180 degrees and also far from 90 degrees. That is, it is possible to obtain the most ideal combination by obtaining a combination which makes $\sin^2 \theta_1 + \sin^2 \theta_2$ the smallest.

Figure 7:
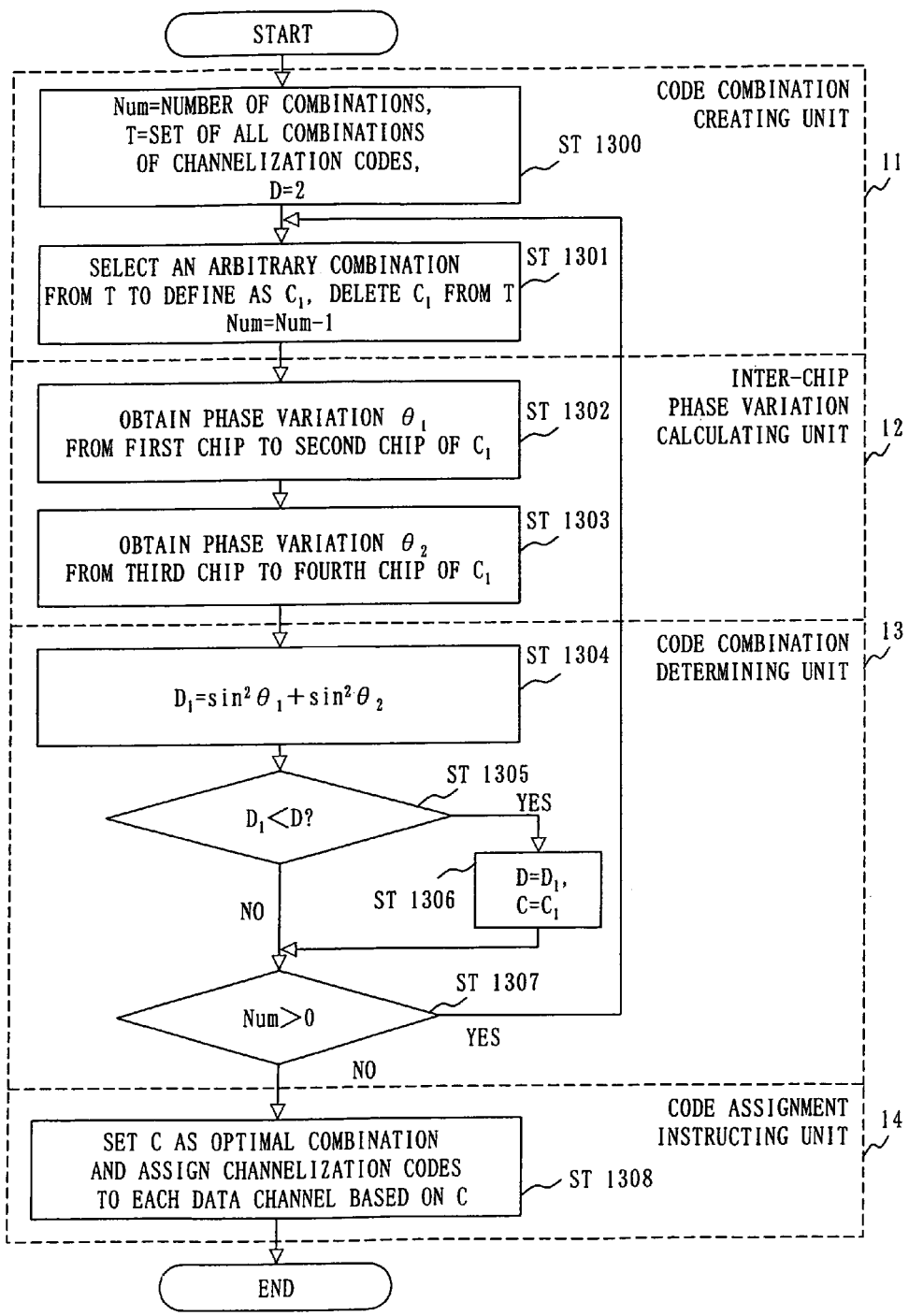
FIG. 7 shows a flowchart for determining assignment of channelization codes by calculating gain factors according to the first embodiment.

FIG. 7 is a flowchart showing a way to assign the channelization codes implemented by the controlling unit 905 according to the first embodiment. First, at STEP1300, the code combination creating unit 11 defines the number of combinations of the channelization codes as Num, defines a set of combinations of all channelization codes as T, initializes D to 2, and stores in the memory 15. At STEP1301, the code combination creating unit 11 sets Num=Num−1 and selects an arbitrary combination from T, define it as C1, deletes the combination selected from T, and updates the memory 15. At STEP1302, the inter-chip phase variation calculating unit 12 obtains a transition $\theta_1$ from the first chip to the second chip in case of assigning the combination $C_1$ to the channels and stores in the memory 15. Also at STEP1303, the inter-chip phase variation calculating unit 12 obtains the transition $\theta_2$ from the third chip to the fourth chip in case of assigning the combination $C_1$ to the channels and stores in the memory 15 similarly to STEP1302. At STEP1304, the code combination determining unit 13 sets $D_1 = \sin^2 \theta_1 + \sin^2 \theta_2$ and stores in the memory 15. At STEP1305, the code combination determining unit 13 judges if $D_1 < D$. If $D_1 < D$, STEP1306 is implemented. If not $D_1 < D$, STEP1307 is implemented. At STEP1306, the code combination determining unit 13 sets $C = C_1$ and $D = D_1$ and stores in the memory 15. At STEP1307, if Num>0, the operation returns to STEP1301. If Numb$\leq$0, STEP1308 is implemented. At STEP1308, the code assignment instructing unit 14 indicates C stored in the memory 15 as an optimal combination and based on this, assigns the channelization codes to each data channel. The code assignment instructing unit 14 notifies the channelization code generator 904 of the assignment of channelization codes.

According to the present embodiment, a combination of the channelization codes, overshoot caused by which is small, can be obtained automatically by calculation. Further, the combination of channelization codes is obtained, with which the phase variation between the first and second chips and the phase variation between the third and fourth chips are close to 0 degrees or 180 degrees, respectively, so that the phase variation becomes far from 90 degrees and the overshoot can be eliminated. Further, since the phase variation $\alpha$ between the first and second chips of the I and Q channels and the phase variation $\beta$ between the third and fourth chips of the I and Q channels are obtained, it is possible to reduce the overshoot due to the phase variation between an odd-numbered chip and an even-numbered chip.

Embodiment 2

Figure 8:
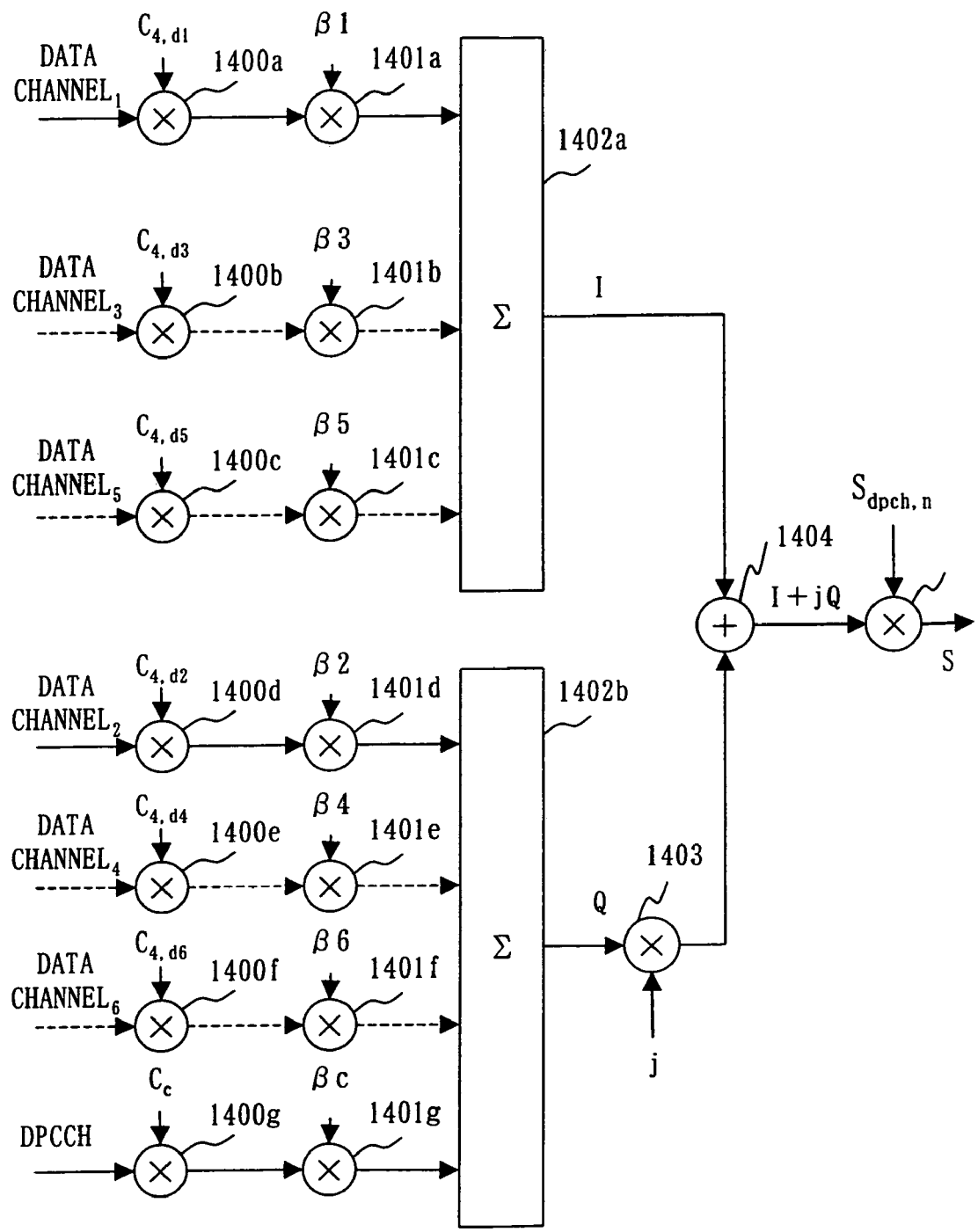
FIG. 8 is an explanatory drawing of data channel multiplex transmission for determining assignment of channelization codes based on magnitudes of gain factors when there is no HS-DPCCH according to a second embodiment.

FIG. 8 is an explanatory drawing of multiplex transmission of uplink data channels for transmitting data from a communication apparatus in the second embodiment to a base station. In this embodiment, other than DPDCHs, an E-DPCCH which is a control channel is also treated as a data channel in case of code assignment. Therefore, data channels in the figure include an E-DPCCH which is a control channel other than DPDCHs. In the second embodiment, a case without an HS-DPCCH is considered as a control channel to be multiplexed. Further, cases are considered in which DPDCHs superimpose DCH, E-DCH, E-DPCCH, HS-DPCCH, and also plural channels out of DCH, E-DCH, E-DPCCH, HS-DPCCH by multiplexing them. Gain factors $\beta_1$ through $\beta_6$ are $0 \leq \beta \leq 1$. Further, as for a part shown by a broken line in the figure a case without data channel is also considered. Namely, it is applicable regardless of the number N of data channels, kinds of data channels, and performance of data channels. Yet further, it is applicable to both cases in which the assignment of channelization codes is determined based on the initial number of multiplexing and the performance and the assignment is kept to the end, and in which the assignment of channelization codes is determined for each frame.

In the first embodiment, for each combination of channelization codes, phase variations among a plurality of chips are respectively calculated, and a combination of channelization codes, with which a sum of overshoots caused by each of the phase variations among the plurality of chips is small, is obtained by calculation. More concretely, in order to obtain a combination of channelization codes of which a sum of the overshoots is small, a combination of channelization codes of which each of a phase variation between the first chip and the second chip and a phase variation between the third chip and the fourth chip are close to 0 degrees or 180 degrees, respectively, is obtained. On the other hand, in the second embodiment discussed below, the channelization codes are assigned to channels from the channel having a large gain factor, and a phase variation from an odd-numbered chip to an even-numbered chip is made close to 0 degrees or 180 degrees as much as possible, and also made far from 90 degrees as much as possible. Further, in the second embodiment, using a fact that a gain factor of a DPCCH is very small, it is assumed that the DPCCH does not affect a phase variation.

A phase variation from an odd-numbered chip to an even-numbered chip in case of using only channelization codes $C_{4,0}$ and $C_{4,1}$ always maintains 0 degrees even if the gain factor is changed. This is verified by the following expression. Since channels of both the I side and the Q side use only $C_{4,0}=(1,1,1,1)$ and $C_{4,1}=(1,1,-1,-1)$, the following expressions can be applied regardless of kinds of channels, values of gain factors, and the number of multiplexing. $\beta_1$ through $\beta_4$ below are real numbers.

$$I=\beta_1+\beta_2, \beta_1+\beta_2, \beta_1-\beta_2, \beta_1-\beta_2$$

$$Q=\beta_3+\beta_4, \beta_3+\beta_4, \beta_3-\beta_4, \beta_3-\beta_4$$

As discussed, a phase variation from an odd-numbered chip to an even-numbered chip is 0 degrees. Further, the phase variation from an odd-numbered chip to an even-numbered chip in case of using only channelization codes $C_{4,2}$ and $C_{4,3}$ is always 180 degrees even if the gain factor is changed. Since channels of both I side and Q side use only $C_{4,2}=(1,-1,1,-1)$ and $C_{4,3}=(1,-1,-1,1)$, the following expressions can be applied regardless of kinds of channels, values of gain factors, and the number of multiplexing. $\beta_1$ through $\beta_4$ below are real numbers.

$$I=\beta_1+\beta_2, -\beta_1-\beta_2, \beta_1-\beta_2, -\beta_1+\beta_2$$

$$Q=\beta_3+\beta_4, -\beta_3-\beta_4, \beta_3-\beta_4, -\beta_3+\beta_4$$

As discussed, a phase variation from an odd-numbered chip to an even-numbered chip is 180 degrees.

When the channelization codes $C_{4,0}$ and $C_{4,1}$ and the channelization codes $C_{4,2}$ and $C_{4,3}$ are included in the I side or the Q side, the phase variation becomes close to 90 degrees. Accordingly, it is preferable not to mix $C_{4,0}$, $C_{4,1}$ and $C_{4,2}$, $C_{4,3}$. Concretely, it is necessary to assign the channelization codes using a combination in which both the I side and the Q side use only $C_{4,0}$ or $C_{4,1}$ or a combination in which both the I side and the Q side use only $C_{4,2}$ or $C_{4,3}$. It is assumed that a sum of the gain factors of data channels to which $C_{4,0}$ or $C_{4,1}$ is assigned is $\beta_{01}$, and a sum of the gain factors of data channels to which $C_{4,2}$ or $C_{4,3}$ is assigned is $\beta_{23}$. In order not to make $\theta$ 90 degrees, $\beta_{01}$ is made large and $\beta_{23}$ is made small, or $\beta_{23}$ is made large and $\beta_{01}$ is made small. That is, it is effective to assign $C_{4,0}$ and $C_{4,1}$ or $C_{4,2}$ and $C_{4,3}$ to channels from a channel having a gain factor being as large as possible. In this embodiment, data channels having different gain factors are both or one of cases in which kinds of the channels are different such as an E-DPCCH and a DPDCH, and in which performance of the channels are different depending on channels such as the same DPDCHs superimposing DCH and superimposing E-DCH.

Figure 9:
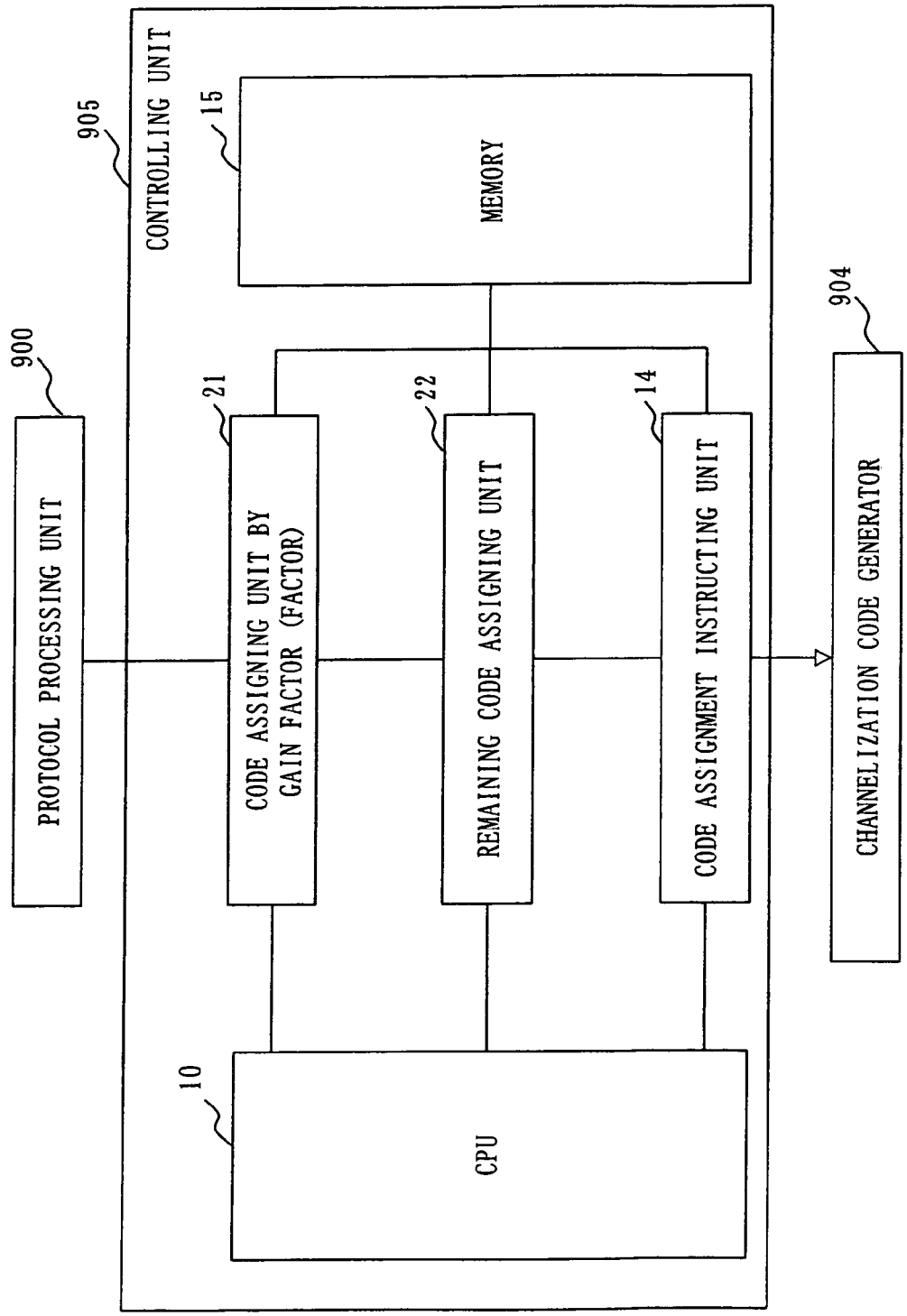
FIG. 9 shows a configuration of a CDMA controlling unit according to the second embodiment.

FIG. 9 shows a block diagram of the controlling unit 905 according to the second embodiment. The controlling unit 905 includes a code assigning unit by gain factor 21 (also called as a code assigning unit by factor) for assigning predetermined channelization codes to channels from a channel having a large gain factor based on the gain factors $\beta_1$ through $\beta_6$ obtained by calculation of the protocol processing unit 900. Further, a remaining code assigning unit 22 is also included for assigning channelization codes other than the predetermined channelization codes to channels to which no channelization codes are assigned by the code assigning unit by gain factor 21. Further, a code assignment instructing unit 14 is also included for instructing the assignment of channelization codes assigned by the code assigning unit by gain factor 21 and the remaining code assigning unit 22.

Figure 10:
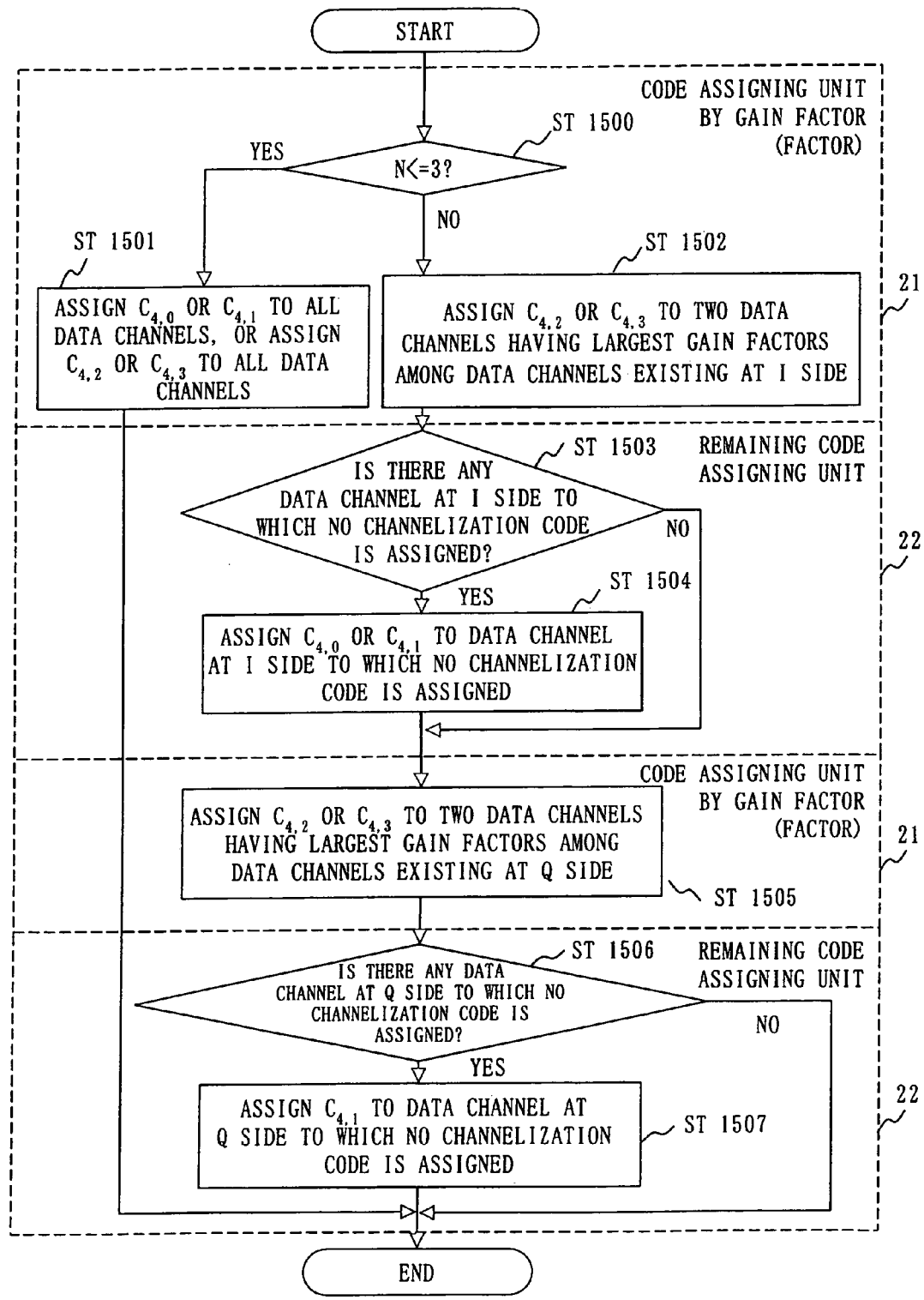
FIG. 10 shows a flowchart for determining assignment of channelization codes based on magnitudes of gain factors when there is no HS-DPCCH according to the second embodiment.

FIG. 10 is a flowchart showing a way to assign the channelization codes in the second embodiment. At STEP1500, the code assigning unit by gain factor 21 judges if the number N of multiplex data channels is equal to or less than three. If the number N of multiplexing is not more than three, STEP1501 is implemented; the number N of multiplexing is at least four, STEP1502 is implemented. At STEP1501, the code assigning unit by gain factor 21 assigns the channelization code $C_{4,0}$ or $C_{4,1}$ to all data channels, or in another way assigns the channelization code $C_{4,2}$ or $C_{4,3}$ to all data channels, and stores in the memory 15. At STEP1502, the code assigning unit by gain factor 21 assigns one of the channelization codes $C_{4,2}$ or $C_{4,3}$ to two data channels having largest gain factors out of the data channels to be multiplexed at the I side and stores in the memory 15. At STEP1503, the remaining code assigning unit 22 judges if there is any data channel at the I side to which no channelization code is assigned. If there is, STEP1504 is implemented. If not, STEP1505 is implemented. At STEP1504, the remaining code assigning unit 22 assigns one of $C_{4,0}$ and $C_{4,1}$ to data channels at the I side to which no channelization code is assigned and stores in the memory 15.

At STEP1505, the code assigning unit by gain factor 21 assigns the channelization codes to the data channels to be multiplexed at the Q side in the same manner to the I side. Namely, the code assigning unit by gain factor 21 assigns one of the channelization codes $C_{4,2}$ and $C_{4,3}$ to two data channels at the Q side having a large gain factor and stores in the memory 15. At STEP1506, the remaining code assigning unit 22 judges if there is any data channel at the Q side to which no channelization code is assigned. If there is, STEP1507 is implemented. If there is not, the operation terminates. At STEP1507, the remaining code assigning unit 22 assigns the channelization code $C_{4,1}$ to data channels at the Q side to which no channelization code is assigned and stores in the memory 15. This embodiment brings an effect that the overshoots of two channels having large gain factors can be removed.

Embodiment 3

In the second embodiment, the assignment of channelization codes is carried out to channels from a channel having a large gain factor, so that a phase variation from an odd-numbered chip to an even-numbered chip should be made close to 0 degrees or 180 degrees and far from 90 degrees as much as possible. More concretely, the phase variation becomes close to 90 degrees when the channelization codes $C_{4,0}$ and $C_{4,1}$ and the channelization codes $C_{4,2}$ and $C_{4,3}$ are mixed at the I side or the Q side. In the above second embodiment, the channelization codes are assigned by, for example, combining only $C_{4,0}$ or $C_{4,1}$ at both I side and Q side; or combining only $C_{4,2}$ or $C_{4,3}$ at both I side and Q side. In the third embodiment that will be explained below, a way to assign the channelization codes is determined by a kind and performance of data channel, namely, data amount of data channel instead of the gain factor of data channel. Data amount of data channel is different depending on kinds of data channel such as, for example, data channels of an E-DPCCH and a DPDCH. Or, even if the kinds of data channels are the same, it is different depending on channels that the data channels superimpose. Concretely, a DPDCH that superimposes DCH and a DPDCH that superimposes E-DCH are the same kind of DPDCHs; however, the performances of them are different depending on the channels that they superimpose. Therefore, the data amount of data channel is also different according to the performance of channel.

In the following explanation, the channelization codes are assigned on the assumption that data amount of each data channel is as follows:

(1) Since data amount of a DPCCH is small, the data amount of a DPCCH does not affect the assignment of channelization codes;

(2) As for variation due to kinds of channels, data amount of an E-DPCCH is larger than that of a DPDCH;

(3) As for variation due to performance of channels, data amount of DCH, E-DCH, E-DPCCH, and HS-DPCCH superimposed on DPDCHs are like:

E-DPCCH≧E-DCH≧DCH=HS-DPCCH;

(4) Data amount of a DPDCH that superimposes multiple channels of DCH, E-DCH, E-DPCCH, and HS-DPCCH is larger than that of a DPDCH that superimposes only one of DCH, E-DCH, E-DPCCH, and HS-DPCCH;

(5) Among DPDCHs that respectively superimpose multiple channels of DCH, E-DCH, E-DPCCH, and HS-DPCCH, data amount of a DPDCH that superimposes more number of multiple channels is larger;

(6) Among DPDCHs that respectively superimpose the same number of multiple channels of DCH, E-DCH, E-DPCCH, and HS-DPCCH, if one includes E-DPCCH, data amount of a DPDCH that includes E-DPCCH is larger; and (7) Among DPDCHs that respectively superimpose the same number of multiple channels of DCH, E-DCH, E-DPCCH, and HS-DPCCH, when none includes E-DPCCH, data amount of a DPDCH that does not include E-DCH is smaller; or if both include E-DCH, data amount of both DPDCHs are the same.

Figure 11:
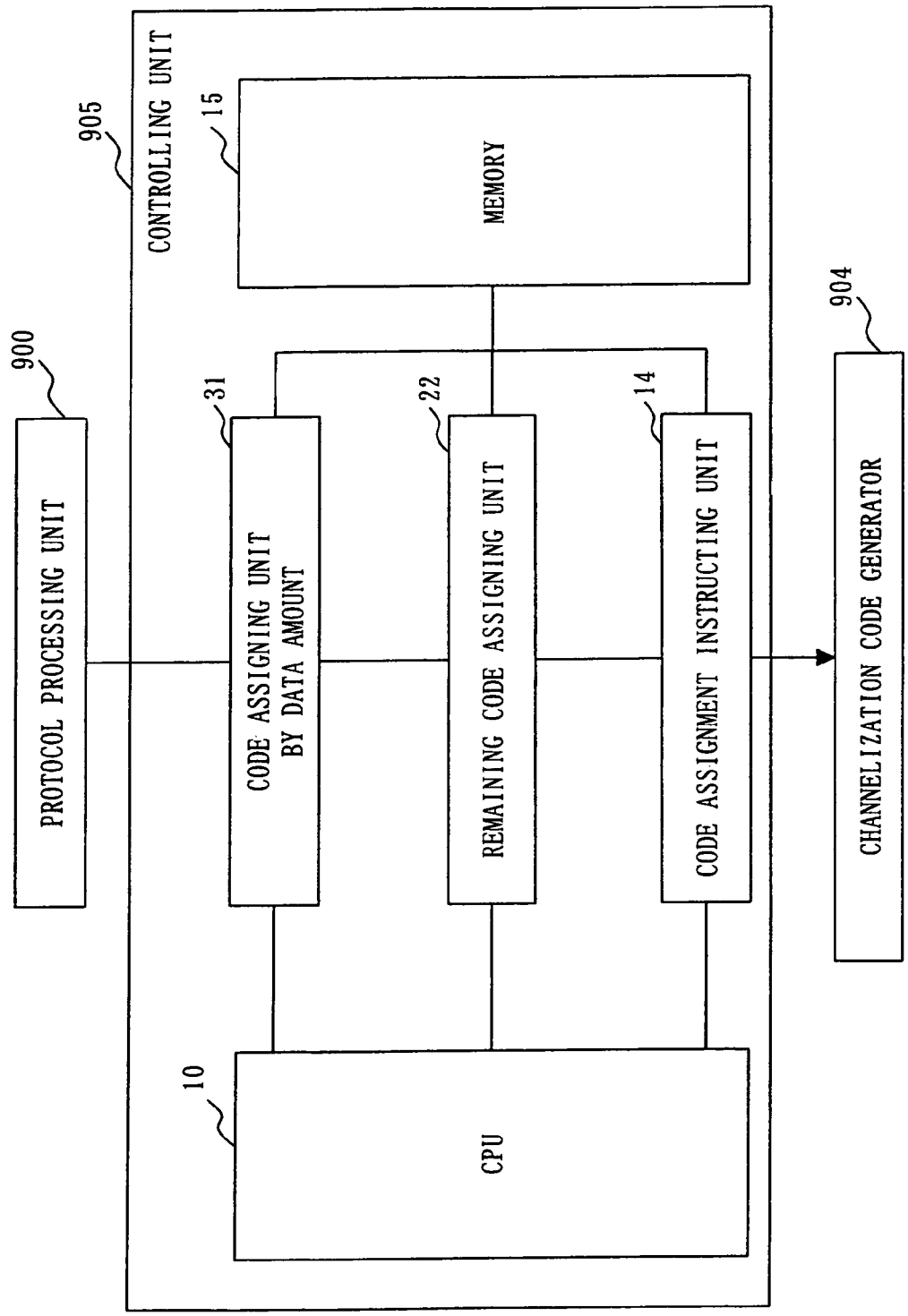
FIG. 11 shows a configuration of a CDMA controlling unit according to a third embodiment.
Figure 12:
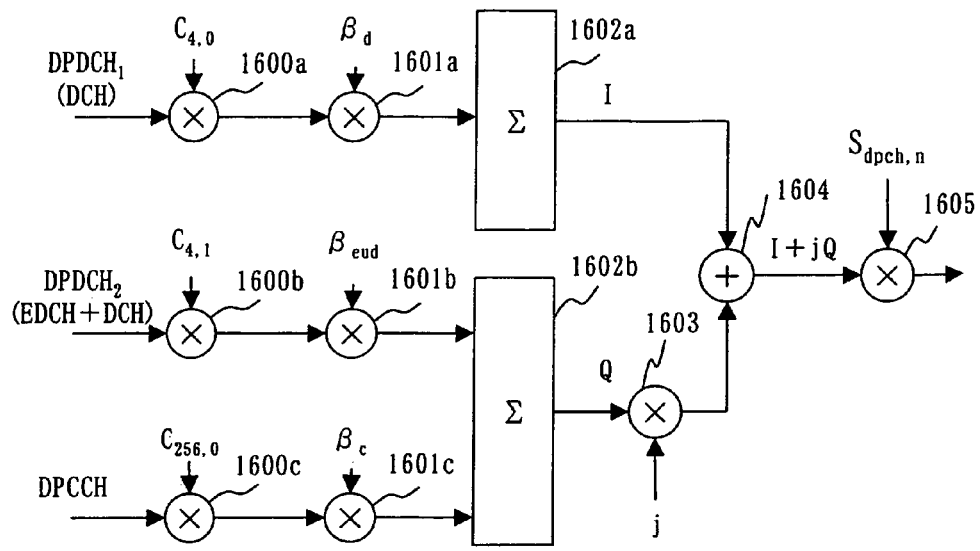
FIG. 12 shows an example of assigning channelization codes based on data amount in case of the number of multiplexing N=2 when there is no HS-DPCCH according to the third embodiment.
Figure 13:
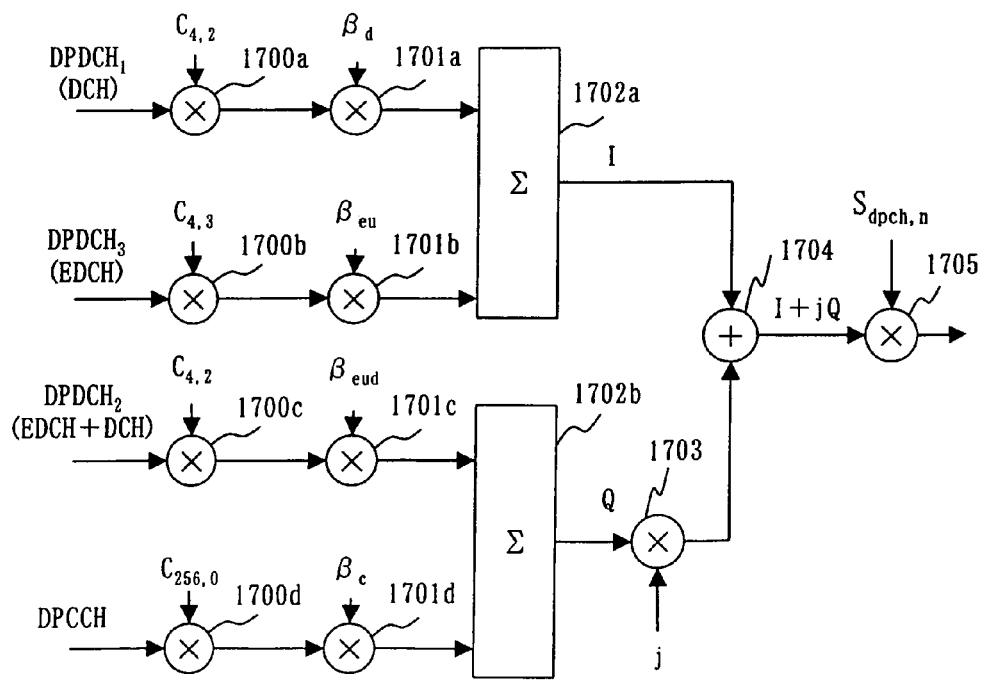
FIG. 13 shows an example of assigning channelization codes based on data amount in case of the number of multiplexing N=3 when there is no HS-DPCCH according to the third embodiment.
Figure 14:
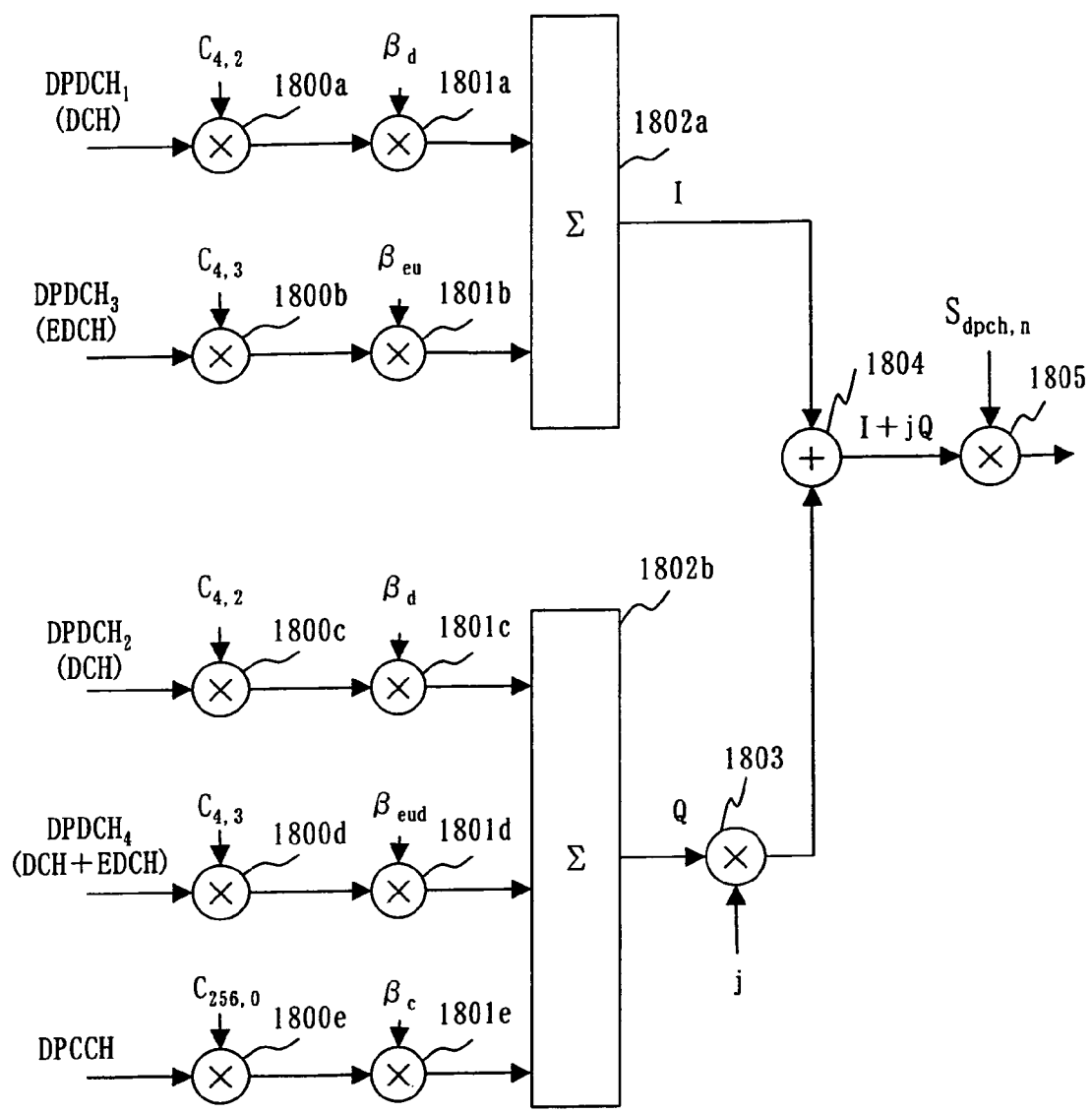
FIG. 14 shows an example of assigning channelization codes based on data amount in case of the number of multiplexing N=4 when there is no HS-DPCCH according to the third embodiment.

FIG. 11 shows a block diagram of a controlling unit 905 of a communication apparatus depending on the third embodiment. The controlling unit 905 includes a code assigning unit by data amount 31 for assigning predetermined channelization codes to channels from a channel of which data amount is large. Further, a remaining code assigning unit 22 is provided for assigning channelization codes other than the predetermined channelization codes to channels to which no channelization codes have been assigned by the code assigning unit by data amount 31. Further, a code assignment instructing unit 14 for instructing assignment of the channelization codes assigned by the code assigning unit by data amount 31 and the remaining code assigning unit 22. FIGS. 12 through 16 are explanatory drawings of multiplex transmission of uplink data channels in which the communication apparatus according to the third embodiment transmits data to the base station with multiplexed data channels of which the number N of multiplexing is 2 through 6. As shown in FIGS. 12 through 14, when an HS-DPCCH is not included and the number N of multiplexing is no more than 4, code assignment does not change based on kinds of data channels, and the existing method disclosed in JP2002-33716 can be applied.

Figure 15:
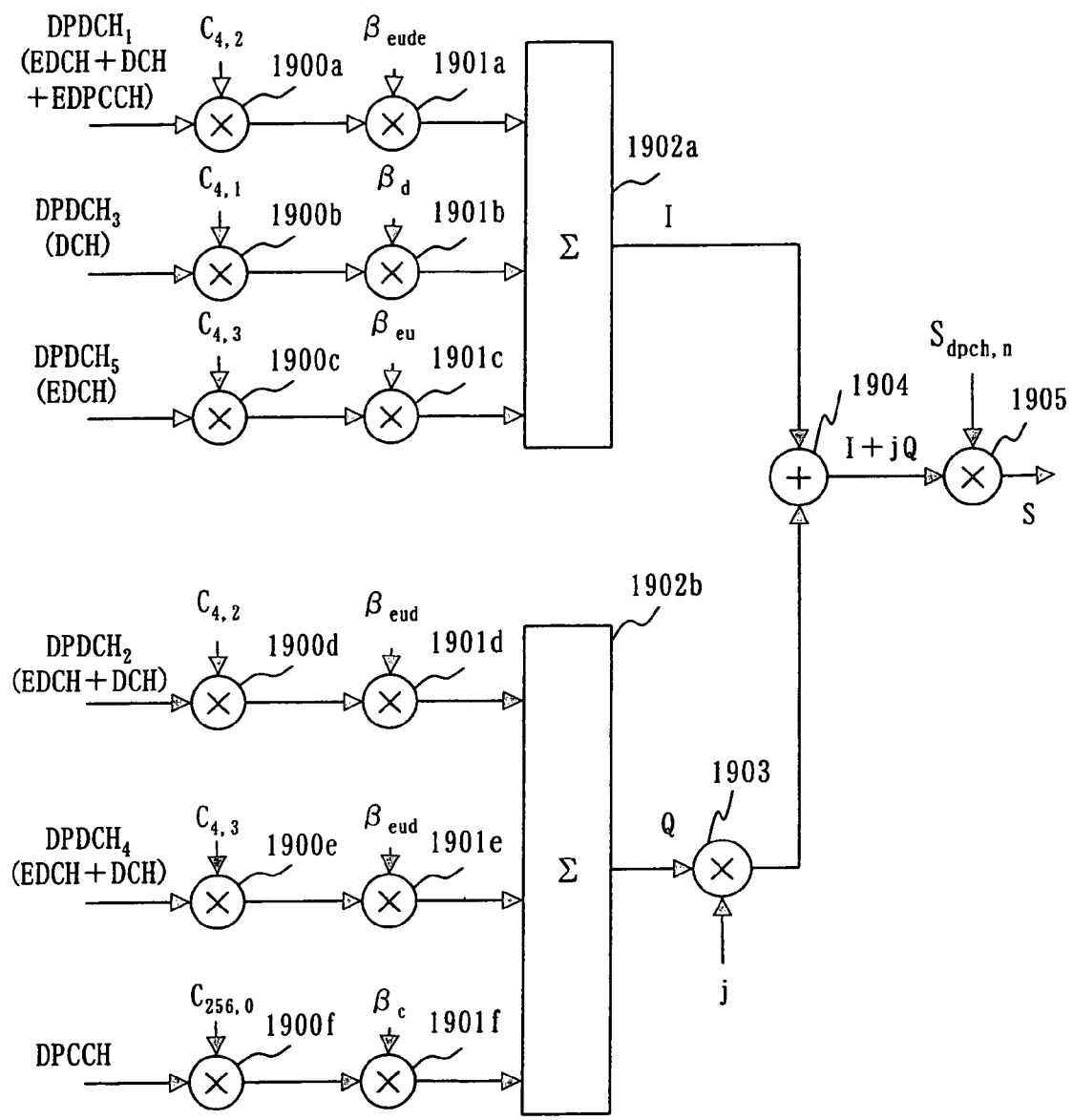
FIG. 15 shows an example of assigning channelization codes based on data amount in case of the number of multiplexing N=5 when there is no HS-DPCCH according to the third embodiment.
Figure 16:
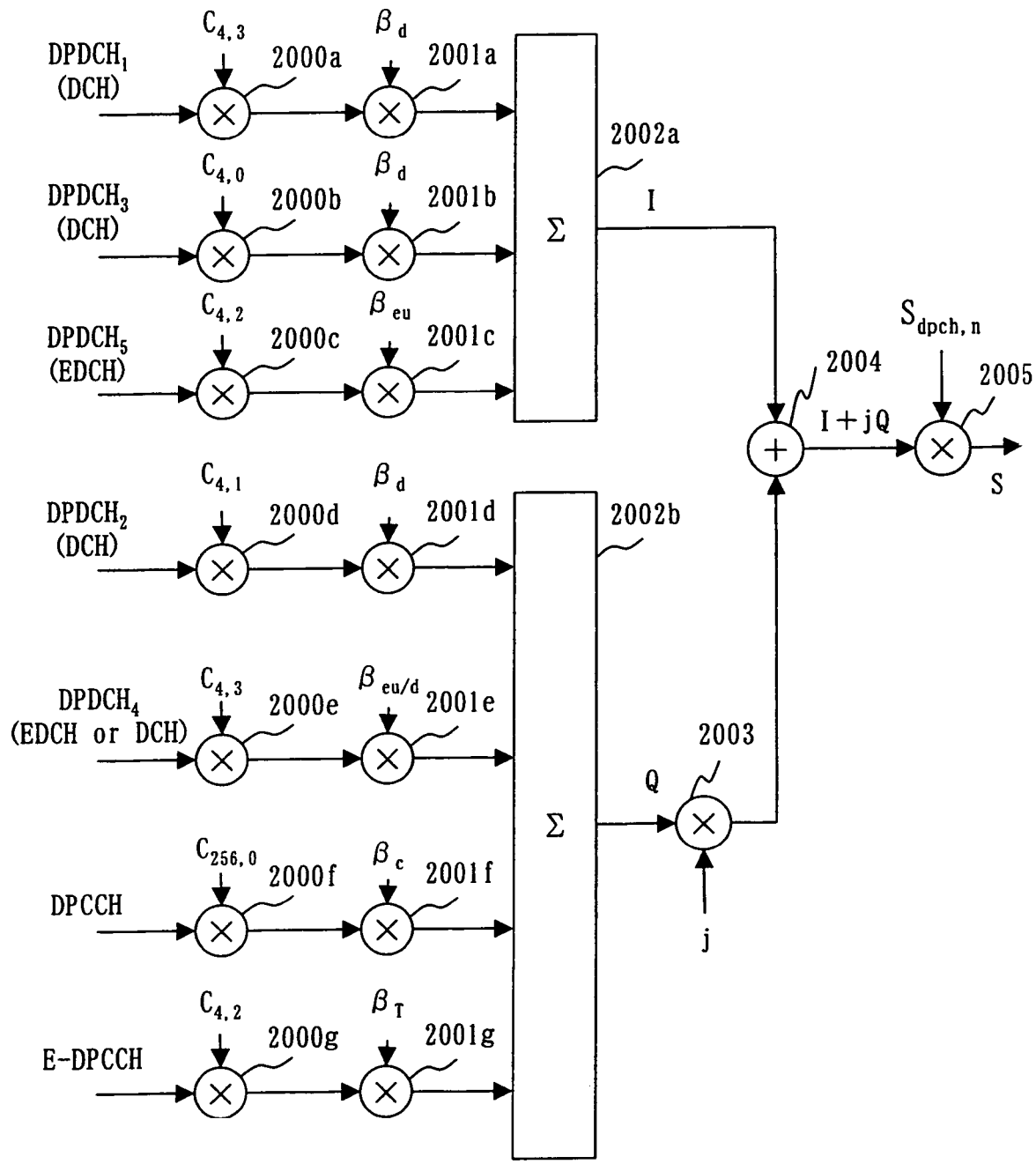
FIG. 16 shows an example of assigning channelization codes based on data amount in case of the number of multiplexing N=6 when there is no HS-DPCCH according to the third embodiment.

As shown in FIGS. 15 and 16, when the number of multiplexing is N≧5, a way to assign the codes by the code assigning unit by data amount 31 varies according to kinds of channels. The code assigning unit by data amount 31, as shown in FIG. 15, assigns channelization codes $C_{4,2}$ or $C_{4,3}$ to a data channel of which the data amount is large such as DPDCH, on which E-DCH, DCH, and E-DPCCH are multiplexed or $DPDCH_5$ that superimposes E-DCH among channels at the I side. The remaining code assigning unit 22 assigns $C_{4,0}$ or $C_{4,1}$ to a data channel of which the data amount is relatively small such as $DPDCH_3$ that superimposes only DCH. When the number of multiplexing N=5, $C_{4,2}$ and $C_{4,3}$ are assigned to channels at the Q side regardless of data amount (regardless of gain factors) of the data channels.

The code assigning unit by data amount 31 assigns, as shown in FIG. 16, the channelization codes $C_{4,2}$ or $C_{4,3}$ to data channels of which data amount is large such as $DPDCH_5$ that superimposes E-DCH among channels at the I side. When the kinds of channels are the same such as $DPDCH_1$ and $DPDCH_3$, either of $C_{4,2}$ and $C_{4,3}$ is assigned to one of them, and to the remaining data channel, $C_{4,0}$ or $C_{4,1}$ is assigned. Further, the code assigning unit by data amount 31 assigns either of the channelization codes $C_{4,2}$ and $C_{4,3}$ to a data channel of which data amount is large such as $DPDCH_4$ that superimposes E-DCH or DCH among channels at the Q side. The remaining code assigning unit 22 assigns either of $C_{4,0}$ and $C_{4,1}$ to data channels of which the data amount is small such as $DPDCH_2$ that superimposes only DCH. As discussed above, the present embodiment brings an effect that the overshoot of channels of which data amount is large can be removed.

Embodiment 4

Figure 17:
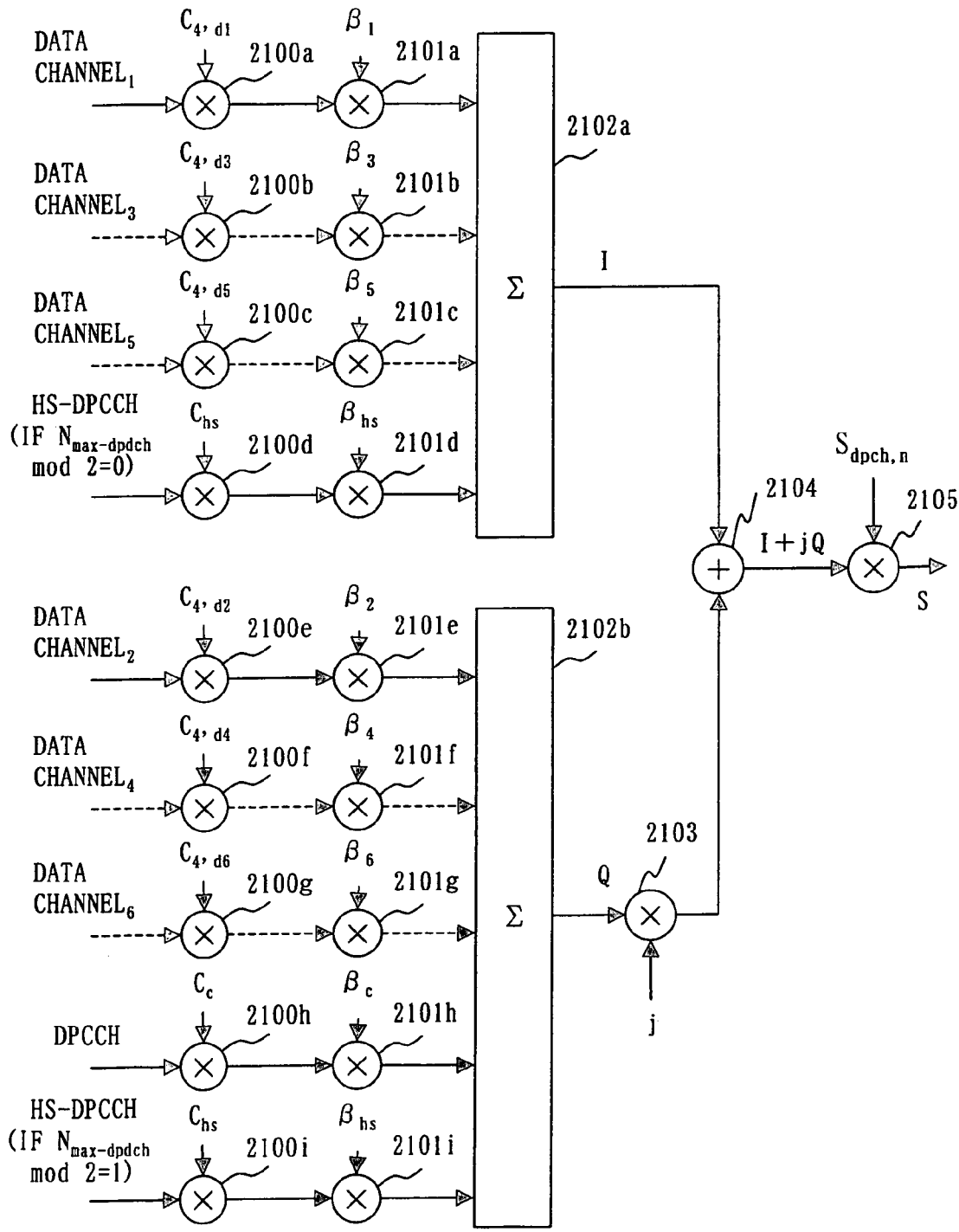
FIG. 17 is an explanatory drawing of data channel multiplex transmission for determining assignment of channelization codes based on magnitudes of gain factors when an HS-DPCCH is set as specified in a specification according to a fourth embodiment.
Figure 18:
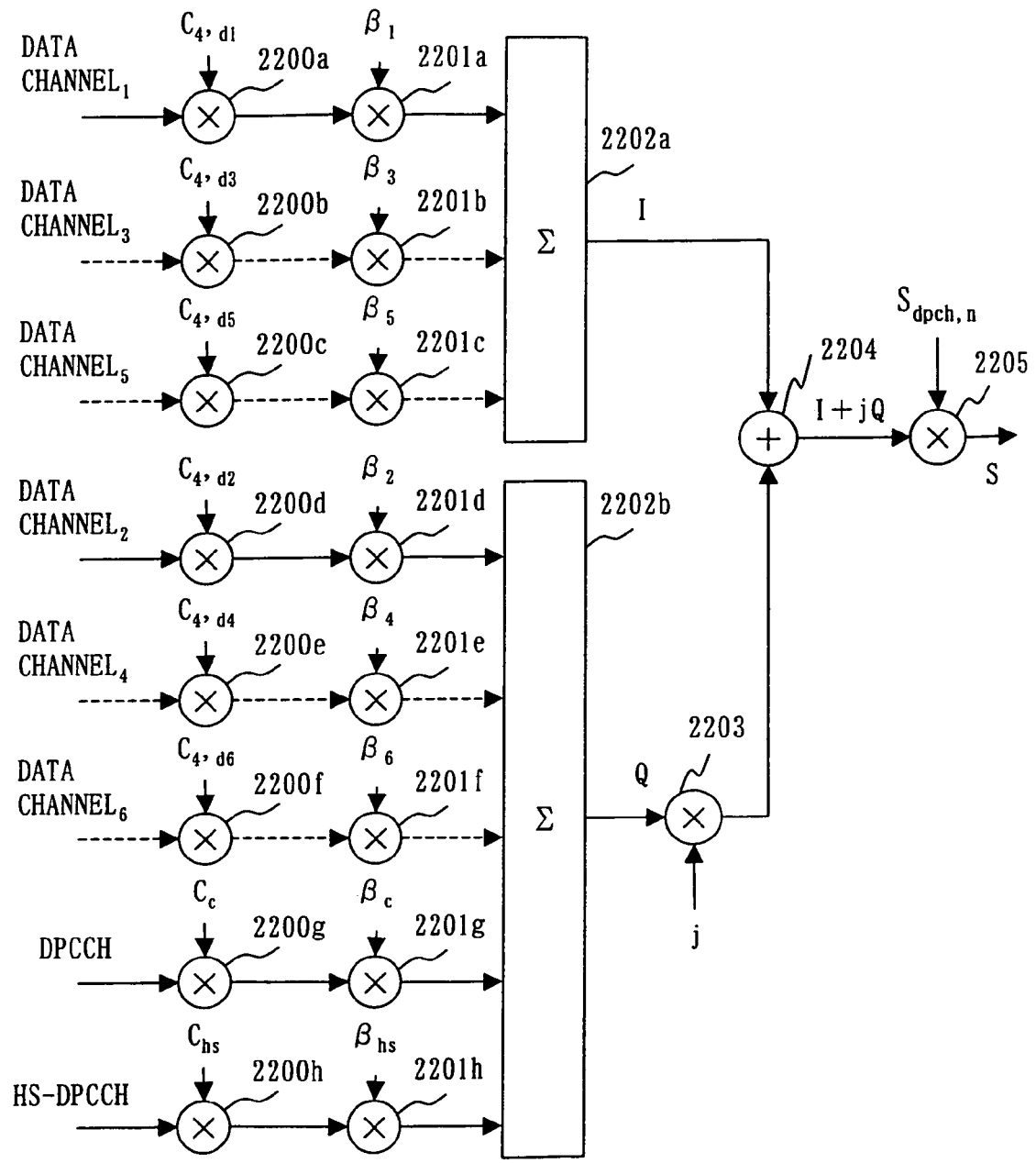
FIG. 18 is an explanatory drawing of data channel multiplex transmission for determining assignment of channelization codes based on magnitudes of gain factors when an HS-DPCCH is fixed to a Q side according to the fourth embodiment.
Figure 19:
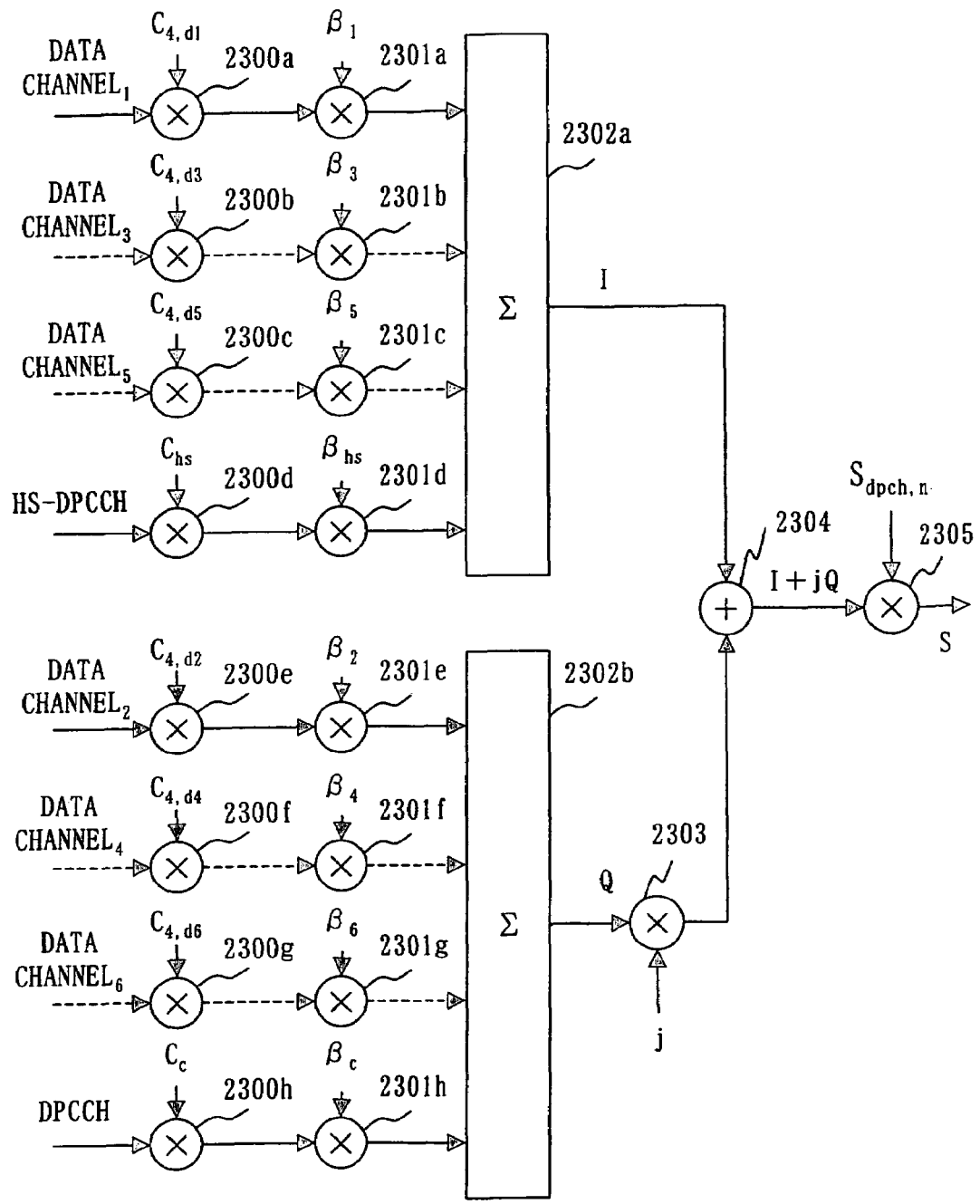
FIG. 19 is an explanatory drawing of data channel multiplex transmission for determining assignment of channelization codes based on magnitudes of gain factors when an HS-DPCCH is fixed to an I side according to the fourth embodiment.

FIGS. 17, 18, and 19 are explanatory drawings of multiplex transmission of uplink data channels in which the communication apparatus according to the fourth embodiment transmits data to the base station. In this embodiment, other than DPDCHs, an E-DPCCH that is a control channel is treated as a data channel in case of assigning codes, so that the data channels shown in the figures include an E-DPCCH that is a control channel as well as DPDCHs. In the second embodiment, a case without an HS-DPCCH is explained; in the fourth embodiment that will be explained below, another case with an HS-DPCCH is considered. Further, cases are considered, in which a DPDCH superimposes DCH, in which a DPDCH superimposes E-DCH, in which a DPDCH superimposes E-DPCCH, and in which a DPDCH superimposes multiple channels of DCH, E-DCH, and E-DPCCH. In the figures, gain factors $\beta_1$ through $\beta_6$ are $0 \leq \beta \leq 1$. Further, a case without any data channel is also considered as illustrated by a part shown with a broken line in the figure. That is, it is applicable regardless of the number N of multiplexed data channels, kinds of channels, and performance of channels. Further, a proposed method can be applied to any of three ways of fixing an HS-DPCCH: a way in which an HS-DPCCH is multiplexed to either the I or Q side according to the number of multiplexed data channels as shown in FIG. 17; another way in which the HS-DPCCH is fixed to the Q side as shown in FIG. 18; and the other way in which the HS-DPCCH is fixed to the I side as shown in FIG. 19. In case of uplink enhancement, it is not decided which code is assigned to the HS-DPCCH. In specification, $C_{256,32}$ is assigned to the HS-DPCCH when the number of multiplexed channels is odd, and $C_{256,1}$ is assigned to the HS-DPCCH when the number N of multiplexed channels is even.

A way to assign the channelization codes in case of uplink enhancement is not predetermined; however, in the present embodiment, it is assumed that $C_{256,1}$ is assigned when the HS-DPCCH is at the I side, and $C_{256,32}$ is assigned when the HS-DPCCH is at the Q side. Whichever code is assigned, they are the same as $C_{4,0}$ when it is considered by a unit of 4 chips. Accordingly, when the HS-DPCCH is at the I side, $C_{4,0}$ cannot be used as a channelization code at the I side.

Similar to the second embodiment, in the fourth embodiment, channelization codes are assigned to channels from the channel having a large gain factor. The channelization codes are assigned by a combination of using only $C_{4,0}$ or $C_{4,1}$ at both I and Q sides or a combination of using only $C_{4,2}$ or $C_{4,3}$ at both I and Q sides, so that a phase variation from an odd-numbered chip to an even-numbered chip should become close to 0 degrees or 180 degrees and far from 90 degrees as much as possible. Further, in the fourth embodiment, it is assumed that a DPCCH does not affect a phase variation by using a fact that the gain factor of a DPCCH is very small. In this embodiment, channels of which gain factors are different mean both or one of cases in which kinds of channels are different such as an E-DPCCH and a DPDCH, and in which performance of channels are different such as a DPDCH that superimposes DCH and the same a DPDCH that superimposes E-DCH.

Further, an E-DPCCH is treated similarly to a DPDCH that superimposes E-DCH. Further, in this embodiment, the gain factor of an HS-DPCCH is considered almost the same as a DPDCH that superimposes DCH, considering a fact that the gain factor of the HS-DPCCH becomes extremely large when it exists at a cell edge. Because of this, due to an effect of the HS-DPCCH, if the HS-DPCCH is at the I side even if the number of multiplexing is the same, that is, three, there is high possibility to improve PAR when the channelization code $C_{4,2}$ or $C_{4,3}$ is assigned to all channels, and when the channelization code $C_{4,0}$ or $C_{4,1}$ is assigned to all channels if the HS-DPCCH is at the Q side.

Figure 20:
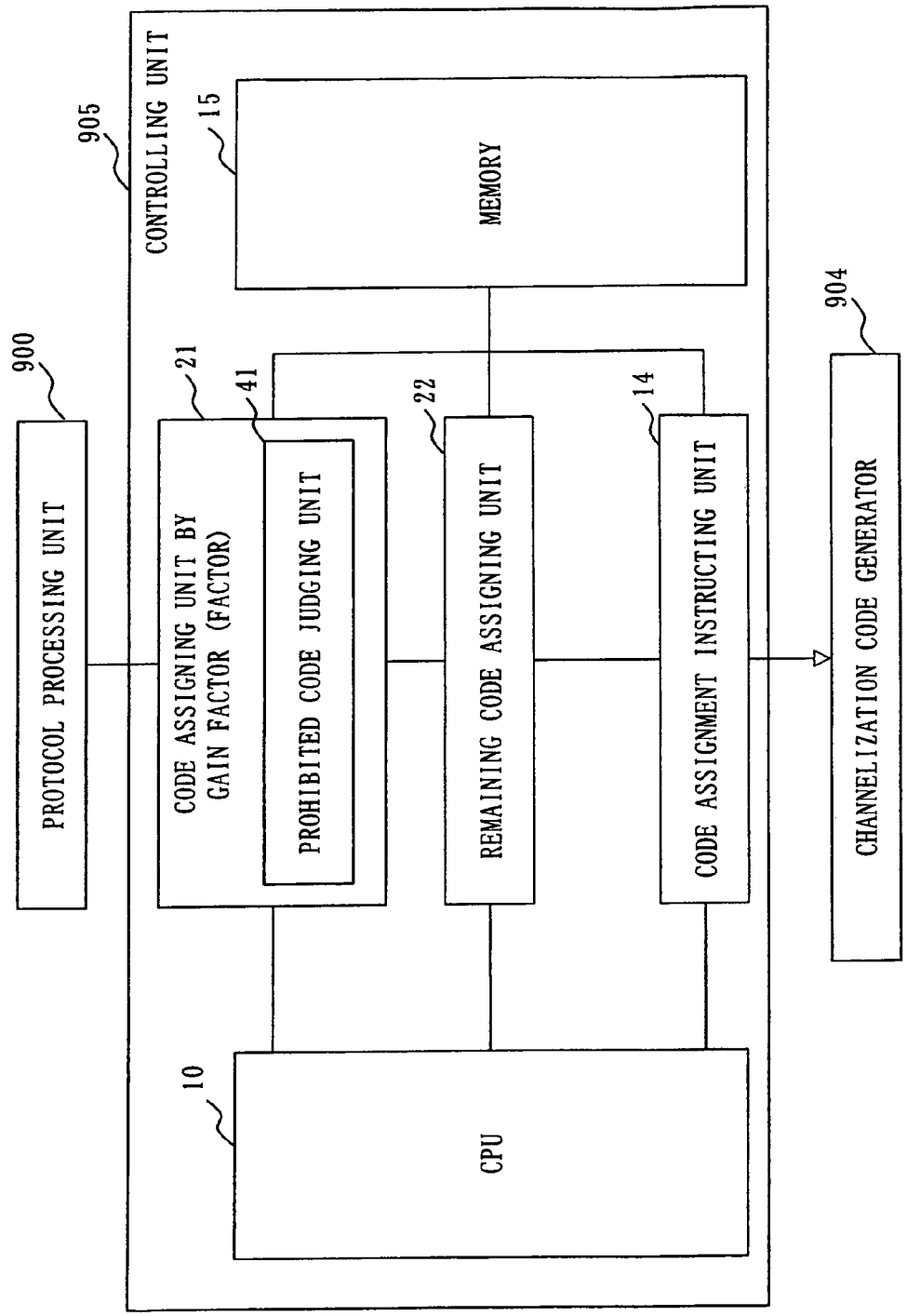
FIG. 20 shows a configuration of a CDMA controlling unit according to the fourth embodiment.

FIG. 20 shows a block diagram of a controlling unit 905 provided at a communication apparatus according to the fourth embodiment. The code assigning unit by gain factor 21 includes a prohibited code judging unit 41 for, when there is a specific kind of channel to which a specific channelization code is assigned, detecting a channelization code which has a correlation with the specific channelization code assigned to the specific kind of channel, and prohibiting the channelization code which is detected to have a correlation from being assigned. For example, the prohibited code judging unit 41 judges if the HS-DPCCH is at the I side or not. When the HS-DPCCH is at the I side, it is determined that $C_{4,0}$ should not be used as a channelization code at the I side.

Figure 21:
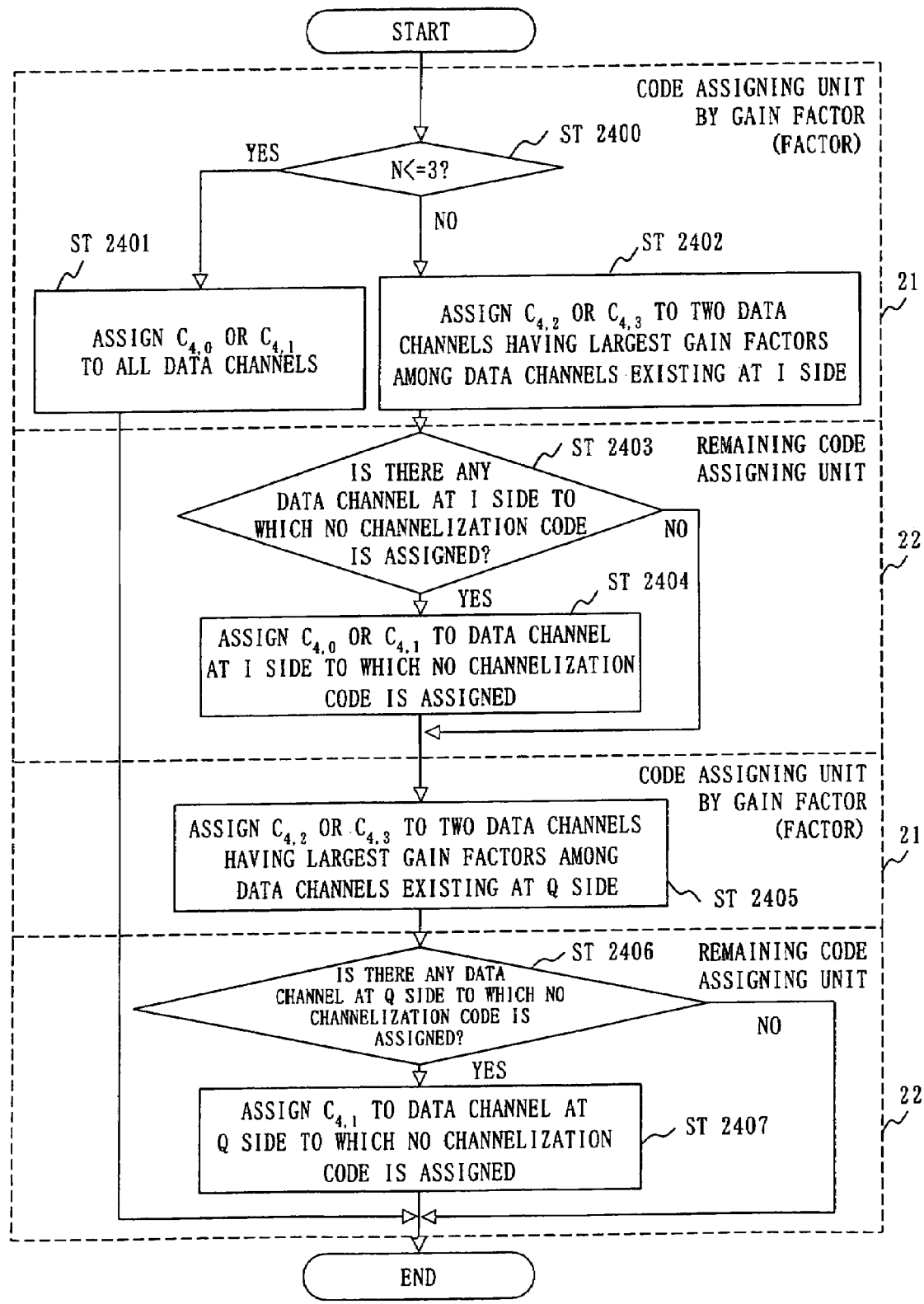
FIG. 21 shows a flowchart for determining assignment of channelization codes based on magnitudes of gain factors when there is an HS-DPCCH according to the fourth embodiment.

When the prohibited code judging unit 41 judges that the HS-DPCCH is at the Q side, a process shown in FIG. 21 is carried out to assign the channelization codes. An explanation for the process of FIG. 21 will be omitted, as the process is the same as that has been explained using FIG. 10.

Figure 22:
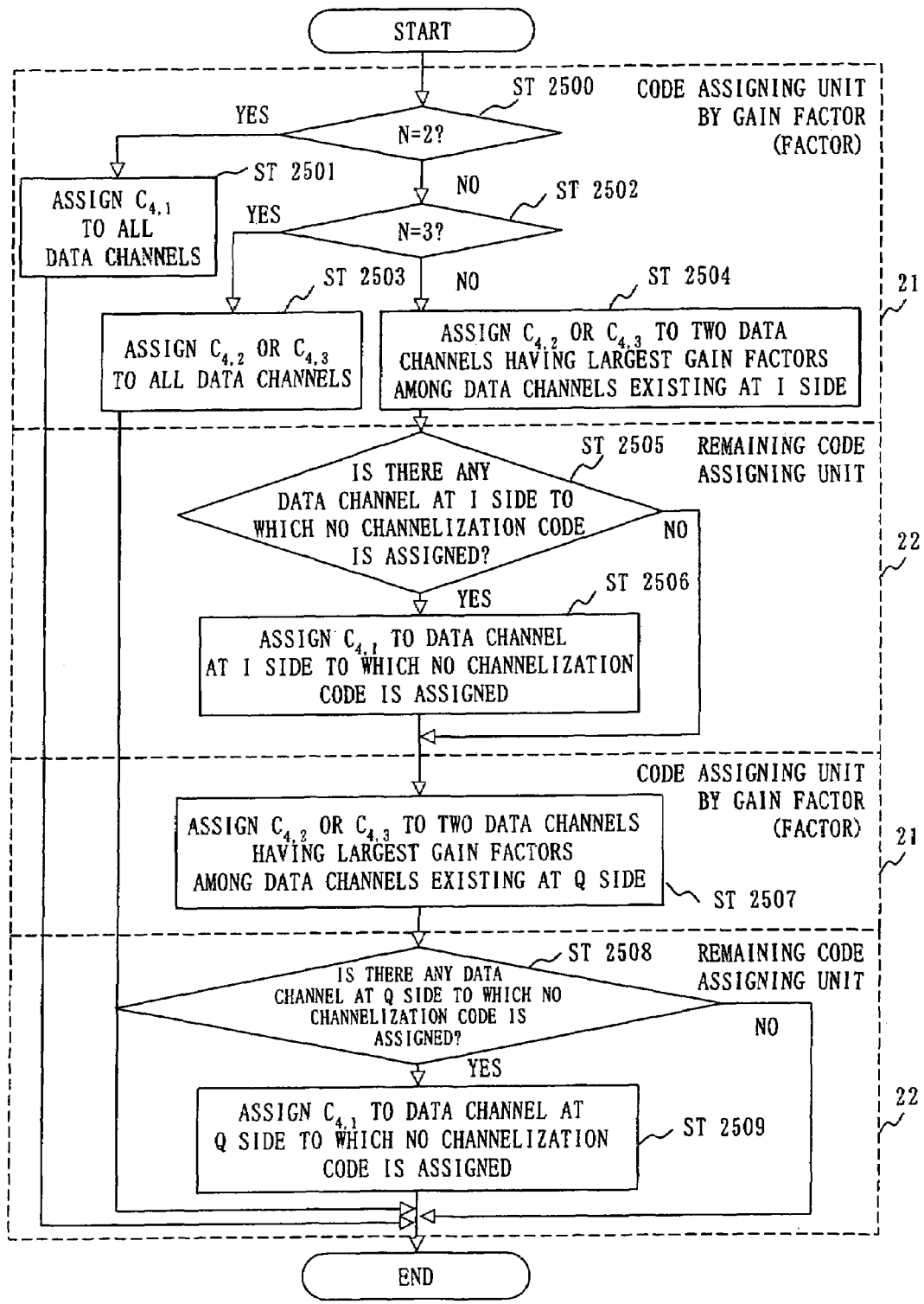
FIG. 22 shows a flowchart for determining assignment of channelization codes based on magnitudes of gain factors when there is an HS-DPCCH according to the fourth embodiment.

On the other hand, if the prohibited code judging unit 41 judges the HS-DPCCH is at the I side, a process which will be explained below and shown in FIG. 22 is carried out to assign the channelization codes. In FIG. 22, at STEP2500, the code assigning unit by gain factor 21 judges if the number N of multiplexed data channels is 2. If the number N of multiplexing is 2, a process of STEP2501 is implemented; if the number N of multiplexing is at least 3, a process of STEP2502 is implemented. At STEP2501, the code assigning unit by gain factor 21 assigns the channelization code $C_{4,1}$ to all data channels, and stores in the memory 15. At STEP2502, the code assigning unit by gain factor 21 judges if the number N of multiplexed data channels is 3. If the number N of multiplexing is 3, a process of STEP2503 is implemented; if the number N of multiplexing is at least 4, a process of STEP2504 is implemented. At STEP2503, the code assigning unit by gain factor 21 assigns the channelization code $C_{4,2}$ or $C_{4,3}$ to all data channels and stores in the memory 15. At STEP2504, the code assigning unit by gain factor 21 assigns the channelization code $C_{4,2}$ or $C_{4,3}$ to two DPDCHs having largest gains among existing data channels to be multiplexed at the I side and stores in the memory 15. At STEP2505, the remaining code assigning unit 22 judges if there is any data channel to which no channelization code is assigned at the I side. If there is, a process of STEP2506 is implemented. If there is not, a process of STEP2507 is implemented. At STEP2506, the remaining code assigning unit 22 assigns the channelization code $C_{4,1}$ to a DPDCH to which no channelization code is assigned and stores in the memory 15. At STEP2507, the code assigning unit by gain factor 21, similarly to the I side, assigns the channelization code $C_{4,2}$ or $C_{4,3}$ to two data channels having largest gains among existing data channels to be multiplexed at the Q side and stores in the memory 15. At STEP2508, the remaining code assigning unit 22 judges if there is any data channel to which no channelization code is assigned at the Q side. If there is, a process of STEP2409 is implemented. If there is not, the operation terminates.

At STEP2509, the remaining code assigning unit 22 assigns the channelization code $C_{4,1}$ to data channels at the Q side to which no channelization code is assigned and stores in the memory 15. Here, $C_{4,0}$ is not used as a channelization code. According to the present embodiment, it is judged if there exists a specific channel, and codes that have little correlation with the code which is determined to be used for the specific channel are used. Therefore, it is possible to reduce the overshoot.

Embodiment 5

In the third embodiment, the assignment of channelization codes is determined based on the kind and performance of the data channels, namely, data amount of the data channels instead of gain factors of the data channels. However, in the third embodiment, a case is not considered, in which an HS-DPCCH is provided as an independent control channel. Hereinafter, in the fifth embodiment, another way to determine the assignment of channelization codes will be explained when an HS-DPCCH is provided as an independent control channel. In the present embodiment, data amount of each data channel is also judged based on (1) through (7) discussed in the third embodiment, and the channelization codes are assigned.

Figure 23:
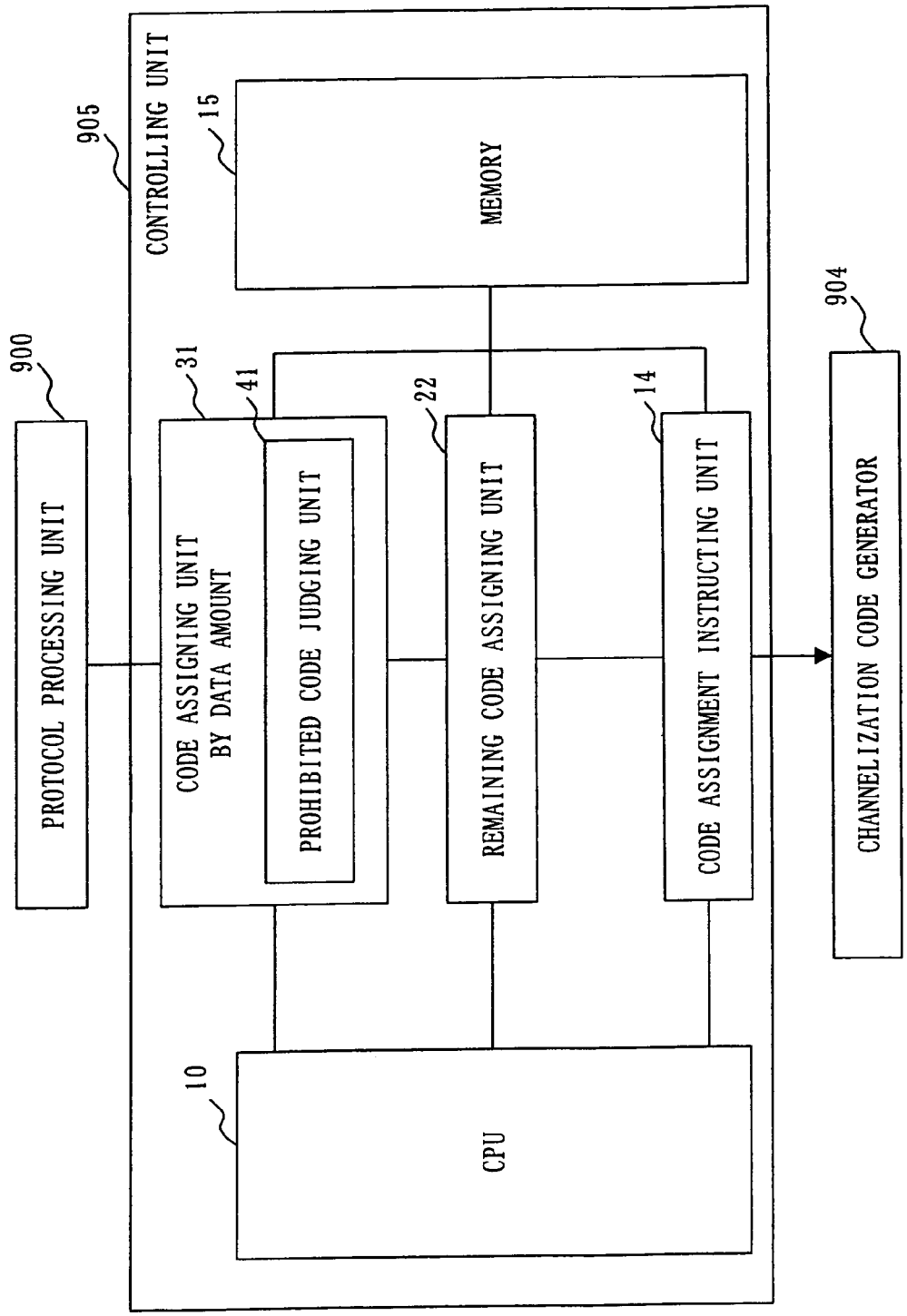
FIG. 23 shows a configuration of a CDMA controlling unit according to a fifth embodiment.

FIG. 23 shows a block diagram of a controlling unit 905 of a communication apparatus according to the fifth embodiment. The code assigning unit by data amount 31 includes a prohibited code judging unit 41 for, when there is a specific kind of channel to which a specific channelization code is assigned, detecting a channelization code which has a correlation with the specific channelization code assigned to the specific kind of channel, and prohibiting the channelization code which is detected to have a correlation from being assigned. For example, the prohibited code judging unit 41 judges whether an HS-DPCCH is at the I side or not. When an HS-DPCCH is at the I side, it is determined not to use $C_{4,0}$ as a channelization code at the I side. The other points are the same as the third embodiment.

Figure 24:
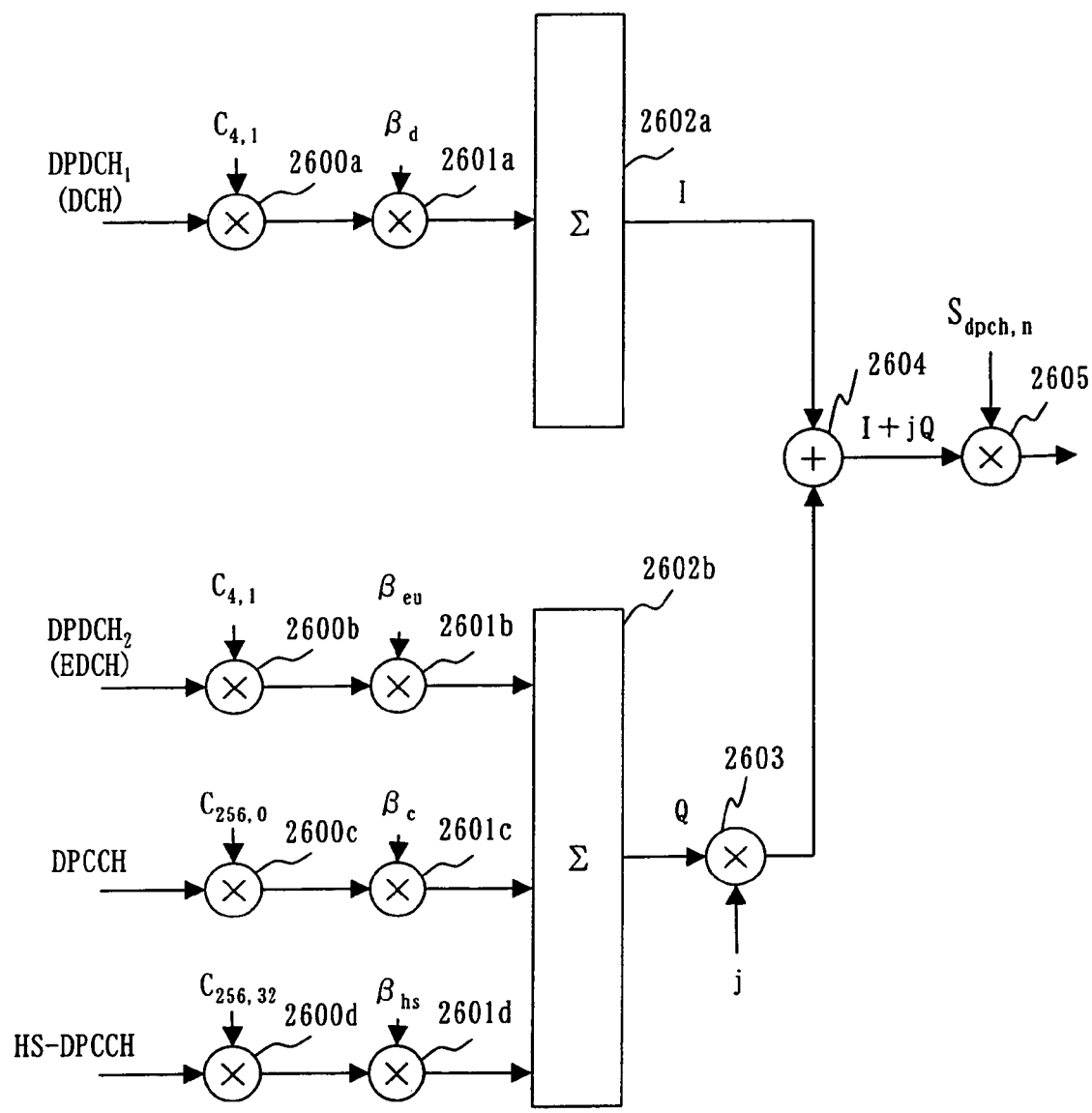
FIG. 24 shows an example of assigning channelization codes based on data amount in case of the number of multiplexing N=2 when there is an HS-DPCCH according to the fifth embodiment.
Figure 25:
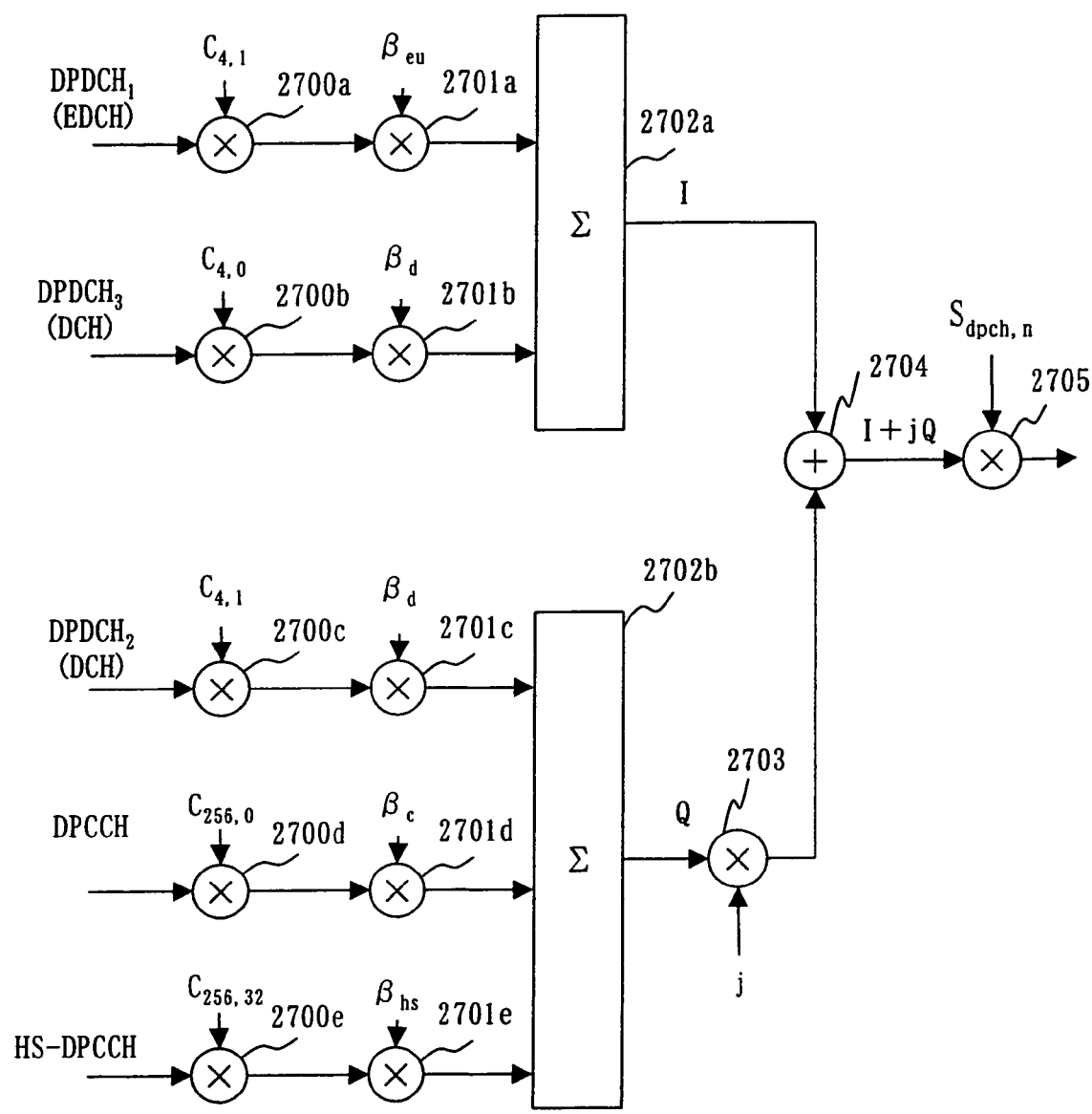
FIG. 25 shows an example of assigning channelization codes based on data amount in case of the number of multiplexing N=3 when there is an HS-DPCCH according to the fifth embodiment.
Figure 26:
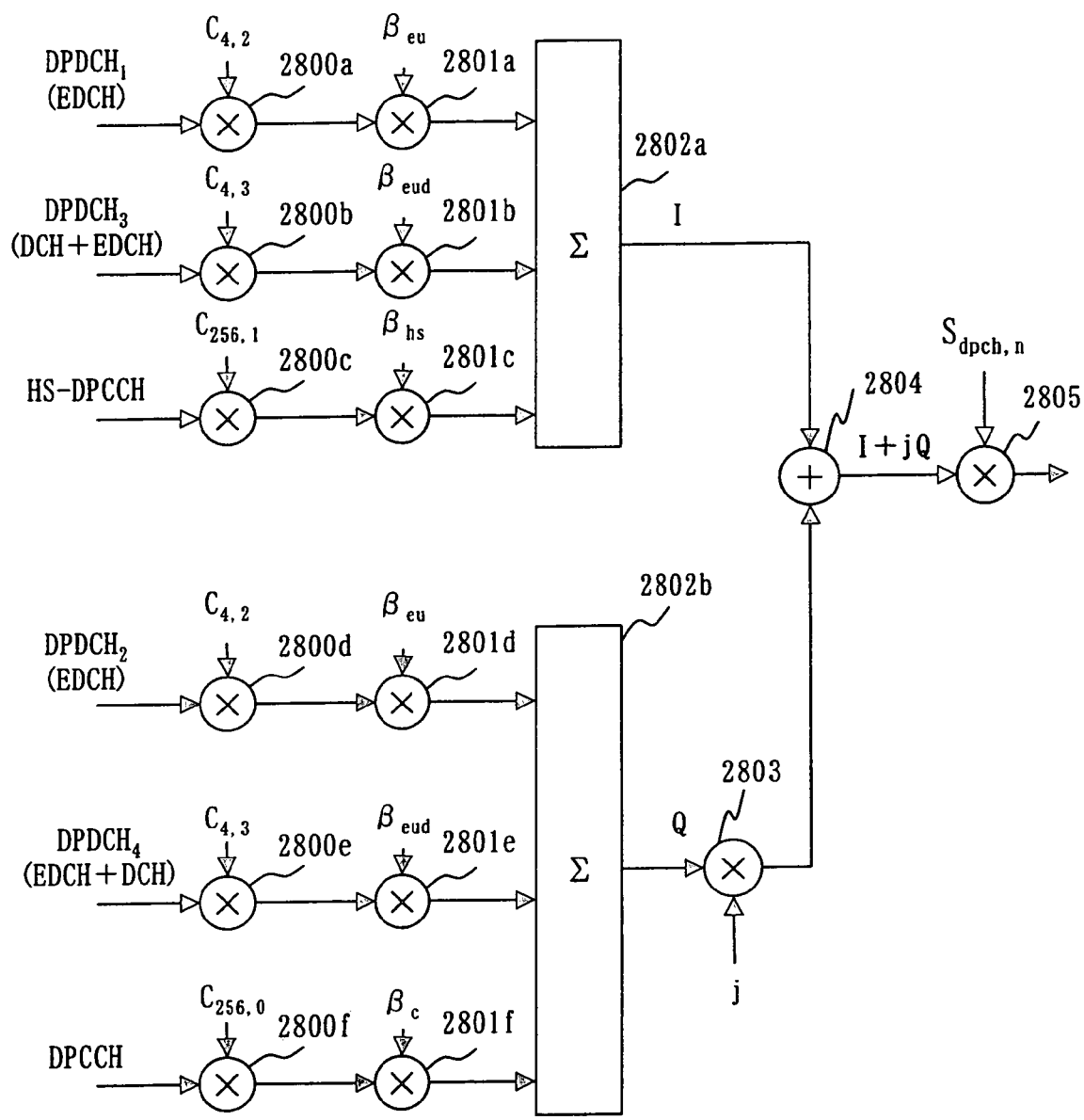
FIG. 26 shows an example of assigning channelization codes based on data amount in case of the number of multiplexing N=4 when there is an HS-DPCCH according to the fifth embodiment.

FIGS. 24 through 28 show ways of assignment according to the fifth embodiment when the number N of multiplex data channels is 2 to 6, respectively. The code assigning unit by data amount 31 limits the assignment of channelization codes to $C_{4,0}$ or $C_{4,1}$ when the number of multiplexing N=2 as shown in FIG. 24. Further, the code assigning unit by data amount 31 also limits the assignment of channelization codes to $C_{4,0}$ or $C_{4,1}$ when the number of multiplexing N=3 and the HS-DPCCH is at the Q side as shown in FIG. 25. The code assigning unit by data amount 31 assigns the channelization codes $C_{4,2}$ or $C_{4,3}$ when the number N of, multiplexing is 4 as shown in FIG. 26 and similarly to the second embodiment and stores in the memory 15.

Figure 27:
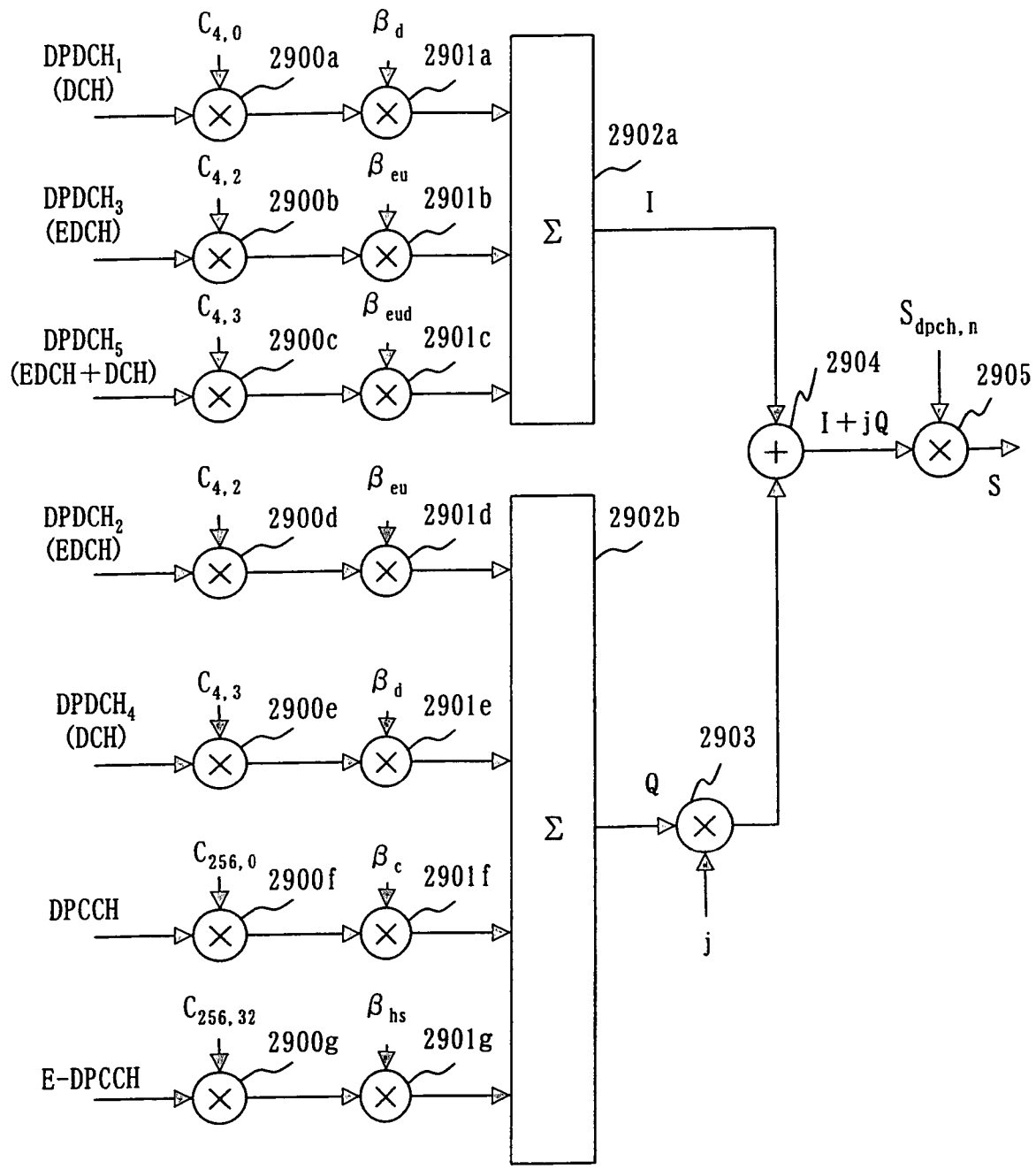
FIG. 27 shows an example of assigning channelization codes based on data amount in case of the number of multiplexing N=5 when there is an HS-DPCCH according to the fifth embodiment.
Figure 28:
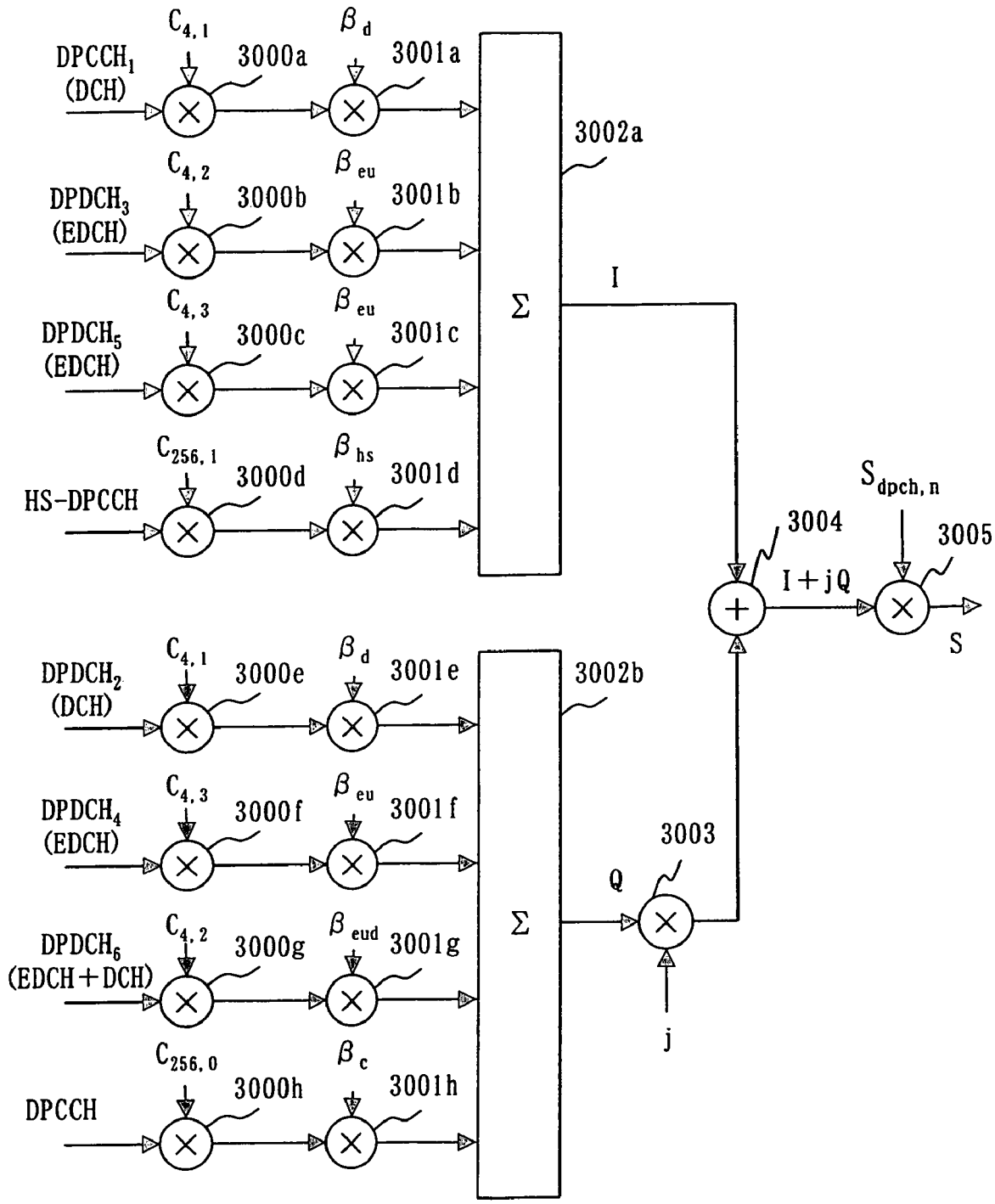
FIG. 28 shows an example of assigning channelization codes based on data amount in case of the number of multiplexing N=6 when there is an HS-DPCCH according to the fifth embodiment.

As shown in FIGS. 27 and 28, in case of the number of multiplexing N≧5, the assignment of codes varies according to a kind of channels. The code assigning unit by data amount 31 assigns, as shown in FIG. 27, as for the channels at the I side, the channelization codes $C_{4,2}$ or $C_{4,3}$ to the data channels of which data amount is large such as $DPDCH_3$ that superimposes E-DCH or $DPDCH_5$ with E-DCH and DCH multiplexed, and stores in the memory 15. The remaining code assigning unit 22 assigns $C_{4,0}$ or $C_{4,1}$ to the data channels of conventional kind of which the data amount is small such as DPDCH, that superimposes only DCH, and stores in the memory 1. In case of the number of multiplexing N=5, $C_{4,2}$ or $C_{4,3}$ is assigned to the channels at the Q side regardless of the data amount, and stores in the memory 15. The code assigning unit by data amount 31 assigns, as shown in FIG. 28, as for the channels at the I side, the channelization codes $C_{4,2}$ or $C_{4,3}$ to the data channels of which data amount is large such as $DPDCH_3$ and $DPDCH_5$ that superimpose E-DCH, and stores in the memory 15. The remaining code assigning unit 22 assigns $C_{4,1}$ to the data channels of which the data amount is small such as DPDCH, that superimposes only DCH, and stores in the memory 15. Further, the code assigning unit by data amount 31 assigns, as for the channels at the Q side, the channelization codes $C_{4,2}$ or $C_{4,3}$ to the data channels of which data amount is large such as $DPDCH_4$ that superimposes E-DCH or $DPDCH_6$ with E-DCH and DCH multiplexed, and stores in the memory 15. The remaining code assigning unit 22 assigns $C_{4,1}$ to the data channels of which the data amount is small such as $DPDCH_2$ that superimposes only DCH, and stores in the memory 15. From FIG. 28, it is understood that the channelization code $C_{4,0}$ cannot be used due to influence of the HS-DPCCH.

According to the present embodiment, it is judged if there exists a specific channel, and codes that has little correlation with the code which is determined to be used for the specific channel are used. Therefore, it is possible to reduce the overshoot.

Embodiment 6

A data channel that will be discussed in the embodiment means an E-DPCCH (Enhanced DPDCH) and does not include a DPDCH. Further, a DPDCH in the sixth embodiment has considerably small data amount compared with an E-DPDCH, and when the spreading factor is sf (>4), the channelization code $C_{sf,SF/4}$ is used. For example, in case of 64 kbps, the channelization code $C_{16,4}$ is used. Further, in this embodiment, it is assumed that as DPDCHs, a data channel with SF=2 and a data channel with SF=4 are multiplexed.

Configurations of a communication apparatus and a controlling unit provided at the communication apparatus according to the present embodiment are the same as ones of the first embodiment shown in FIGS. 1 and 3.

In this embodiment, it is explained that the first embodiment can be accomplished when the smallest SF of the data channels is 2. When SF is 2, if one piece of data is spread, the data becomes two chips. Accordingly, different from the first embodiment, the third chip and the fourth chip are a result obtained from spreading data which is different from the data spread into the first chip and the second chip. Then, in case of SF=2, the phase variation should be considered for only a transition from the first chip to the second chip. Here, it is defined that the phase variation from the first chip to the second chip is θ. Therefore, in case of SF=2, a combination which is the closest to the optimal can be obtained by obtaining a combination of the channelization codes that minimizes $\sin^2 θ$. The chip transition means to move a signal point after spreading is done by the channelization codes, and also means variation of constellations.

Figure 37:
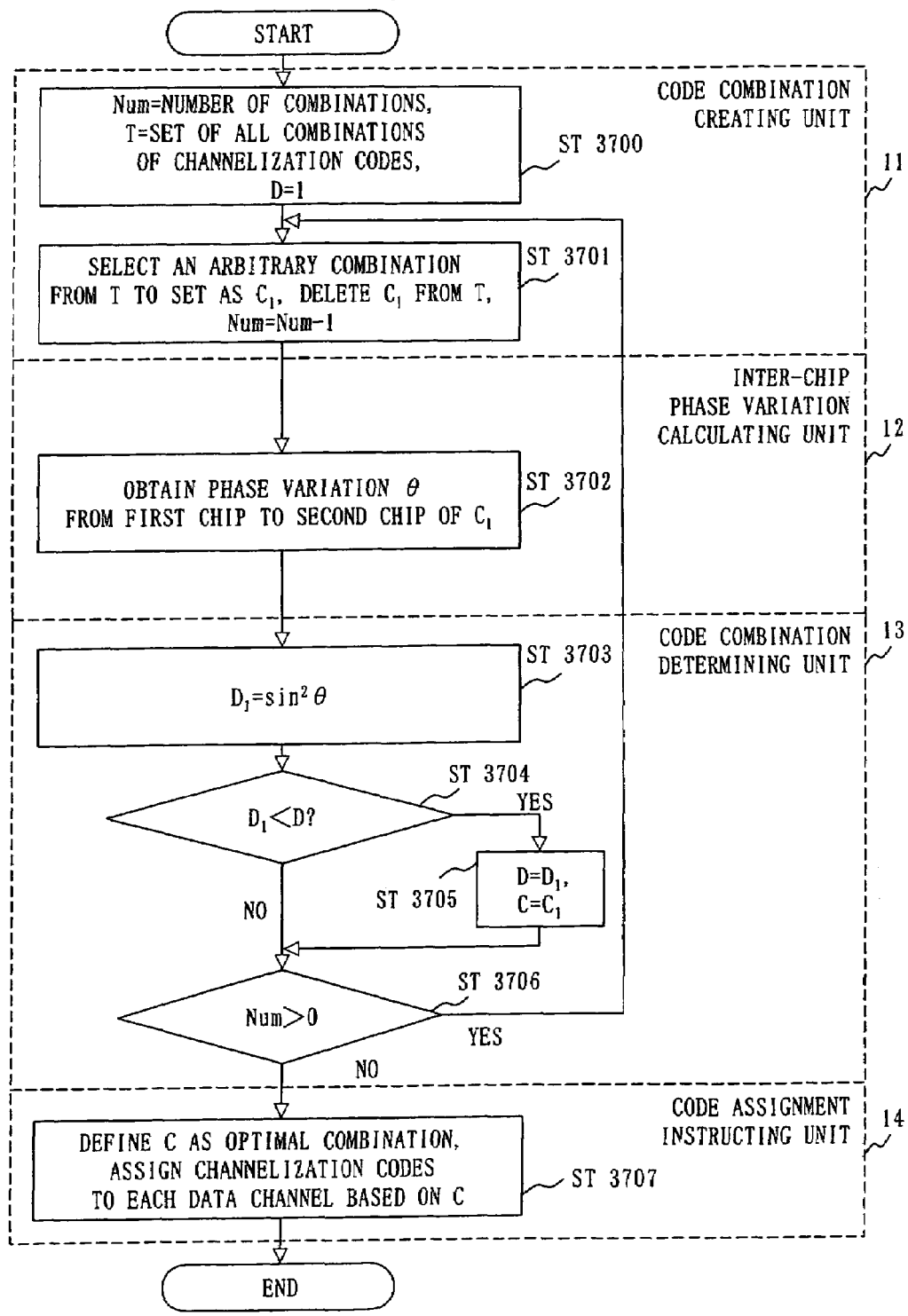
FIG. 37 shows a flowchart for determining assignment of channelization codes by calculating gain factors according to a sixth embodiment.

FIG. 37 is a flowchart showing assignment of the channelization codes implemented by the controlling unit 905 according to the sixth embodiment. First, at STEP3700, the code combination creating unit 11 defines the number of combinations of channelization codes as Num, a set of combinations of all channelization codes as T, and a magnitude of the current overshoot as D, and the code combination creating unit 11 initializes D to the maximum value 1 and stores in the memory 15. At STEP3701, the code combination creating unit 11 sets Num=Num-1, selects an arbitrary combination from T to define as $C_1$, deletes the combination selected from T from the memory 15, and updates the memory 15. At STEP3702, the inter-chip phase variation calculating unit 12 obtains a phase variation θ from the first chip to the second chip in case of assigning the combination $C_1$ to the channels and stores in the memory 15. At STEP3703, the code combination determining unit 13 defines a parameter for obtaining the magnitude of overshoot for the combination $C_1$ as $D_1 = \sin^2 θ$ and stores in the memory 15. At STEP3704, the code combination determining unit 13 judges if the overshoot for $C_1$ is smaller than D. Namely, $D_1 < D$ is examined. If $D_1 < D$, ST3705 is implemented. If not $D_1 < D$, STEP3706 is implemented. At STEP3705, the code combination determining unit 13 replaces C with another combination of the channelization codes which creates smaller overshoot. That is, it sets $C = C_1$ and $D = D_1$ and stores in the memory 15. At STEP3706, if Num>0, the operation returns to STEP3701. If Num≦0, STEP3707 is implemented. At STEP3707, the code assignment instructing unit 14 defines C stored in the memory 15 as the combination which creates the smallest overshoot, and the code assignment instructing unit 14 assigns the channelization codes to each data channel based on this. The code assignment instructing unit 14 notifies the channelization code generator 904 of the assignment of channelization codes.

The present embodiment enables to automatically obtain the combination of channelization codes which generates small overshoot by calculation. Further, the combination of channelization codes is obtained, of which the phase variation from the first chip to the second chip is close to 0 degrees or 180 degrees and thus the phase variation is far from 90 degrees, so that the overshoot can be eliminated. Further, the phase variation from the first chip to the second chip of the I channel and the Q channel is obtained, so that the overshoot caused by the phase variation between an odd-numbered chip and an even-numbered chip can be reduced.

Embodiment 7

Configurations of a communication apparatus according to the present embodiment and a controlling unit provided at the communication apparatus are the same as ones of the first embodiment shown in FIGS. 1 and 3.

In the following, it is explained that the first and the sixth embodiments can be established even if the smallest SF of the data channels is other than 2 or 4 in the present embodiment. Obtaining by calculation similarly to the first and the sixth embodiments is considered when there are data channels (E-DPDCHs) of which SFs are different. For obtaining by calculation, only a transition between chips as many as the smallest SF is considered, since a transition between chips for one piece of data should be considered. When the smallest SF of all data channels (E-DPDCHs) is defined as sf, and a transition from the (2m−1)th chip to the 2mth, chip is defined as $\theta_m$, the channelization codes are assigned so as to minimize $$\sin^2\theta_1 + \sin^2\theta_2 + \ldots + \sin^2\theta_{sf/2}.$$

Figure 38:
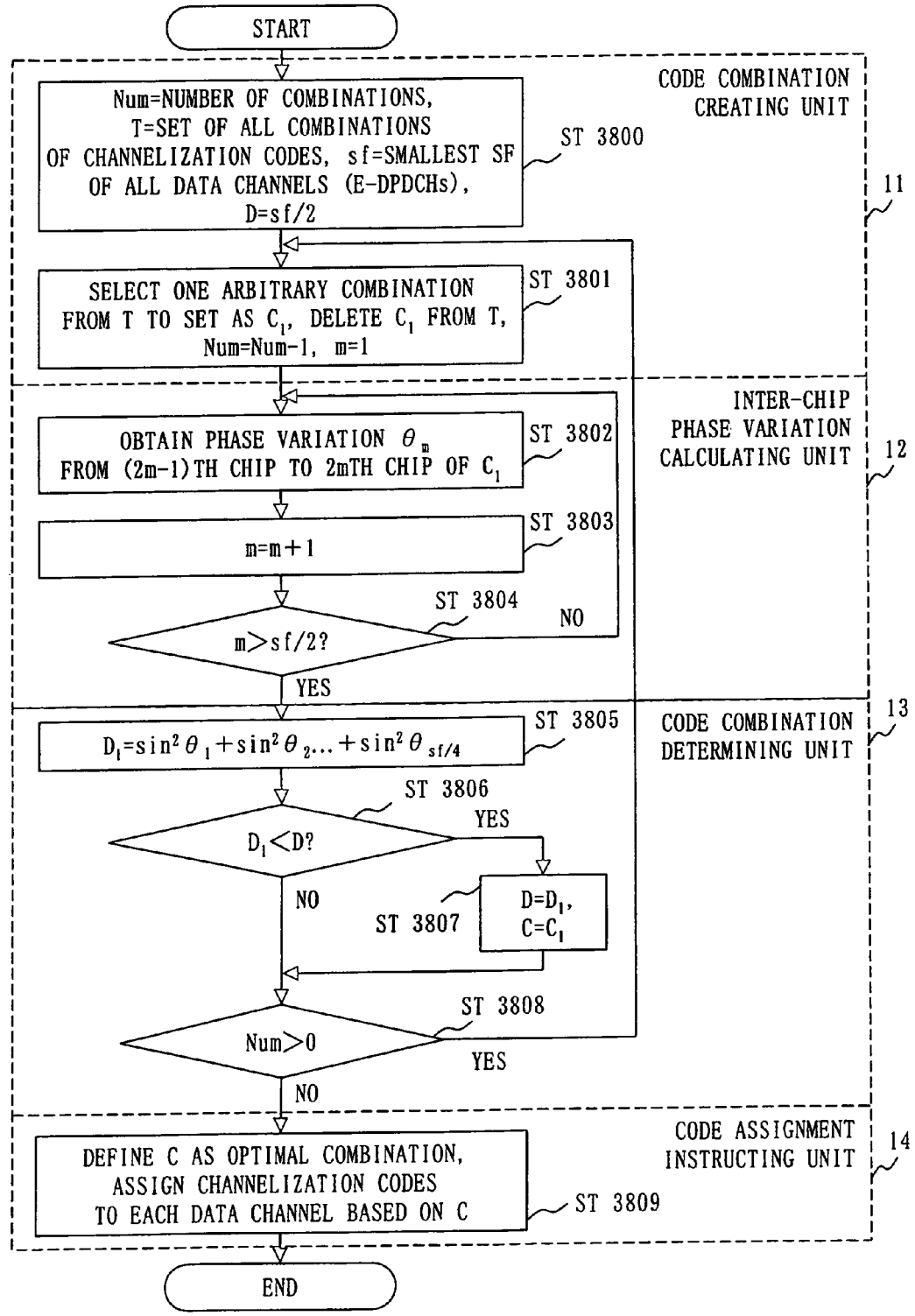
FIG. 38 shows a flowchart for determining assignment of channelization codes by calculating gain factors according to a seventh embodiment.

FIG. 38 is a flowchart showing assignment of channelization codes implemented by the controlling unit 905 according to the seventh embodiment. First, at STEP3800, the code combination creating unit 11 defines the number of combinations of channelization codes as Num, a set of combinations of all channelization codes as T, the smallest SF of all data channels (E-DPDCHs) as sf, and a magnitude of the current overshoot as D, and the code combination creating unit 11 initializes D to the maximum value sf/2 and stores in the memory 15. At STEP3801, the code combination creating unit 11 sets Num=Num−1, initializes m to 1, selects an arbitrary combination from T to define as $C_1$, deletes the combination selected from T from the memory 15, and updates the memory 15. At STEP3802, the inter-chip phase variation calculating unit 12 obtains a phase variation $\theta_m$ from the (2m−1)th chip to the 2m-th chip in case of assigning the combination $C_1$ to the channels and stores in the memory 15. At STEP3803, it is set as m=m+1. At STEP3804, m>sf/2 is examined. If m>sf, STEP3805 is implemented. If not m=sf/2, the operation returns to STEP3802. At STEP3805, the code combination determining unit 13 defines a parameter for obtaining a magnitude of overshoot for the combination $C_1$ as $D_1 = \sin^2\theta_1 + \sin^2\theta_2 + \ldots + \sin^2\theta_{sf/2}$ and stores in the memory 15. At STEP3806, the code combination determining unit 13 judges if the overshoot for C, is smaller than D. Namely, $D_1<D$ is examined. If $D_1<D$, ST3807 is implemented. If not $D_1<D$, STEP3808 is implemented. At STEP3807, the code combination determining unit 13 replaces C with another combination of the channelization codes which creates smaller overshoot. That is, it is set as $C=C_1$ and $D=D_1$, and stores in the memory 15. At STEP3808, if Num>0, the operation returns to STEP3801. If Num≦0, STEP3809 is implemented. At STEP3809, the code assignment instructing unit 14 defines C stored in the memory 15 as an optimal combination, and the code assignment instructing unit 14 assigns the channelization codes to each data channel based on this. The code assignment instructing unit 14 notifies the channelization code generator 904 of the assignment of channelization codes.

In the present embodiment, overshoot for all combination of channelization codes for the data channel are obtained and from that result, a combination of the channelization codes which creates the smallest overshoot is selected. By doing this, a combination of the channelization codes which creates small overshoot can be automatically obtained by calculation even if the smallest SF of the data channels is other than 2 or 4.

Embodiment 8

Configuration of a communication apparatus according to the present embodiment and a controlling unit provided at the communication apparatus are the same as ones of the second embodiment shown in FIG. 9.

In the following explanation, another way is explained to automatically assign the channelization codes based on a gain factor of each data channel instead of obtaining the optimal assignment by calculation like the seventh embodiment. By doing this, it is possible to obtain the same effect with a smaller H/W (hardware) than the seventh embodiment. As has been discussed using FIG. 38, the phase variations among plural chips are respectively calculated for combinations of the channelization codes, and a combination of the channelization codes, with which a sum of overshoots created by the phase variations among plural chips is small, is obtained by calculation according to the seventh embodiment. In the sixth embodiment, more concretely, to obtain a combination of the channelization codes of which a sum of overshoots is small, a combination of the channelization codes, with which the phase variation between the first and second chips is close to 0 degrees or 180 degrees, is obtained. However, in fact at a chip level, since spreading is done by the channelization codes and the calculation result should be stored in H/W, a H/W scale becomes larger in proportion to the number of combinations of the channelization codes. Therefore, instead of obtaining the combination of channelization codes by calculation, another way is explained, in which the phase variation from an odd-numbered chip to an even-numbered chip is made close to 0 degrees or 180 degrees as much as possible and far from 90 degrees as much as possible by assigning the channelization codes to channels from a channel of which the degree of determining the phase variation is high.

First, a transport block size is explained. A transport block size means a size of data transmitted by the terminal. When data to be transmitted is input to a transmission buffer of the terminal, the input data is divided into appropriate sizes according to a unit of transmission time. This data which has been divided into appropriate sizes is referred to as a transport block, and its size is called as a transport block size.

Next, the number of data channels for transmission and determination of SF will be discussed. Once the transport block size is determined, the number of data channels and a spreading factor SF is determined based on algorithm defined in, for example, 3GPP specification document (TS25.212 § 4.8.4.1). When SF is determined, a gain factor is determined. A gain factor is a weighing factor to be multiplied to each data channel (by a unit of symbol) before multiplexing (before multiplication of the channelization codes). Since as the data amount is large, the power necessary for reception becomes large, a larger gain factor is assigned to the data channel. Because of this, the gain factor of the data channel having larger data amount (smaller SF) becomes larger than that of the data channel having smaller data amount (larger SF). For example, the data channel with SF=2 requires twice as much power as the data channel with SF=4 since the data channel with SF=2 transmits twice as much data as the data channel with SF=4. In order to double the power, the amplitude should be multiplied by $\sqrt{2}$. Since the gain factor is a factor to be multiplied to the amplitude, the gain factor of the data channel with SF=2 becomes $\sqrt{2}$ times as large as the gain factor of the data channel with SF=4.

It will be explained that channelization codes (I/Q axis) to be assigned to E-DPDCHs are also determined based on SF, the number of data channels, and the data amount. In this embodiment, channelization codes $C_{SF,k}$ of which the code number k is $0 \leq k \leq (SF/2-1)$ is assigned to data channels from the data channel having a large gain factor for both I and Q axes. Or channelization codes $C_{SF,k}$ of which the code number k is $(SF/2) \leq k \leq (SF-1)$ is assigned. When the operation is explained using a code tree shown in FIG. 41 that will be discussed later, if SF is 2, either of $C_{2,0}$ or $C_{2,1}$ is assigned to a data channel from the data channel having a large gain factor; if SF is 4, both (or either) of $C_{2,0}$ and $C_{2,1}$ or both (or either) of $C_{4,0}$ and $C_{4,1}$ are assigned to data channels from the data channel having a large gain factor. Hereinafter, for convenience of the explanation, in the code tree, branches of which the code number k is $0 \leq k \leq (SF/2-1)$ (in case of SF=4, branches having $C_{4,0}$ and $C_{4}$) are called "the upper side of code tree", and branches of which the code number k is $(SF/2) \leq k \leq (SF-1)$ (in case of SF=4, branches having $C_{4,2}$ and $C_{4,3}$) are called "the lower side of code tree". Namely, in this embodiment, for both I and Q axes, by assigning any of channelization codes located at the upper side (the lower side) of the code tree to the data channel having a large gain factor, and assigning a channelization code located at the lower side (the upper side) of the code tree to the data channel having a small gain factor, the overshoot can be reduced.

When it cannot be obtained by the magnitudes of the gain factors (for example, the values of gain factors are the same), the channelization codes are assigned to data channels from the data channel having large data amount, since it is considered that transmission power of a channel having larger data amount is larger. Since a data channel having a small SF is considered to have larger data amount than a data channel having a large SF, the data is assigned to data channels from the data channel having a small SF. Because of this, a terminal determines channelization codes to be assigned to the data channels based on SF, the number of data channels, and the data amount for each data channel at both I and Q axes.

A definition of a summation of gain factors will be explained. The summation of gain factors means, at a chip before a transition or after the transition, gain factors of the data channels, to which the channelization codes are assigned, summed up at each of the I and Q axes. $\beta_1$ through $\beta_8$ show summations of the gain factors and are defined as follows:

$\beta_1$=a summation of gain factors of which a transition from the first chip to the second chip at the I axis side is (1,1) (a summation of gain factors of data channels, to which channelization codes that make a transition from the first chip to the second chip (1,1) are assigned and of which symbol data is 1)

$\beta_2$=a summation of gain factors of which a transition from the first chip to the second chip at the I axis side is (−1,−1) (a summation of gain factors of data channels, to which channelization codes that make a transition from the first chip to the second chip (1,1) are assigned and of which symbol data is −1)

$\beta_3$=a summation of gain factors of which a transition from the first chip to the second chip at the Q axis side is (1,1) (a summation of gain factors of data channels, to which channelization codes that make a transition from the first chip to the second chip (1,1) are assigned and of which symbol data is 1)

$\beta_4$=a summation of gain factors of which a transition from the first chip to the second chip at the Q axis side is (−1,−1) (a summation of gain factors of data channels, to which channelization codes that make a transition from the first chip to the second chip (1,1) are assigned and of which symbol data is −1)

$\beta_5$=a summation of gain factors of which a transition from the first chip to the second chip at the I axis side is (1,−1) (a summation of gain factors of data channels, to which channelization codes that make a transition from the first chip to the second chip (1,−1) are assigned and of which symbol data is 1)

$\beta_6$=a summation of gain factors of which a transition from the first chip to the second chip at the I axis side is (−1,1) (a summation of gain factors of data channels, to which channelization codes that make a transition from the first chip to the second chip (1,−1) are assigned and of which symbol data is −1)

$\beta_7$=a summation of gain factors of which a transition from the first chip to the second chip at the Q axis side is (1,−1) (a summation of gain factors of data channels, to which channelization codes that make a transition from the first chip to the second chip (1,−1) are assigned and of which symbol data is 1)

$\beta_8$=a summation of gain factors of which a transition from the first chip to the second chip at the Q axis side is (−1,1) (a summation of gain factors of data channels, to which channelization codes that make a transition from the first chip to the second chip (1,−1) are assigned and of which symbol data is −1)

When a transition from an odd-numbered chip to an even-numbered chip is (1,1) or (−1,−1), namely, the phase variation is 0 degrees, the code number k of the channelization codes $C_{SF,k}$ is $0 \leq k \leq (SF/2-1)$, and when a transition from an odd-numbered chip to an even-numbered chip is (1,−1) or (−1, 1), namely, the phase variation is 180 degrees, the code number k of the channelization codes $C_{SF,k}$ is $(SF/2) \leq k \leq (SF-1)$. That is, each of $\beta_1$ through $\beta_4$ is a summation of gain factors for the channelization codes $C_{SF,k}$ of which the code number k is $0 \leq k \leq (SF/2-1)$, and each of $\beta_5$ through $\beta_8$ is a summation of gain factors for the channelization codes $C_{SF,k}$ of which the code number k is $(SF/2) \leq k \leq (SF-1)$.

It will be explained that a summation of gain factors is determined when channelization codes and gain factors are determined. When the smallest SF is 2, only transitions of the first chip and the second chip should be considered, since after the third chip, symbols output from the data channel with SF=2 are different from the symbol of the first chip. If limited to a combination between two chips, a combination of the channelization codes varies only two ways of (1,1) and (1,−1); combinations of chip transitions are four ways of (1,1), (−1,−1), (1,−1), and (1,−1), considering the symbol data. Therefore, if the channelization code is determined, a combination of the chip transitions is determined for each data channel based on the symbol data. Accordingly, a summation of gain factors $\beta_1$ through $\beta_8$ can be obtained by adding the gain factors assigned to each data channel for each combination of the transitions of the same chip at each of I/Q axes.

It will be explained that a chip transition can be determined if summations of gain factors are determined. The magnitude of overshoot can be obtained by the chip transition. Accordingly, among the same symbols, it is preferable to set the phase variation to 0 degrees or 180 degrees as much as possible. The reason of this will be discussed later. A signal constellation can be represented like the following equations (1) and (2) regardless of channels, gain factors, whether symbol data is 1 or (−1), and the number of multiplexing:

$$\text{before transition } (I,Q) = (\beta_1 - \beta_2 + \beta_5 - \beta_6, \beta_3 - \beta_4 + \beta_7 - \beta_8) \quad (1)$$

$$\text{after transition } (I,Q) = (\beta_1 - \beta_2 - \beta_5 + \beta_6, \beta_3 - \beta_4 - \beta_7 + \beta_8) \quad (2)$$

As shown in the above equations (1) and (2), the signal constellations before and after the transition can be expressed by using summations of gain factors, so that the chip transition can be determined if the summations of gain factors are determined.

It will be explained that the summation of gain factors for the channelization $C_{SF,k}$ of which the code number k is $0 \leq k \leq (SF/2-1)$ ($\beta_1$ through $\beta_4$ in the above equations (1), (2)) does not determine the chip transition, but the summation of gain factors for the channelization codes $C_{SF,k}$ of which the code number k is $(SF/2) \leq k \leq (SF-1)$ ($\beta_5$ through $\beta_8$ in the above equations (1), (2)) does affects the chip transition. When $\beta_5$ through $\beta_8$ are 0, the above equations (1) and (2) can be expressed as the following equations (3) and (4):

$$\text{before transition } (I,Q) = (\beta_1 - \beta_2, \beta_3 - \beta_4) \quad (3)$$

$$\text{after transition } (I,Q) = (\beta_1 - \beta_2, \beta_3 - \beta_4) \quad (4)$$

It is found that the signal constellations before/after transition are the same when only the channelization codes $C_{SF,k}$ of which the code number k is $0 \leq k \leq (SF/2-1)$ are used, so that the phase variation from the first chip to the second chip is 0 degrees. This is because $\beta_1$ through $\beta_4$ in the above equations (3) and (4) show a case in which the phase variation from the first chip to the second chip is 0 degrees, which means these values do not determine the chip transition. As for features of the equations (3) and (4), since the part of $\beta_5$ through $\beta_8$ includes different signs, they do not match between before and after the transition. Accordingly, the values of $\beta_5$ through $\beta_8$ affect the chip transition.

The patent document 1 which has been discussed discloses that when the channelization codes $C_{SF,k}$ of which the code number k is $0 \leq k \leq (SF/2-1)$ is assigned to all data channels, the phase variation becomes 0 degrees, which reduces the overshoot. The patent document 1, however, does not disclose assignment of the channelization codes when the number of data channels is large, for example, the number of data channels is larger than the number of channels to which the channelization codes $C_{SF,k}$ of which the code number k is $0 \leq k \leq (SF/2-1)$ can be assigned. Further, it does not disclose assignment of the channelization codes to data channels of which the gain factors are different. Therefore, another method will be explained for assigning the channelization codes when the number of data channels is large, and thus the channelization codes $C_{SF,k}$ of which the code number k is $0 \leq k \leq (SF/2-1)$ cannot be assigned to all data channels. $\beta_1$ through $\beta_4$ which are features of the equations (3) and (4) do not determine the chip transition, but express how far the points before/after the transition are from a point of origin, and $\beta_5$ through $\beta_8$ affect the chip transition. Among transitions of the same chips, the phase variation becomes small if one is far from the point of origin. Because of this, the overshoot can be reduced when the channelization codes are assigned so that $\beta_1$ through $\beta_4$ should be made large and $\beta_5$ through $\beta_8$ should be made small. Accordingly, it is considered that the overshoot can be reduced by assigning the channelization codes $C_{SF,k}$ of which the code number k is $0 \leq k \leq (SF/2-1)$ to data channels having larger gain factors and then assigning the channelization codes $C_{SF,k}$ of which the code number k is $(SF/2) \leq k \leq (SF-1)$ to the remaining data channels.

A concrete example will be explained, in which the summation of gain factors for the channelization codes $C_{SF,k}$ of which the code number k is $0 \leq k \leq (SF/2-1)$ ($\beta_1$ through $\beta_4$ in the above equations (1), (2)) does not determine the chip transition, but the summation of gain factors for the channelization codes $C_{SF,k}$ of which the code number k is $(SF/2) \leq k \leq (SF-1)$ ($\beta_5$ through $\beta_8$ in the above equations (1), (2)) affects the chip transition. As a condition of the concrete example, it is assumed that there are one data channel with SF=2 (the gain factor is corrected by being multiplied by $\sqrt{2}$) and one data channel with SF=4 (the gain factor is 1) at the I and Q axes, respectively. Namely, it is when there are two channels with SF=2 and two channels with SF=4. It is assumed that there are one data channel with SF=2 and one data channel with SF=4 at the I and Q axes, respectively. Here, a clash of the channelization codes with another channel such as a control channel is not considered. $C_{2,0}$ is assigned to the data channel with SF=2 of which the gain factor is large, that is, the data channel with SF=2, to which the gain factor value multiplied by $\sqrt{2}$ is multiplied, and $C_{4,2}$ (or $C_{4,3}$) is assigned to the data channel with SF=4 of which the gain factor is small. It is assumed that a symbol of the data channel with SF=2 at the I axis is 1, that a symbol of the data channel with SF=2 at the Q axis is −1, that a symbol of the data channel with SF=4 at the I axis is 1, and that a symbol of the data channel with SF=4 at the Q axis is −1. In such a case, when summations of gain factors are obtained, $\beta_1 = \sqrt{2}$, $\beta_2 = 0$, $\beta_3 = 0$, $\beta_4 = \sqrt{2}$, $\beta_5 = 1$, $\beta_6 = 0$, $\beta_7 = 0$, and $\beta_8 = 1$. By substituting these values to the equations (1) and (2), signal constellations before/after the transition are obtained as follows:

$$\text{before transition } (I, Q) = (\sqrt{2}+1, -\sqrt{2}-1) \quad (5)$$

$$\text{after transition } (I, Q) = (\sqrt{2}-1, -\sqrt{2}+1) \quad (6)$$

In this case, the channelization codes $C_{SF,k}$ of which the code number k is $0 \leq k \leq (SF/2-1)$ are assigned to data channels from the data channel of which the gain factor is large.

In the equations (5) and (6), $\sqrt{2}$ shows a summation ($\beta_1$ through $\beta_4$) of the gain factors of which values are the same in the signal constellations before/after the transition, and 1 shows a summation ($\beta_5$ through $\beta_8$) of the gain factors of which positive or negative signs are opposite in the signal constellations before/after the transition. Accordingly, while the summation ($\beta_1$ through $\beta_4$) of the gain factors of which values are the same in the signal constellations shown by the equations (5) and (6) before/after the transition is $\sqrt{2}$, the summation ($\beta_5$ through $\beta_8$) of the gain factors of which positive or negative signs are opposite in the signal constellations before/after the transition is 1, so that the summation ($\beta_5$ through $\beta_8$) of the gain factors is always smaller than the summation ($\beta_1$ through $\beta_4$) of the gain factors at both the I and Q axes. Because of this, in the signal constellations before/after the transition, the summation ($\beta_1$ through $\beta_4$) of the gain factors always determine the positive or negative signs in the signal constellations before/after the transition. Therefore, in the equation (1) before the transition and the equation (2) after the transition, the summation ($\beta_1$ through $\beta_4$) of the gain factors at the I axis ($\beta_1$-$\beta_2$) and the Q axis ($\beta_3$-$\beta_4$) are the same form, so that the summation ($\beta_1$ through $\beta_4$) of gain factors does not reverse the positive or negative signs of the components of the I and Q axes before/after the chip transition.

A concrete example will be explained, in which the overshoot can be reduced if the summation of gain factors for the channelization codes $C_{SF,k}$ of which the code number k is $0 \leq k \leq (SF/2-1)$ ($\beta_1$ through $\beta_4$ in the above equations (1), (2)) is made large, and the summation of gain factors for the channelization codes $C_{SF,k}$ of which the code number k is $(SF/2) \leq k \leq (SF-1)$ ($\beta_5$ through $\beta_8$ in the above equations (1), (2)) is made small. When ($\beta_1-\beta_2+\beta_5-\beta_6$) which is a component of the I axis before the chip transition is compared with ($\beta_1-\beta_2-\gamma_5+\beta_6$) which is a component of the I axis after the chip transition, the components of the I axis are both positive, and the positive or negative signs are not reversed. When the components of the Q axis are compared as well, the components of the Q axis are both negative, and the positive or negative signs are not reversed. Therefore, the phase variation is very small, since the positive or negative signs are not reversed at each of the I/Q axes. In the case when a symbol is changed, the case is equivalent to that of the corresponding summation ($\beta_1$ through $\beta_8$) of gain factors being multiplied by (−1). Nevertheless, it is understood that the absolute values are not changed if a symbol of any data channel is changed, and thus the positive or negative sign is not reversed at each of the I/Q axes.

It will be explained that the summation of gain factors for the channelization $C_{SF,k}$ of which the code number k is $(SF/2) \leq k \leq (SF-1)$ ($\beta_5$ through $\beta_8$ in the above equations (1), (2)) affects the chip transition to reverse the positive or negative signs, and the summation of gain factors for the channelization codes $C_{SF,k}$ of which the code number k is $0 \leq k \leq (SF/2-1)$ ($\beta_1$ through $\beta_4$ in the above equations (1), (2)) does not affect the chip transition. When $\beta_1$ through $\beta_4$ are 0 in the above equations (1) and (2), the following can be said:

$$\text{before transition } (I,Q) = (\beta_5-\beta_6, \beta_7-\beta_8) \quad (7)$$

$$\text{after transition } (I,Q) = (-\beta_5+\beta_6, -\beta_7+\beta_8) \quad (8)$$

When only the channelization codes $C_{SF,k}$ of which the code number k is $0 \leq k \leq (SF/2-1)$ are used like the equations (7) and (8), the positive or negative signs of the signal constellations are reversed before/after the transition at both I and Q axes as shown in the equations (7) and (8), so that the equations are symmetric about the origin. Accordingly, the phase variation from the first chip to the second chip becomes 180 degrees. This is because $\beta_1$ through $\beta_4$ in the above equations (1), (2) show cases in which the phase variation from the first chip to the second chip is 0 degrees, and thus these values do not determine the chip transition. Upon considering features of the equations (1) and (2), the same signs are appended to each part of $\beta_1$ through $\beta_4$ so that they match before/after the chip transition. Therefore, the signal constellations are moved to the same direction and at the same amount before/after the chip transition based on the values of $\beta_1$ through $\beta_4$, and their form becomes less symmetric about the point of origin by the amount, so that the phase variation becomes small.

If the channelization codes $C_{SF,k}$ of which the code number k is $(SF/2) \leq k \leq (SF-1)$ are assigned to all data channels, the phase variation becomes 180 degrees, which leads to small overshoot. In the above-described ways, however, there may be a case no channelization codes can be assigned when the number of data channels is large. Another method will be explained for assigning the channelization codes when the number of data channels is greater than, for example, the number to which the channelization codes $C_{SF,k}$ of which the code number k is $(SF/2) \leq k \leq (SF-1)$ can be assigned. $\beta_5$ through $\beta_8$ which are features in the above equations (1), (2) show cases in which the phase variation becomes 180 degrees, so that $\beta_1$ through $\beta_4$ which do not determine the chip transition have an effect to reduce the phase variation. Therefore, when the channelization codes are assigned so as to make $\beta_5$ through $\beta_8$ large and $\beta_1$ through $\beta_4$ small, the phase variation becomes close to 180 degrees, and thus the overshoot is small. Then, it is considered that the overshoot can be reduced if the channelization codes $C_{SF,k}$ of which the code number k is $(SF/2) \leq k \leq (SF-1)$ are assigned to data channels from the data channel of which the gain factor is large and the channelization codes $C_{SF,k}$ of which the code number k is $0 \leq k \leq (SF/2-1)$ are assigned to the remaining data channels.

A concrete example will be explained, in which a summation of gain factors for the channelization codes $C_{SF,k}$ of which the code number k is $(SF/2) \leq k \leq (SF-1)$ ($\beta_5$ through $\beta_8$ in the above equations (1), (2)) does not determine a chip transition, but the summation of gain factors for the channelization codes $C_{SF,k}$ of which the code number k is $0 \leq k \leq (SF/2-1)$ ($\beta_1$ through $\beta_4$ in the above equations (1), (2)) affects the chip transition. As a condition of the concrete example, it is assumed that there are one data channel with SF=2 (the gain factor is $\sqrt{2}$) and one data channel with SF=4 (the gain factor is 1) at each of the I and Q axes. Namely, it is when there are two channels with SF=2 and two channels with SF=4. It is assumed that there are one data channel with SF=2 and one data channel with SF=4 at each of the I and Q axes. $C_{2,1}$ is assigned to the data channel with SF=2 of which the gain factor is large, and $C_{4,0}$ (or $C_{4,1}$) is assigned to the data channel with SF=4 of which the gain factor is small. In case that a symbol of the data channel with SF=2 at the I axis is 1, a symbol of the data channel with SF=2 at the Q axis is −1, a symbol of the data channel with SF=4 at the I axis is 1, and a symbol of the data channel with SF=4 at the Q axis is −1, when a summation of gain factors is obtained, $\beta_1=1$, $\beta_2=0$, $\beta_3=0$, $\beta_4=1$, $\beta_5=\sqrt{2}$, $\beta_6=0$, $\beta_7=0$, and $\beta_8=\sqrt{2}$. By substituting these values to the equations (1) and (2), signal constellations before/after the transition are obtained as follows:

$$\text{before transition } (I, Q) = (1+\sqrt{2}, -1-\sqrt{2}) \quad (9)$$

$$\text{after transition } (I, Q) = (1-\sqrt{2}, -1+\sqrt{2}) \quad (10)$$

In this case, the channelization codes $C_{SF,k}$ of which the code number k is $(SF/2) \leq k \leq (SF-1)$ are assigned to data channels from the data channel of which the gain factor is large.

In the equations (9) and (10), $\sqrt{2}$ shows a summation ($\beta_5$ through $\beta_8$) of the gain factors of which positive or negative signs are opposite in the signal constellations before/after the transition, and 1 shows a summation ($\beta_1$ through $\beta_4$) of the gain factors of which values are the same in the signal constellations before/after the transition. Accordingly, while the summation ($\beta_5$ through $\beta_8$) of the gain factors of which positive or negative signs are opposite in the signal constellations shown by the equations (9) and (10) before/after the transition is $\sqrt{2}$, the summation ($\beta_1$ through $\beta_4$) of the gain factors of which values are the same in the signal constellations before/after the transition is 1, so that the summation ($\beta_1$ through $\beta_4$) of the gain factors is always smaller than the summation ($\beta_5$ through $\beta_8$) of the gain factors at both the I and Q axes. Because of this, in the signal constellations before/after the transition, the summation ($\beta_5$ through $\beta_8$) of the gain factors always determine the positive or negative signs in the signal constellations before/after the transition. Therefore, in the equation (1) before the transition and the equation (2) after the transition, positive or negative signs of the summation ($\beta_5$ through $\beta_8$) of the gain factors are opposite such as at the I axis ($\beta_5-\beta_6$) and the Q axis ($\beta_7-\beta_8$) in the equation (1), while the I axis ($\beta_6-\beta_5$) and the Q axis ($\beta_8-\beta_7$) in the equation (2), so that the summation ($\beta_5$ through $\beta_8$) of the gain factors always reverse the positive or negative signs of the components of the I and the Q axes before/after the chip transition.

A concrete example will be explained, in which the overshoot can be reduced if a summation of gain factors for the channelization codes $C_{SF,k}$ of which the code number k is $(SF/2) \leq k \leq (SF-1)$ ($\beta_5$ through $\beta_8$ in the above equations (1), (2)) is made large, and a summation of gain factors for the channelization codes $C_{SF,k}$ of which the code number k is $0 \leq k \leq (SF/2-1)$ ($\beta_1$ through $\beta_4$ in the above equations (1), (2)) is made small. When ($\beta_1 - \beta_2 + \beta_5 - \beta_6$) which is a component of the I axis before the transition is compared with ($\beta_1 - \beta_2 - \beta_5 + \beta_6$) which is a component of the I axis after the transition, the component of the I axis is positive before the chip transition and negative after the chip transition, and the positive or negative sign is reversed. When the components of the Q axis are compared as well, the component of the Q axis before the chip transition is negative and positive after the chip transition, and the positive or negative sign is reversed. Therefore, the phase variation is very large, since the positive or negative signs are always reversed at each of the I/Q axes. In the case when a symbol is changed, the case is equivalent to that of the corresponding summation ($\beta_1$ through $\beta_8$) of the gain factors being multiplied by (−1). Nevertheless, it is understood that the positive or negative signs are always reversed at each of the I/Q axes if a symbol of any data channel is changed.

It will be explained that when summations of gain factors are determined, a weighing factor for a chip of the I/Q axes is determined. A weighing factor for a chip of the I/Q axes means components (components of horizontal and vertical axes when a vector is decomposed into orthogonal axes) of the I/Q axes of the chip right before the HPSK modulation before the transition or after the transition. Namely, a weighing factor is a factor multiplied to the I/Q plane axes (by chip unit) after the multiplex (after multiplication of channelization codes to each of data channels). As shown in the equations (1) and (2), the weighing factor for the chip of the I/Q axes is defined by the summation of gain factors $\beta_1$ through $\beta_8$, so that the weighing factor is automatically determined if the summation of gain factors is determined (since each of the data channels is multiplexed and arranged into one signal space, a location where a certain chip of one data channel is arranged depends on each symbol data of the data channel and the gain factor multiplied to the symbol data).

It will be explained that a phase variation (angle) is determined if a weighing factor for the chip of the I,Q axes is determined. The equation (1) shows a weighing factor for the chip of the I/Q axes before the transition, and the equation (2) shows a weighing factor for the chip of the I/Q axes after the transition. Since each weighing factor for the chip of I/Q axes shows a component of the I/Q axes of a constellation, constellations before the transition and after the transition can be obtained from the equations (1) and (2), and the transition of chip can be obtained by calculating a difference of the two equations.

It will be explained that when all of the channelization codes $C_{SF,k}$ of which the code number k is $(SF/2) \leq k \leq (SF-1)$ are assigned to channels having larger gain factors, and the channelization codes $C_{SF,k}$ of which the code number k is $0 \leq k \leq (SF/2-1)$ are assigned to channels having smaller gain factors, the phase variation becomes close to 0 degrees or 180 degrees. In order to make the overshoot small, it is desired not to mix $C_{2,0}$, $C_{4,0}$, $C_{4,1}$ with $C_{2,1}$, $C_{4,2}$, $C_{4,3}$ as much as possible. As the phase variation $\theta$ is determined by $\beta_1$ through $\beta_8$ which are the summations of gain factors, $C_{2,0}$, $C_{4,0}$, $C_{4,1}$ or $C_{2,1}$, $C_{4,2}$, $C_{4,3}$ is assigned to channels from the channel which has a higher degree of determining the phase variation $\theta$. The phase variation $\theta$ is determined by the chip transition, namely, by the weighing factor for the chip of the I/Q axes. To have a higher degree of determining the phase variation $\theta$ means that the weighing factor for the chip of the I/Q axes is large, namely, the gain factor or data amount is large, and SF is small. Therefore, when $C_{2,0}$, $C_{4,0}$, $C_{4,1}$ ($C_{2,1}$, $C_{4,2}$, $C_{4,3}$) are assigned to channels from the channel which has a higher degree of determining the phase variation $\theta$, the phase variation $\theta$ becomes 0 degrees or 180 degrees, and the overshoot can be reduced. Size of the effect given to $\beta_1$ through $\beta_8$ can be obtained by the gain factor, so that, as well as the second embodiment, it is preferable to assign $C_{2,0}$, $C_{4,0}$, $C_{4,1}$ ($C_{2,1}$, $C_{4,2}$, $C_{4,3}$) to channels from a channel having a larger gain factor as much as possible.

A case will be explained, in which only one data channel having a large gain factor uses all of the channelization codes $C_{SF,k}$ of which the code number k is $0 \leq k \leq (SF/2-1)$ in both I/Q axes. In such a case, the channelization codes $C_{SF,k}$ of which the code number k is $(SF/2) \leq k \leq (SF-1)$ are assigned to a channel having a small gain factor, and the channelization codes $C_{SF,k}$ of which the code number k is $0 \leq k \leq (SF/2-1)$ are assigned to a channel having a large gain factor, and consequently, the overshoot becomes small. In either of the I/Q axes, when only one data channel having a large gain factor uses all of the channelization codes $C_{SF,k}$ of which the code number k is $0 \leq k \leq (SF/2-1)$, if the channelization codes $C_{SF,k}$ of which the code number k is $0 \leq k \leq (SF/2-1)$ are assigned to the channel having a large gain factor, it is always determined that the channelization codes $C_{SF,k}$ of which the code number k is $(SF/2) \leq k \leq (SF-1)$ are assigned to the remaining data channels in the same axes. This means that it is always determined that the channelization codes $C_{SF,k}$ of which the code number k is $0 \leq k \leq (SF/2-1)$ are assigned to the data channel of which the gain factor is large if a channelization code $C_{SF,k}$ of which the code number k is $(SF/2) \leq k \leq (SF-1)$ is assigned to one of data channels of which the gain factors are not large. It is similarly true in case that the channelization codes $C_{SF,k}$ of which the code number k is $(SF/2) \leq k \leq (SF-1)$ are assigned to a data channel of which the gain factor is large. In such a case, assigning the channelization codes $C_{SF,k}$ of which the code number k is $0 \leq k \leq (SF/2-1)$ from a data channel of which the gain factor is large is equivalent to assigning the code number k is $(SF/2) \leq k \leq (SF-1)$ from a data channel of which the gain factor is small. Because of this, when only one data channel having a large gain factor uses all the channelization codes of the upper side, the channelization codes can be assigned from a data channel having a small gain factor. For example, when there are one data channel with SF=2 and one data channel with SF=4 in the I/Q axes, respectively, the data channel with SF=2 uses all codes of one side, so that assignment can be carried out from the data channel with SF=2 or from the data channel with SF=4.

It will be explained that the phase variation approaches to 90 degrees if one having a large gain factor and one having a small gain factor are alternately assigned. In case that the channelization codes are assigned alternately to one having a large gain factor and one having a small gain factor, when there are, for example, two data channels with SF=2 and two data channels with SF=4 (one in each of I/Q axes), if $C_{2,0}$ is assigned to the data channel with SF=2 at the I side, $C_{4,1}$ is assigned to the data channel with SF=4 at the Q side, $C_{4,2}$ is assigned to the data channel with SF=4 at the I side, and $C_{2,1}$ is assigned to the data channel with SF=2 at the Q side, the phase variation is close to 90 degrees.

Figure 39:
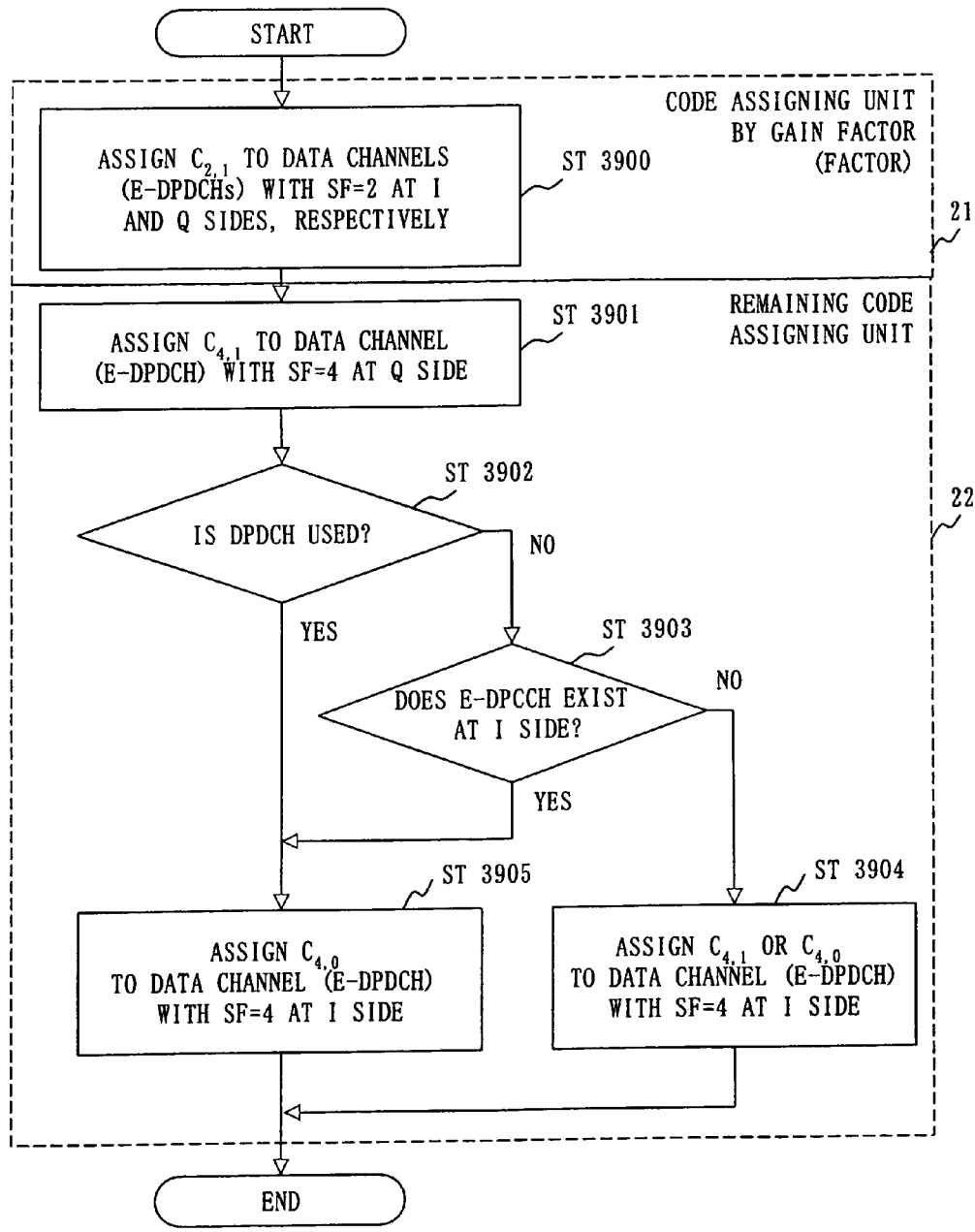
FIG. 39 shows a flowchart for determining assignment of channelization codes based on a magnitude of SF when there is no HS-DPCCH according to an eighth embodiment.

FIG. 39 is a flowchart showing assignment of the channelization codes based on the size of SF when there is no HS-DPCCH. At STEP3900, the code assigning unit by gain factor 21 assigns $C_{2,1}$ to data channels (E-DPDCHs) with SF=2 at the I and Q sides, respectively and stores in the memory 15. By assigning the channelization codes to the data channels of which SF is small beforehand, it is possible to reduce the overshoot as well as the first to seventh embodiments that have been discussed above. In the following STEP3901 through STEP3905, a way will be explained in which unused channelization codes are assigned efficiently to the data channels. At STEP3901, the remaining code assigning unit 22 assigns $C_{4,1}$ to a data channel (E-DPDCH) with SF=4 at the Q side and stores in the memory 15. At STEP3902, the remaining code assigning unit 22 judges if a DPDCH is used. If a DPDCH is used, STEP3905 is implemented. On the other hand, if a DPDCH is not used, STEP3903 is implemented. At STEP3903, the remaining code assigning unit 22 judges if an E-DPCCH is at the I side. If an E-DPCCH is at the I side, STEP3905 is implemented. If an E-DPCCH is not at the I side, STEP3904 is implemented. At STEP3904, the remaining code assigning unit 22 assigns $C_{4,1}$ or $C_{4,0}$ to the data channel (E-DPDCH) with SF=4 at the I side and stores in the memory 15. At STEP3905, the remaining code assigning unit 22 assigns $C_{4,0}$ to the data channel (E-DPDCH) with SF=4 at the I side and stores in the memory 15.

As for the channelization code for an E-DPCCH, it is preferable to use the channelization code $C_{256,k}$ ($64 \leq k \leq 127$) so that one data channel (E-DPDCH) with SF=2 and one data channel (E-DPDCH) with SF=4 should be superimposed at the I side. The reason of this will be discussed later. However, this assumption is applied to a case when there are some possibilities to use a DPDCH while an E-DPDCH is used, and if a DPDCH is not used while an E-DPDCH is used, k can be any value as long as $0 \leq k \leq 127$. In this case, at STEP3905, if the code number k for an E-DPCCH is $0 \leq k \leq 63$, $C_{4,1}$ is assigned to the data channel (E-DPDCH), and if the code number k for the E-DPCCH is $64 \leq k \leq 127$, $C_{4,0}$ is assigned to the data channel (E-DPDCH). This flowchart does not define an order of time to assign the channelization codes, but defines an order of priority to assign. For example, a timing when the controlling unit 905 sets the channelization codes can be the same.

Figure 40:
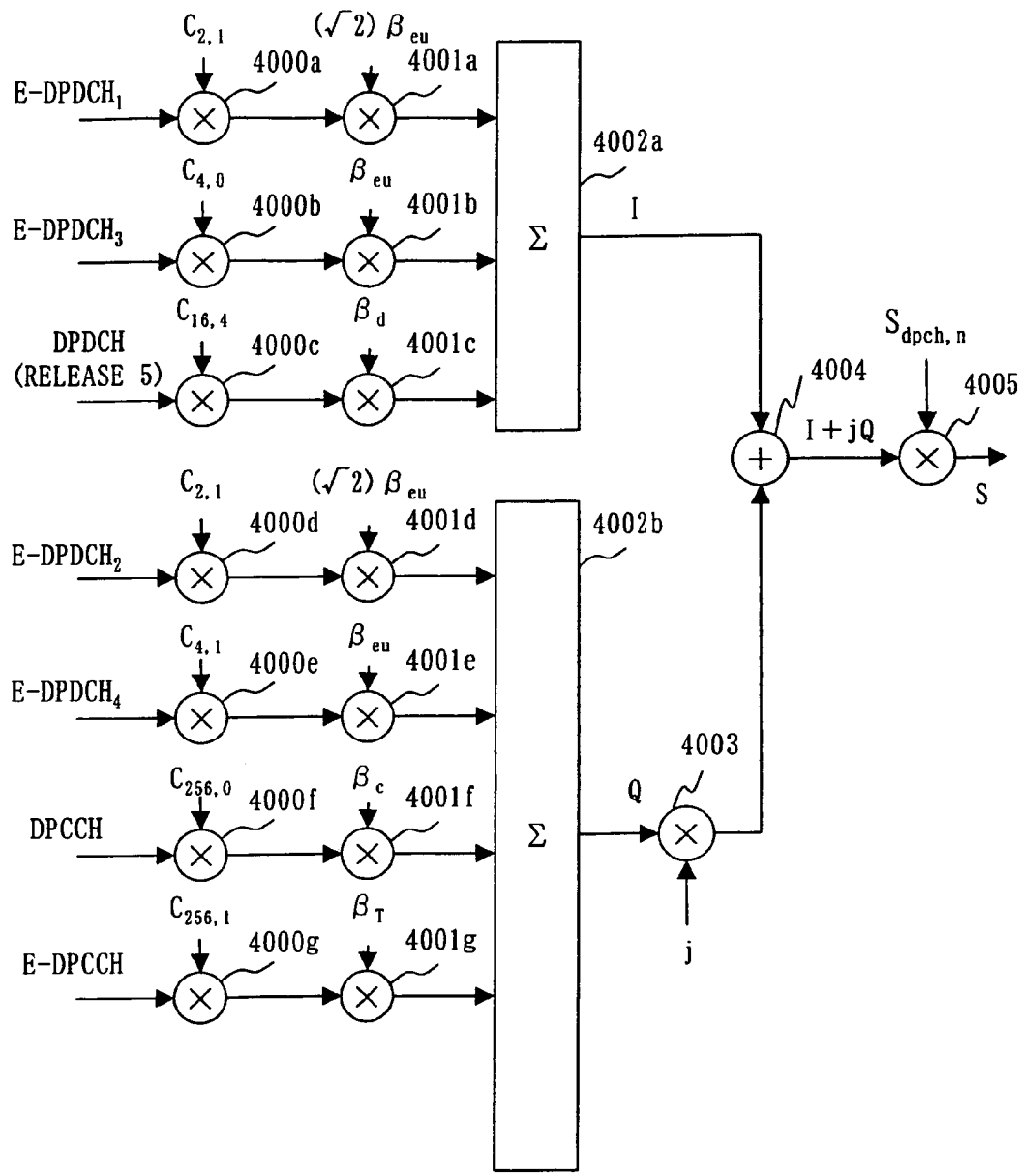
FIG. 40 shows an example of assignment of channelization codes based on a magnitude of SF when there is no HS-DPCCH according to the eighth embodiment.

FIG. 40 shows an example of assignment of the channelization codes based on the magnitude of SF when there is no HS-DPCCH. If $DPDCH_1$ for the Release 5 (Rel5) is assumed to transmit at 64 kbps, $C_{16,4}$ is assigned. $C_{256,2}$ is assigned to an E-DPCCH. First, the channelization code $C_{2,1}$ is assigned to E-DPDCH, and $E-DPDCH_2$ that are the data channels with SF=2. Next, the channelization code $C_{4,1}$ is assigned to $E-DPDCH_4$ that is the data channel with SF=4 at the Q side. Then, the channelization code $C_{4,0}$ is assigned to $E-DPDCH_3$ that is the data channel with SF=4 at the I side, since the I side includes a DPDCH.

Figure 41:
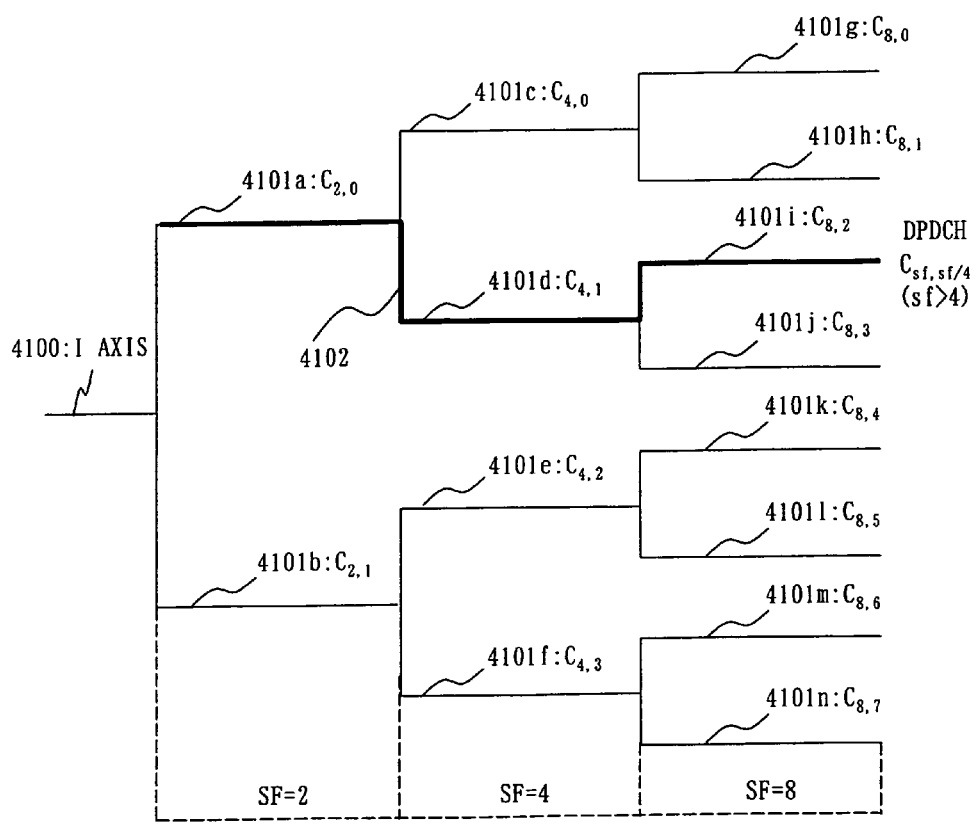
FIG. 41 shows a code tree of channelization codes at an I axis according to the eighth embodiment.

FIG. 41 shows a code tree of the channelization codes at the I axis. The code tree at the I axis 4100 is a code tree of the channelization codes at the I axis that has been used for the explanation of the above seventh embodiment. In FIG. 41, 4101a through 4101n show channelization codes for each SF (SF=2, SF=4, and SF=8). A bold line 4102 shows that channelization codes $4101a(C_{2,0})$, $4101d(C_{4,1})$, $4101i(C_{8,2})$ are used for a DPDCH. The channelization codes $4101a(C_{2,0})$, $4101d(C_{4,1})$, $4101i(C_{8,2})$ that have been already assigned to the DPDCH cannot be assigned to another channel. In case that the I axis is provided with one data channel with SF=2 and one data channel with SF=4, if the number of the DPDCH is changed, a base station of the Release 5 becomes incompatible, and thus soft handover becomes difficult. Accordingly, the channelization codes that are used for the DPDCH cannot be assigned. Therefore, it is preferable to first assign the channelization code $4101b(C_{2,1})$ to the data channel with SF=2, and then assign the channelization code $4101c(C_{4,0})$ to the data channel with SF=4. Accordingly, when an E-DPCCH is used at the I side, if SF=256, it is desired to use the channelization code $C_{256,k}$ ($64 \leq k \leq 127$).

Figure 42:
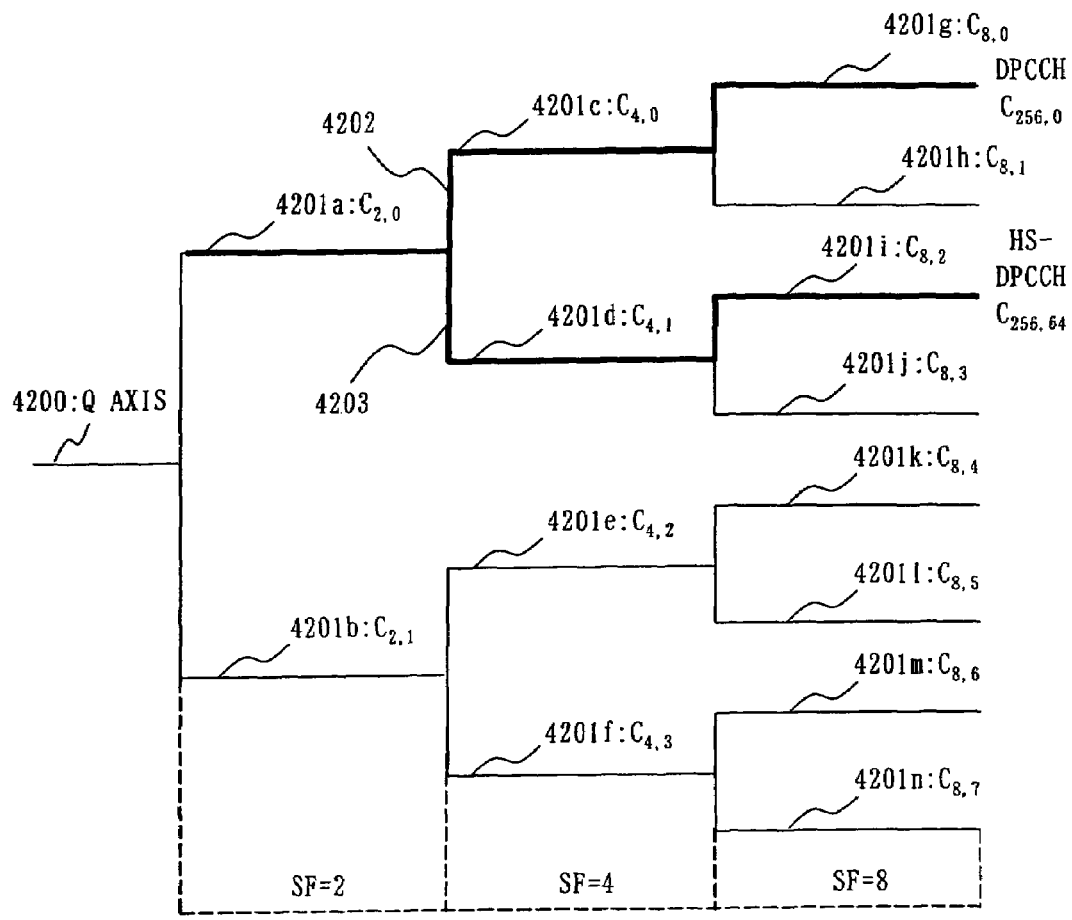
FIG. 42 shows a code tree of channelization codes at a Q axis according to the eighth embodiment.

FIG. 42 shows a code tree of the channelization codes of the Q axis. In FIG. 42, 4201a through 4201n show channelization codes for each SF (SF=2, SF=4, and SF=8). A bold line 4202 shows that channelization codes $4201a(C_{2,0})$, $4201c(C_{4,0})$, $4201g(C_{8,0})$ are used for a DPDCH. A bold line 4203 shows that channelization codes $4201a(C_{2,0})$, $4201d(C_{4,1})$, $4201i(C_{8,2})$ are used for an HS-DPCCH. If the I axis is provided with one data channel with SF=2 and one data channel with SF=4, since the channelization codes being used by the DPCCH that is always employed for communication cannot be assigned, it is preferable to first assign the channelization code $4201b(C_{2,1})$ to the data channel with SF=2, and then assign the channelization code $4201d(C_{4,1})$ to the data channel with SF=4. However, since the channelization code $4201d(C_{4,1})$ is being used by the HS-DPCCH, this assignment causes to clash with the HS-DPCCH. Soft-handover does not occur in the HS-DPCCH, so that it is possible to keep compatibility with the conventional base station even if the code number is changed. Therefore, if the Q axis is provided with one data channel with SF=2 and one data channel with SF=4, assignment of the codes to the HS-DPCCH is set to, for example, $C_{256,1}$ or $C_{256,32}$ of the channelization code $C_{256,k}$ ($1 \leq k \leq 63$) to avoid the clash with the data channel (E-DPDCH). However, when the number of data channels (E-DPDCHs) has been already limited to the number that does not cause to clash with the HS-DPCCH, the assignment of the codes to the HS-DPCCH can be set in the same way with the Release 5. Further, when an E-DPCCH is used at the Q side, if SF=256, it is preferable to use the channelization code $C_{256,k}$ ($1 \leq k \leq 63$) that does not cause the clash with the HS-DPCCH.

Figure 43:
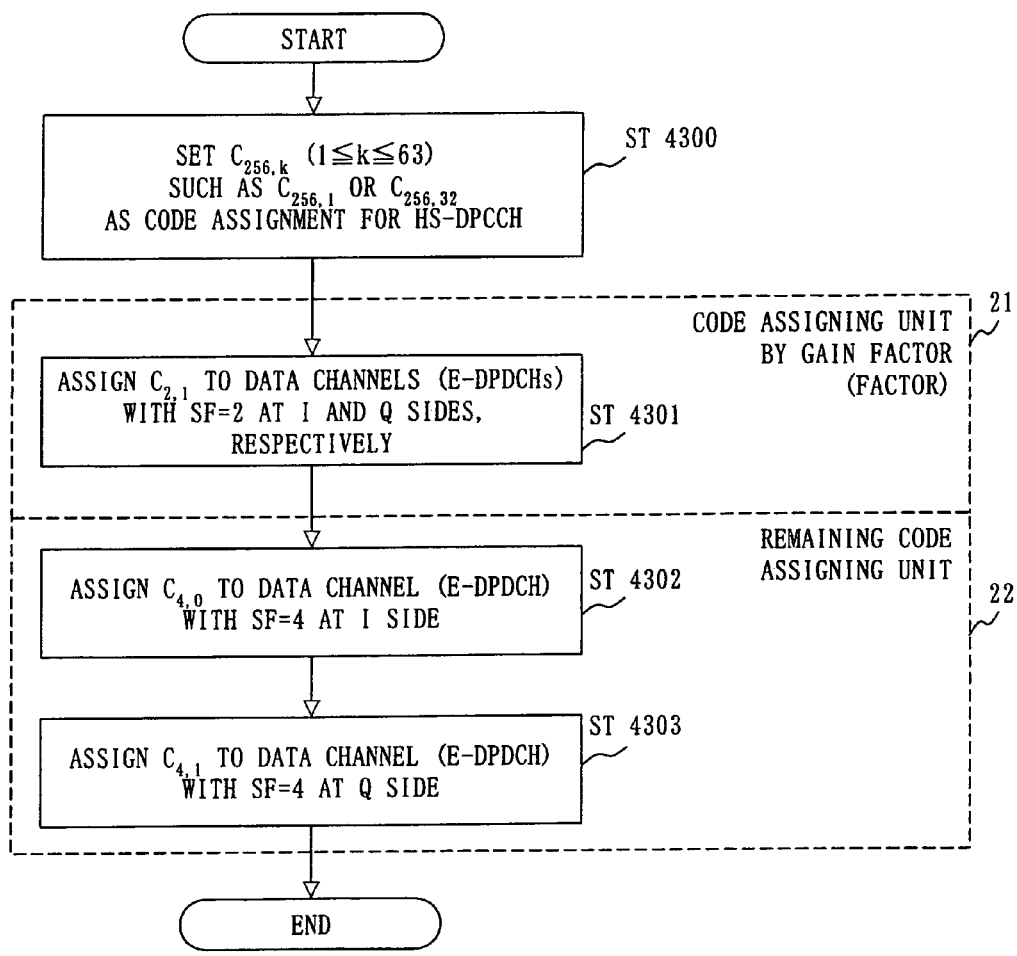
FIG. 43 shows an example of assignment of channelization codes based on a magnitude of SF when there is an HS-DPCCH according to the eighth embodiment.

FIG. 43 is a flowchart showing assignment of the channelization codes based on the magnitude of SF when there is an HS-DPCCH. At STEP4300, the controlling unit 905 sets the $C_{256,k}$ ($1 \leq k \leq 63$) as assignment for an HS-DPCCH. For example, it is set to $C_{256,1}$ or $C_{256,32}$. However, when the number of data channels (E-DPDCHs) is limited to no more than three from the first, the assignment of the codes to the HS-DPCCH can be the same with the Release 5. In such a case, STEP4300 can be omitted. At STEP4301, the code assigning unit by gain factor 21 assigns $C_{2,1}$ to the data channels (E-DPDCHs) with SF=2 at the I and Q sides, respectively and stores in the memory 15. And then, at STEP4302, the remaining code assigning unit 22 assigns $C_{4,0}$ to the data channels with SF=4 at the I side and stores in the memory 15. This is because the assignment of $C_{4,1}$ causes the clash with the DPDCH. Further, at STEP4303, the remaining code assigning unit 22 assigns $C_{4,1}$ to the data channels (E-DPDCHs) with SF=4 at the Q side and stores in the memory 15. This is because the assignment of $C_{4,0}$ causes the clash with the DPCCH. Since both the DPCCH and the DPDCH are channels specified in the Release 99 (R99), backward compatibility will be lost if the channelization code numbers are changed, and thus soft-handover cannot be carried out. This flowchart does not define an order of time to assign the channelization codes, but defines an order of priority for the assignment. Timing for setting the channelization codes by the controlling unit 905 can be the same.

Figure 44:
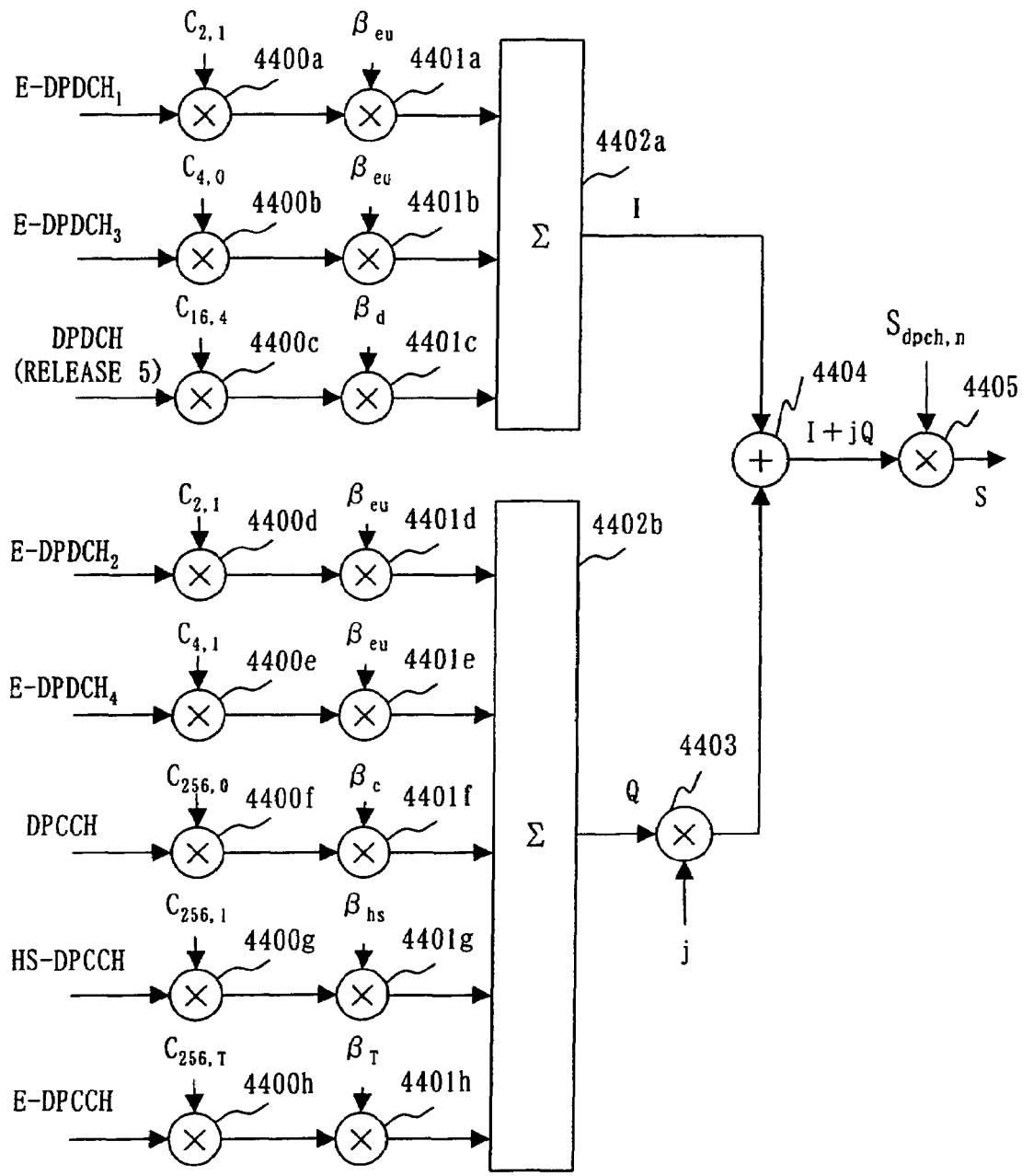
FIG. 44 shows an example of assignment of channelization codes based on a magnitude of SF when there is an HS-DPCCH according to the eighth embodiment.

FIG. 44 is an example showing assignment of the channelization codes based on the magnitude of SF when there is an HS-DPCCH. As the HS-DPCCH is used, the assignment of the codes for the HS-DPCCH is set to $C_{256,1}$. $C_{16,4}$ is assigned to DPDCH$_1$ for the Release 5 if DPDCH$_1$ transmits at 64 kbps. C$_{256,2}$ is assigned to an E-DPCCH. First, the channelization code C$_{2,1}$ is assigned to E-DPDCH$_1$ and E-DPDCH$_2$ that are the data channels with SF=2. Next, the channelization code C$_{4,0}$ is assigned to E-DPDCH$_3$ that is the data channel with SF=4 at the I side, since there is a DPDCH at the I side. Then, the channelization code C$_{4,1}$ is assigned to E-DPDCH$_4$ that is the data channel with SF=4 at the Q side.

The above discussed way will be generalized and considered.

Figures 45, 46:
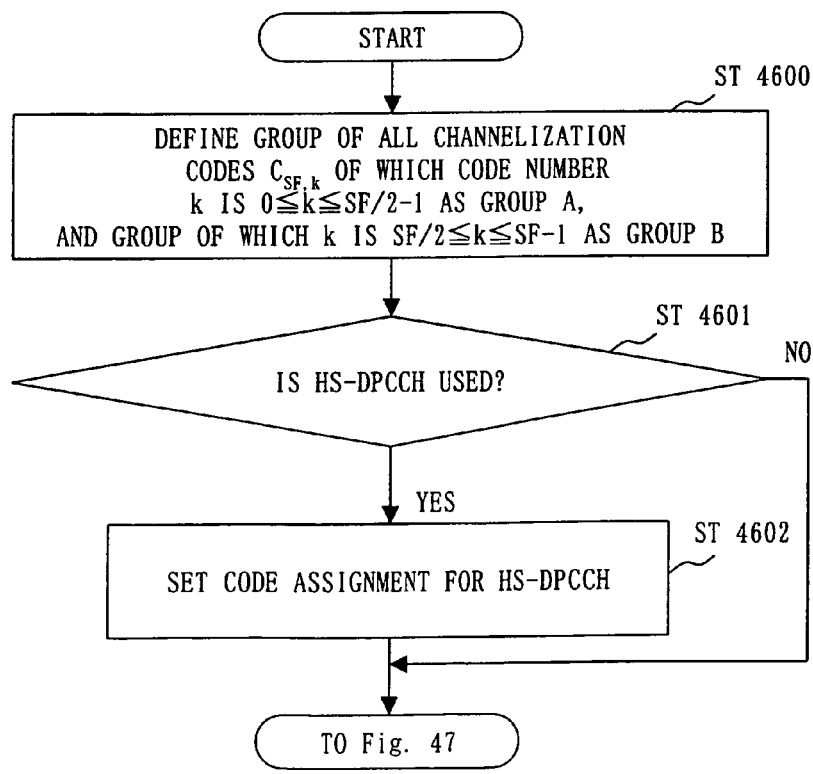
FIG. 45 is a table showing a configuration of channelization codes according to the eighth embodiment.
FIG. 46 shows a flowchart for determining assignment of channelization codes when data channels having different SFs are multiplexed according to the eighth embodiment.

Any channelization code can be developed and expressed by a channelization code for SF=2. FIG. 45 is a table showing a structure of a channelization code. A channelization code for SF=2 means a channelization code for SF=2 that is the minimum SF. A channelization code for SF=sf shows a structure of the channelization code which is not for SF=2. It is understood that one time development makes the code number k a quotient obtained by division with 2. Here, the channelization code for SF=sf of which the code number is k is developed to SF=2. When the code number k is 0≦k≦(SF/2−1), a quotient obtained by division with SF/2 becomes 0, so that if the development is done to SF=2, the channelization code consists of C$_{2,0}$ or −C$_{2,0}$. Further, when the code number k is (SF/2)≦k≦(SF−1), a quotient obtained by division with SF/2 becomes 1, so that if the development is done to SF=2, the channelization code consists of C$_{2,1}$ or −C$_{2,1}$.

A case will be explained in which the channelization codes C$_{SF,k}$ all of which the code number k is 0≦k≦(SF/2−1). In this case, for any value of SF, a phase variation from an odd-numbered chip to an even-numbered chip always remains 0 degrees even if a gain factor is changed. This will be verified by the following expressions. Only C$_{2,0}$=(1,1), −C$_{2,0}$=(−1,−1) are used for the channels of both I and Q sides. If the case is limited to a transition from an odd-numbered chip to an even-numbered chip of a certain part, the following expressions can be applied regardless of kinds of channels, values of gain factors, and the number of multiplexing. In the following, β$_1$ through β$_4$ are real numbers.

$I=\beta_1-\beta_2, \beta_1-\beta_2$ $Q=\beta_3-\beta_4, \beta_3-\beta_4$

As shown in the above, the phase variation of this part is 0 degrees. This can be verified in the same manner for all phase variations from an odd-numbered chip to an even-numbered chip, so that the phase variation from an odd-numbered chip to an even-numbered chip maintains 0 degrees.

Next, a case will be explained in which the channelization codes C$_{SF,k}$ of which the code number k is (SF/2)≦k≦(SF−1). In this case, for any value of SF, a phase variation from an odd-numbered chip to an even-numbered chip always remains 180 degrees even if a gain factor is changed. Only C$_{2,1}$=(1,−1), −C$_{2,1}$=(−1,1) are used for the channels of both I and Q sides. If the case is limited to a transition from an odd-numbered chip to an even-numbered chip of a certain part, the following expressions can be applied regardless of kinds of channels, values of gain factors, and the number of multiplexing. In the following, β$_5$ through β$_8$ are real numbers.

$I=\beta_5-\beta_6, -\beta_5+\beta_6$ $Q=\beta_7-\beta_8, -\beta_7+\beta_8$

As shown in the above, the phase variation of this part is 180 degrees. This can be verified in the same manner for all phase variations from an odd-numbered chip to an even-numbered chip, so that the phase variation from an odd-numbered chip to an even-numbered chip maintains 180 degrees.

A case will be explained in which the channelization codes C$_{SF,k}$ of which the code number k is 0≦k≦(SF/2−1) and the channelization codes C$_{SF,k}$ of which the code number k is (SF/2)≦k≦(SF−1) are mixed. In this case, as for a transition from an odd-numbered chip to an even-numbered chip, only C$_{2,0}$=(1,1), −C$_{2,0}$=(−1,−1), C$_{2,1}$=(1,−1), −C$_{2,1}$=(−1,1) are used for the channels of both I and Q sides. If the case is limited to a transition from an odd-numbered chip to an even-numbered chip of a certain part, the following expressions can be applied regardless of kinds of channels, values of gain factors, and the number of multiplexing. In the following, β$_1$ through β$_8$ are real numbers.

$I=\beta_1-\beta_2+\beta_5-\beta_6, \beta_1-\beta_2-\beta_5+\beta_6$ $Q=\beta_3-\beta_4+\beta_7-\beta_8, \beta_3-\beta_4-\beta_7+\beta_8$ As shown in the above, the phase variation of this part does not become 0 degrees or 180 degrees unless β$_1$ through β$_4$ are 0 or β$_5$ through β$_8$ are 0. This can be verified in the same manner for all phase variations from an odd-numbered chip to an even-numbered chip, so that the phase variations from an odd-numbered chip to an even-numbered chip cannot be 0 degrees or 180 degrees when both of the channelization codes C$_{SF,k}$ of which the code number k is 0≦k≦(SF/2−1) and the channelization codes C$_{SF,k}$ of which the code number k is (SF/2)≦k≦(SF−1) are used. Therefore, it is preferable to use only the channelization codes C$_{SF,k}$ of which the code number k is 0≦k≦(SF/2−1) or only the channelization codes C$_{SF,k}$ of which the code number k is (SF/2)≦k≦(SF−1).

Whatever SF is, the phase variation becomes close to 90 degrees if the channelization codes C$_{SF,k}$ of which the code number k is 0≦k≦(SF/2−1) and the channelization codes C$_{SF,k}$ of which the code number k is (SF/2)≦k≦(SF−1) are mixed at the I side or the Q side. Accordingly, it is desired that the channelization codes C$_{SF,k}$ of which the code number k is 0≦k≦(SF/2−1) and the channelization codes C$_{SF,k}$ of which the code number k is (SF/2)≦k≦(SF−1) should not be mixed as much as possible. For this, absolute values of β$_1$ through β$_4$ should be made large and absolute values of β$_5$ through β$_8$ should be made small, or the absolute values of β$_5$ through β$_8$ should be made large and the absolute values of β$_1$ through β$_4$ should be made small. That is, at the I and Q axes, β$_1$ through β$_4$ should be made large and β$_5$ through β$_8$ should be made small by increasing a weighing factor for chips of the I/Q axis, to which the channelization codes that make the chip transition (1,1) or (−1,−1) are assigned when the transition is limited to between two chips. Or, on the other hand, at the I and Q axes, β$_5$ through β$_8$ should be made large and β$_1$ through β$_4$ should be made small by increasing a weighing factor for chips of the I/Q axis, to which the channelization codes that make a chip transition (1,−1) or (−1,1) are assigned when the transition is limited to between two chips. This can be implemented by making channels (1,1) or (−1,−1) from a channel of which the weighing factor for chips of the I/Q axis is large, namely, by assigning the channelization codes C$_{SF,k}$ of which the code number k is 0≦k≦(SF/2−1). Or, on the other hand, it can be implemented by making channels (1,−1) or (−1,1) from a channel of which the weighing factor for chips of the I/Q axis is large, namely, by assigning the channelization codes C$_{SF,k}$ of which the code number k is (SF/2)≦k≦(SF−1). Assigning the channelization codes to channels from a channel of which the weighing factor for chips of the I/Q axis is large is equivalent to assigning the channelization codes to data channels from a data channel in which an absolute value of the gain factor/$(\beta_1+\beta_2+\ldots+\beta_8)$ is large. Since the phase variation θ is determined by $\beta_1$ through $\beta_8$ that are summations of gain factors, it is equivalent to assigning the channelization codes $C_{SF,k}$ of which the code number k is $0\leq k\leq(SF/2-1)$ to channels from a channel which has a higher degree to determine the phase variation θ, or is equivalent to assigning the channelization codes $C_{SF,k}$ of which the code number k is $(SF/2)\leq k\leq(SF-1)$ to channels from a channel which has a higher degree to determine the phase variation θ. That is, when the channelization codes $C_{SF,k}$ of which the code number k is $0\leq k\leq(SF/2-1)$ are assigned to channels from the channel which has a higher degree to determine the phase variation θ, or the channelization codes $C_{SF,k}$ of which the code number k is $(SF/2)\leq k\leq(SF-1)$ are assigned to channels from the channel which has a higher degree to determine the phase variation θ, the phase variation θ can be made close to 0 degrees or 180 degrees as much as possible, so that the overshoot can be reduced. Consequently, when the channelization codes $C_{SF,k}$ of which the code number k is $0\leq k\leq(SF/2-1)$ are assigned to channels from the channel which has a higher degree to determine the phase variation θ, or $C_{2,1}$, $C_{4,2}$, and $C_{4,3}$ are assigned to channels from the channel which has a higher degree to determine the phase variation θ, the overshoot can be reduced.

Namely, as well as the second embodiment, it is effective to assign the channelization codes $C_{SF,k}$ of which the code number k is $0\leq k\leq(SF/2-1)$ to channels from the channel of which the gain factor is large or assign the channelization codes $C_{SF,k}$ of which the code number k is $(SF/2)\leq k\leq(SF-1)$ to channels from the channel of which the gain factor is large. Concretely, for example, when the channelization codes $C_{SF,k}$ of which the code number k is $0\leq k\leq(SF/2-1)$ are assigned at the I axis, the channelization codes $C_{SF,k}$ of which the code number k is $0\leq k\leq(SF/2-1)$ are also assigned at the Q axis. On the other hand, when the channelization codes $C_{SF,k}$ of which the code number k is $(SF/2)\leq k\leq(SF-1)$ are assigned at the I axis, the channelization codes $C_{SF,k}$ of which the code number k is $(SF/2)\leq k\leq(SF-1)$ are also assigned at the Q axis. When the optimal assignment cannot be obtained based on the magnitudes of the gain factors, it is considered that transmission power of a channel which carries larger data is larger, so that it is more effective to assign the channelization codes to data channels from the data channel of which the data amount is large as well as the third embodiment. In another way, a channel of which SF is small is considered to have larger data amount than a data channel of which SF is large, so that it is more effective to assign the channelization codes to data channels from a data channel of which SF is small.

Figure 47:
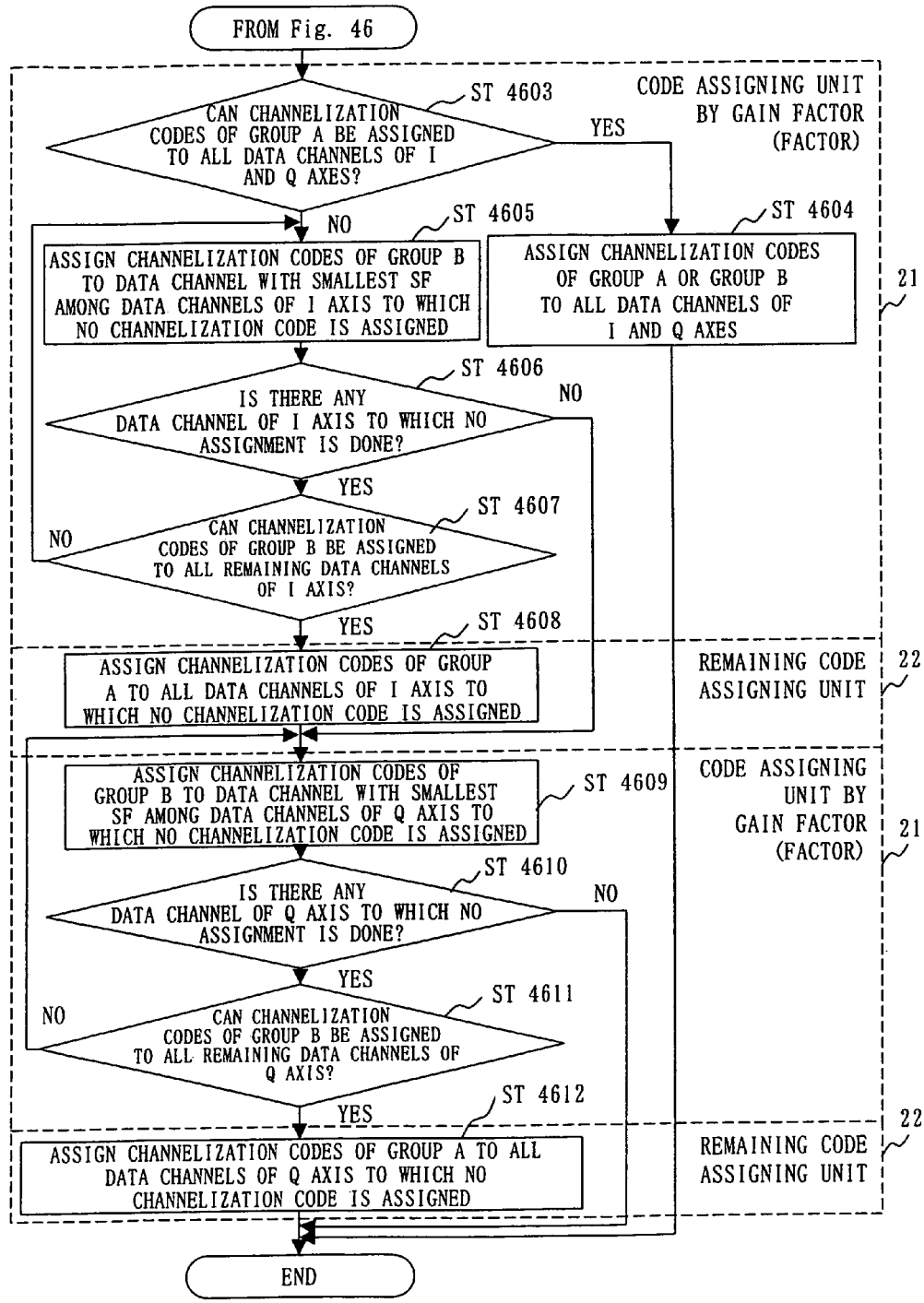
FIG. 47 shows a flowchart for determining assignment of channelization codes when data channels having different SFs are multiplexed according to the eighth embodiment.

FIGS. 46 and 47 are flowcharts showing assignment of the channelization codes when data channels having different SFs are multiplexed. At STEP4600, the controlling unit 905 defines, out of all channelization codes, a group of all channelization codes $C_{SF,k}$ of which the code number k is $0\leq k\leq(SF/2-1)$ as a group A, and a group of all channelization codes $C_{SF,k}$ of which the code number k is $(SF/2)\leq k\leq(SF-1)$ as a group B. At STEP4601, the controlling unit 905 judges if an HS-DPCCH is used. If it is used, STEP4602 is implemented. If an HS-DPCCH is not used, STEP4603 is implemented. At STEP4602, the controlling unit 905 sets assignment of the codes for an HS-DPCCH. When the number of data channels is limited to the number which does not cause to clash with the HS-DPCCH from the first, the assignment of the codes for the HS-DPCCH can be the same with the Release 5. In this case, STEP4601 and STEP4602 can be omitted.

At STEP4603, the code assigning unit by gain factor 21 judges if it is possible to assign to every data channel of the I and Q axes using only channelization codes of the group A without causing to clash with other channels. If it is possible to assign, STEP4604 is implemented. On the other hand, if it is not possible to assign, STEP4605 is implemented. At STEP4604, the code assigning unit by gain factor 21 assigns the channelization codes of the group A to all data channels of the I and Q axes and stores in the memory 15. Or the code assigning unit by gain factor 21 assigns the channelization codes of the group B to all data channels of the I and Q axes and stores in the memory 15. At STEP4605, the code assigning unit by gain factor 21 assigns the channelization codes of the group B to the data channel with the smallest SF among the data channels of the I axis to which no channelization code is assigned and stores in the memory 15. At STEP4606, the code assigning unit by gain factor 21 judges if there is any data channel of the I axis to which no channelization code is assigned. If there is a data channel to which no channelization code is assigned, STEP4607 is implemented. On the other hand, if there is no data channel to which no channelization code is assigned, STEP4609 is implemented. At STEP4607, it is judged if when the code assigning unit by gain factor 21 assigns the channelization codes of the group B to the data channels of the I axis to which no channelization code is assigned, the assignment causes to clash with another channel. If it is judged to cause to clash, STEP4608 is implemented. If it is judged not to cause to clash, STEP4605 is implemented. At STEP4608, the remaining code assigning unit 22 assigns the group A to all data channels of the I axis to which no channelization code is assigned and stores in the memory 15. At STEP4609, the code assigning unit by gain factor 21 assigns the channelization codes of the group B to the data channel with the smallest SF among the data channels of the Q axis to which no channelization code is assigned and stores in the memory 15. At STEP4610, the code assigning unit by gain factor 21 judges if there is any data channel of the Q axis to which no channelization code is assigned. If there is a data channel to which no channelization code is assigned, STEP4611 is implemented. If there is no data channel to which no channelization code is assigned, the operation terminates. At STEP4611, the code assigning unit by gain factor 21 judges if the assignment of the channelization codes of the group B to the remaining data channels of the Q axis cause to clash with another channel. If it is judged to cause to clash, STEP4612 is implemented. If it is judged not to cause to clash, STEP4609 is implemented. At STEP4612, the remaining code assigning unit 22 assigns the group A to all data channels of the Q axis to which no channelization code is assigned and stores in the memory 15.

According to the present embodiment, by assigning the channelization codes to channels from a channel of which a degree of determining the phase variation is high, it is possible to determine the combination of the channelization codes which creates less overshoot by using a more small-scale H/W.

INDUSTRIAL APPLICABILITY

By producing a CDMA terminal using the embodiment, it is possible to produce a terminal of which PAR is small.

Further, adjacent channel leak power due to non-linear distortion can be reduced in an amplifier used for amplifying the power, so that it is possible to produce a small CDMA terminal with low power consumption at a low cost.

Explanation of Signs

10: CPU, 11: a code combination creating unit, 12: an inter-chip phase variation calculating unit, 13: a code combination determining unit, 14: a code assignment instructing unit, 15: a memory, 21: a code assigning unit by gain factor, 22: a remaining code assigning unit, 31: a code assigning unit by data amount, 41: a prohibited code judging unit, 900: a protocol processing unit, 901: a transmitting unit, 902: a modulating unit, 903: a scrambling code generator, 904: a channelization code generator, 905: a controlling unit, 906: a D/A converter, 907: a frequency changing unit, 908: a power amplifying unit, 909: an antenna, 910: a low noise amplifying unit, 911: a frequency changing unit, and 912: a receiving unit.

The invention claimed is:

1. A communication apparatus comprising:
   an IQ multiplexing unit for multiplexing a plurality of data channels and a control channel at an I side and a Q side to generate a complex signal;
   a transmitting unit for modulating and transmitting the complex signal generated by the IQ multiplexing unit; and
   a controlling unit for controlling assignment of channelization codes for a data channel and a control channel at the I side and the Q side multiplexed by the IQ multiplexing unit,
   wherein the controlling unit comprises:
   a code assigning unit by factor for, based on a size of a factor that is multiplied to the data channel and the control channel by the IQ multiplexing unit, assigning a first channelization code to a data channel of which the factor is large; and
   a remaining code assigning unit for assigning a second channelization code being different from the first channelization code to a data channel to which no channelization code has been assigned by the code assigning unit by factor.

2. The communication apparatus of claim 1, wherein
   the code assigning unit by factor comprises a prohibited code judging unit for, when a second control channel is added as a control channel, judging which of the I side or the Q side of the IQ multiplexing unit the second control channel is added, and, at the I side or the Q side to which the second control channel is added, prohibiting assignment of a channelization code that has a correlation with a channelization code to be assigned to the second control channel.

3. The communication apparatus of claim 1, wherein:
   the factor is a gain factor; and
   the controlling unit, when a number of data channels multiplexed by the IQ multiplexing unit is five, among three data channels at the I side of the IQ multiplexing unit, assigns $C_{4,2}$ and $C_{4,3}$ respectively as channelization codes to two data channels having largest gain factors and assigns either $C_{4,1}$ or $C_{4,0}$ to a remaining one data channel.

4. The communication apparatus of claim 1, wherein:
   the factor is a gain factor; and
   the controlling unit, when a number of data channels multiplexed by the IQ multiplexing unit is six, among three data channels at the I side of the IQ multiplexing unit, assigns $C_{4,2}$ and $C_{4,3}$ respectively as channelization codes to two data channels having largest gain factors and assigns $C_{4,1}$ to a remaining one data channel, and among three data channels at the Q side of the IQ multiplexing unit, assigns $C_{4,2}$ and $C_{4,3}$ respectively as channelization codes to two data channels having largest gain factors and assigns either $C_{4,1}$ or $C_{4,0}$ to a remaining one data channel.

5. The communication apparatus of claim 1, wherein
   the controlling unit controls assignment of channelization code $C_{SF,k}$ of which a spreading factor is SF and a code number is k, assigns a channelization code of which the code number k is $0 \leq k \leq (SF/2-1)$ as the first channelization code, and assigns a channelization code of which the code number k is $(SF/2) \leq k \leq (SF-1)$ as the second channelization code.

6. The communication apparatus of claim 5, wherein
   the controlling unit, in case of assigning channelization codes to a data channel of which the spreading factor SF is 2 and to a data channel of which the spreading factor SF is 4, assigns $C_{2,0}$ to the data channel of which the spreading factor SF is 2 as the first channelization code and assigns $C_{4,0}$ or $C_{4,1}$ to the data channel of which the spreading factor SF is 4 as the second channelization code.

7. The communication apparatus of claim 1, wherein
   the controlling unit controls assignment of channelization code $C_{SF,k}$ of which a spreading factor is SF and a code number is k, assigns a channelization code of which the code number k is $0 \leq k \leq (SF/2-1)$ as the second channelization code, and assigns a channelization code of which the code number k is $(SF/2) \leq k \leq (SF-1)$ as the first channelization code.

8. The communication apparatus of claim 7, wherein
   the controlling unit, in case of assigning channelization codes to a data channel of which the spreading factor SF is 2 and to a data channel of which the spreading factor SF is 4, assigns $C_{2,1}$ to the data channel of which the spreading factor SF is 2 as the first channelization code and assigns $C_{4,0}$ or $C_{4,1}$ to the data channel of which the spreading factor SF is 4 as the second channelization code.

9. A communication method comprising:
   IQ multiplexing a plurality of data channels and a control channel at an I side and a Q side to generate a complex signal;
   modulating and transmitting the complex signal generated by the IQ multiplexing; and
   controlling assignment of channelization codes for a data channel by a controlling unit and a control channel at the I side and the Q side multiplexed by the IQ multiplexing,
   wherein the controlling comprises:
   based on a size of a factor that is multiplied to the data channel and the control channel by the IQ multiplexing, assigning a first channelization code to a data channel of which the factor is large; and
   assigning a second channelization code being different from the first channelization code to a data channel to which no channelization code has been assigned by the assigning of the first channelization code.

\* \* \* \* \*